(12) United States Patent
Pappas et al.

(10) Patent No.: US 9,026,472 B2
(45) Date of Patent: May 5, 2015

(54) METHOD AND SYSTEM FOR RESERVING FUTURE PURCHASES OF GOODS AND SERVICES

(71) Applicants: Christian S. Pappas, Chicago, IL (US); Charles P. Brown, Chicago, IL (US)

(72) Inventors: Christian S. Pappas, Chicago, IL (US); Charles P. Brown, Chicago, IL (US)

(73) Assignee: Smart Options, LLC, Chicago, IL (US)

( * ) Notice: Subject to any disclaimer, the term of this patent is extended or adjusted under 35 U.S.C. 154(b) by 93 days.

(21) Appl. No.: 13/802,068

(22) Filed: Mar. 13, 2013

(65) Prior Publication Data

US 2013/0198036 A1 Aug. 1, 2013

Related U.S. Application Data

(60) Continuation-in-part of application No. 13/737,164, filed on Jan. 9, 2013, which is a continuation-in-part of application No. 13/549,751, filed on Jul. 16, 2012, now Pat. No. 8,543,450, which is a continuation of application No. 13/251,826, filed on Oct. 3, 2011, now Pat. No. 8,229,841, which is a continuation of application No. 12/970,165, filed on Dec. 16, 2010, now Pat. No. 8,032,447, which is a continuation of application No. 11/805,564, filed on May 23, 2007, now Pat. No. 7,865,424, which is a division of application No. 09/566,671, filed on May 8, 2000, now Pat. No. 7,313,539, said application No. 13/737,164 is a continuation-in-part of application No. 13/158,528, filed on Jun. 13, 2011, now Pat. No. 8,620,771, which is a continuation-in-part of application No. 12/005,129, filed on Dec. 21, 2007, now Pat. No. 7,962,375, which is a continuation-in-part of application No. 09/566,671, filed on May 8, 2000, now Pat. No. 7,313,539.

(51) Int. Cl.
*G06Q 30/06* (2012.01)
*G06Q 10/00* (2012.01)
*G06Q 30/02* (2012.01)
*G06Q 40/00* (2012.01)
*G06Q 40/04* (2012.01)
*G06Q 50/10* (2012.01)
*G06Q 30/00* (2012.01)

(52) U.S. Cl.
CPC ............ *G06Q 30/0609* (2013.01); *G06Q 10/00* (2013.01); *G06Q 30/0222* (2013.01); *G06Q 30/0601* (2013.01); *G06Q 30/0613* (2013.01); *G06Q 40/00* (2013.01); *G06Q 40/04* (2013.01); *G06Q 50/10* (2013.01); *G06Q 30/0225* (2013.01); *Y10S 707/99931* (2013.01); *G06Q 30/00* (2013.01)

(58) Field of Classification Search
None
See application file for complete search history.

(56) References Cited

U.S. PATENT DOCUMENTS

| | | |
|---|---|---|
| 4,823,265 A | 4/1989 | Nelson |
| 4,903,201 A | 2/1990 | Wagner |

(Continued)

FOREIGN PATENT DOCUMENTS

WO WO9926173 5/1999

OTHER PUBLICATIONS

Partial PCT Search Report PCT/US2008/079,273 Dated: Dec. 8, 2008.

(Continued)

*Primary Examiner* — Robert R Niquette
(74) *Attorney, Agent, or Firm* — Lesavich High-Tech Law Group, S.C.; Stephen Lesavich

(57) ABSTRACT

A method and system for reserving future purchases of goods or services or events. Electronic options are provided for desired goods or services or events. Electronic options, electronic option terms and electronic option fees are dynamically generated and dynamically adjusted based on prior and current actions completed on a client network device. A business-to-business (b2b) marketplace is established using electronic options.

19 Claims, 23 Drawing Sheets

(56) References Cited

U.S. PATENT DOCUMENTS

| | | | |
|---|---|---|---|
| 5,237,499 A | 8/1993 | Garback | |
| 5,297,031 A | 3/1994 | Gutterman | |
| 5,557,517 A | 9/1996 | Daughterty, III | |
| 5,590,197 A | 12/1996 | Chen | |
| 5,671,363 A | 9/1997 | Cristofich | |
| 5,732,398 A | 3/1998 | Tagawa | |
| 5,732,400 A | 3/1998 | Mandler et al. | |
| 5,778,357 A | 7/1998 | Kolton | |
| 5,794,207 A | 8/1998 | Walker | |
| 5,797,127 A * | 8/1998 | Walker et al. | 705/5 |
| 5,855,007 A | 12/1998 | Jovicic | |
| 5,884,277 A | 3/1999 | Khos la | |
| 5,884,286 A | 3/1999 | Daughtery, III | |
| 5,897,620 A | 4/1999 | Walker | |
| 5,905,246 A | 5/1999 | Fajkowski | |
| 5,933,810 A * | 8/1999 | Okawa | 705/5 |
| 5,948,040 A | 9/1999 | DeLorme | |
| 5,991,744 A | 11/1999 | DiCresce | |
| 6,012,045 A | 1/2000 | Barzilal | |
| 6,016,483 A | 1/2000 | Rickard | |
| 6,024,641 A | 2/2000 | Samo | |
| 6,035,289 A | 3/2000 | Chou | |
| 6,041,308 A | 3/2000 | Walker | |
| 6,049,778 A | 4/2000 | Walker | |
| 6,049,783 A | 4/2000 | Segal | |
| 6,085,169 A | 7/2000 | Walker et al. | |
| 6,094,681 A | 7/2000 | Shaffer | |
| 6,112,185 A * | 8/2000 | Walker et al. | 705/5 |
| 6,173,270 B1 | 1/2001 | Cristofich | |
| 6,175,922 B1 | 1/2001 | Wang | |
| 6,240,396 B1 | 5/2001 | Walker et al. | |
| 6,263,321 B1 | 7/2001 | Daughtery, III | |
| 6,272,532 B1 | 8/2001 | Feinleib | |
| 6,318,536 B1 | 11/2001 | Korman | |
| 6,336,098 B1 | 1/2002 | Fortenberry | |
| 6,370,514 B1 | 4/2002 | Messener | |
| 6,381,582 B1 | 4/2002 | Walker | |
| 6,390,472 B1 | 5/2002 | Vinarsky | |
| 6,393,269 B1 | 5/2002 | Hartmaier | |
| 6,507,823 B1 | 1/2003 | Nel | |
| 6,556,976 B1 | 4/2003 | Callen | |
| 6,618,707 B1 | 9/2003 | Gary | |
| 6,704,713 B1 | 3/2004 | Brett | |
| 6,732,922 B2 | 5/2004 | Lindgren | |
| 6,736,322 B2 | 5/2004 | Gobburu | |
| 6,920,428 B2 | 7/2005 | Greene | |
| 6,971,001 B1 | 11/2005 | Rolfs | |
| 7,127,408 B2 | 10/2006 | Rosen | |
| 7,206,755 B1 | 4/2007 | Muralidhar | |
| 7,231,656 B1 | 6/2007 | Nathan | |
| 7,257,552 B1 | 8/2007 | Franco | |
| 7,313,539 B1 | 12/2007 | Pappas | |
| 7,318,098 B2 | 1/2008 | Steinberg | |
| 7,363,267 B1 | 4/2008 | Vincent et al. | |
| 7,392,226 B1 | 6/2008 | Sasaki et al. | |
| 7,552,393 B2 | 6/2009 | Hayes-Roth | |
| 7,571,124 B2 | 8/2009 | Bodin | |
| 7,610,220 B2 | 10/2009 | Cella et al. | |
| 7,610,221 B2 | 10/2009 | Cella et al. | |
| 7,636,669 B1 * | 12/2009 | Bergert | 705/5 |
| 7,660,751 B2 | 2/2010 | Cella et al. | |
| 7,660,752 B2 | 2/2010 | Cella et al. | |
| 7,752,116 B2 | 7/2010 | Ascher et al. | |
| 7,865,424 B2 | 1/2011 | Pappas et al. | |
| 7,962,375 B2 | 6/2011 | Pappas et al. | |
| 7,996,292 B2 | 8/2011 | Pappas et al. | |
| 8,032,447 B2 | 10/2011 | Pappas et al. | |
| 8,229,841 B2 | 7/2012 | Pappas et al. | |
| 8,301,550 B2 | 10/2012 | Pappas et al. | |
| 8,463,765 B2 | 6/2013 | Lesavich | |
| 8,543,450 B2 | 9/2013 | Pappas et al. | |
| 8,620,771 B2 | 12/2013 | Pappas et al. | |
| 8,650,114 B2 | 2/2014 | Pappas et al. | |
| 2001/0032165 A1 | 10/2001 | Friend | |
| 2001/0037290 A1 | 11/2001 | Lai | |
| 2001/0042020 A1 | 11/2001 | Schachne et al. | |
| 2001/0053989 A1 * | 12/2001 | Keller et al. | 705/5 |
| 2002/0026403 A1 | 2/2002 | Tambay | |
| 2002/0046137 A1 | 4/2002 | Odom | |
| 2002/0069150 A1 | 6/2002 | Ni | |
| 2002/0183448 A1 | 12/2002 | Tibbitt | |
| 2002/0185414 A1 | 12/2002 | Morii | |
| 2003/0009068 A1 | 1/2003 | Platz | |
| 2003/0061110 A1 | 3/2003 | Bodin | |
| 2003/0147789 A1 | 8/2003 | Adachi | |
| 2003/0159889 A1 | 8/2003 | Johnson | |
| 2003/0170453 A1 | 9/2003 | Foss | |
| 2003/0183694 A1 | 10/2003 | Sayers | |
| 2003/0199596 A1 | 10/2003 | Kolke | |
| 2003/0204449 A1 | 10/2003 | Kotas | |
| 2003/0208406 A1 | 11/2003 | Okamoto | |
| 2003/0221438 A1 | 12/2003 | Rane | |
| 2003/0226552 A1 | 12/2003 | Hewkin | |
| 2003/0230529 A1 | 12/2003 | Austin | |
| 2004/0000517 A1 | 1/2004 | Austin | |
| 2004/0030616 A1 | 2/2004 | Florance | |
| 2004/0072609 A1 | 4/2004 | Ungaro | |
| 2004/0088242 A1 | 5/2004 | Ascher | |
| 2004/0093225 A1 | 5/2004 | Bedner | |
| 2004/0114960 A1 | 6/2004 | Kunou | |
| 2004/0254818 A1 | 12/2004 | Rosen | |
| 2005/0002741 A1 | 1/2005 | Brensinger | |
| 2005/0039816 A1 | 2/2005 | Maguire | |
| 2005/0051919 A1 | 3/2005 | Koike | |
| 2005/0080520 A1 | 4/2005 | Kline | |
| 2005/0120715 A1 | 6/2005 | Labrador | |
| 2005/0133466 A1 | 6/2005 | Bridges | |
| 2005/0170115 A1 | 8/2005 | Tibbitt | |
| 2005/0202865 A1 | 9/2005 | Kim | |
| 2005/0205491 A1 | 9/2005 | Helm | |
| 2005/0246225 A1 | 11/2005 | Jorgensen | |
| 2005/0263633 A1 | 12/2005 | Vantrease | |
| 2005/0267787 A1 * | 12/2005 | Rose et al. | 705/5 |
| 2005/0268946 A1 | 12/2005 | Miles | |
| 2006/0053030 A1 | 3/2006 | Nakamura | |
| 2006/0059038 A1 | 3/2006 | Iuchi | |
| 2006/0064573 A1 | 3/2006 | Rolfs | |
| 2006/0064574 A1 | 3/2006 | Rolfs | |
| 2006/0065610 A1 | 3/2006 | Giralico | |
| 2006/0080819 A1 | 4/2006 | McAllister | |
| 2006/0117625 A1 | 6/2006 | Peterson | |
| 2006/0118469 A1 | 6/2006 | Bork | |
| 2006/0178545 A1 | 8/2006 | Yang | |
| 2006/0180518 A1 | 8/2006 | Kashikura | |
| 2006/0271462 A1 | 11/2006 | Harmon | |
| 2006/0277130 A1 | 12/2006 | Harmon | |
| 2007/0066397 A1 | 3/2007 | Nammi et al. | |
| 2007/0178570 A1 | 8/2007 | Dlz | |
| 2007/0232982 A1 | 10/2007 | Jarmon | |
| 2007/0291491 A1 | 12/2007 | Ll | |
| 2008/0021810 A1 | 1/2008 | Pappas | |
| 2008/0091557 A1 | 4/2008 | Cella | |
| 2008/0091558 A1 | 4/2008 | Cella | |
| 2008/0091559 A1 | 4/2008 | Cella | |
| 2008/0091560 A1 | 4/2008 | Cella | |
| 2008/0091561 A1 | 4/2008 | Cella | |
| 2008/0091562 A1 | 4/2008 | Cella | |
| 2008/0091563 A1 | 4/2008 | Cella | |
| 2008/0091564 A1 | 4/2008 | Cella | |
| 2008/0091565 A1 | 4/2008 | Cella | |
| 2008/0091566 A1 | 4/2008 | Cella | |
| 2008/0091567 A1 | 4/2008 | Cella | |
| 2008/0091568 A1 | 4/2008 | Cella | |
| 2008/0091569 A1 | 4/2008 | Cella | |
| 2008/0091570 A1 | 4/2008 | Cella | |
| 2008/0097040 A1 | 4/2008 | Brown | |
| 2008/0097868 A1 | 4/2008 | Cella | |
| 2008/0097869 A1 | 4/2008 | Cella | |
| 2008/0097870 A1 | 4/2008 | Cella | |
| 2008/0103921 A1 | 5/2008 | Cella | |
| 2008/0103922 A1 | 5/2008 | Cella | |
| 2008/0103924 A1 | 5/2008 | Cella | |
| 2008/0103925 A1 | 5/2008 | Cella | |
| 2008/0103926 A1 | 5/2008 | Cella | |

(56) References Cited

U.S. PATENT DOCUMENTS

| | | |
|---|---|---|
| 2008/0103927 A1 | 5/2008 | Cella |
| 2008/0103928 A1 | 5/2008 | Cella |
| 2008/0103929 A1 | 5/2008 | Cella |
| 2008/0103930 A1 | 5/2008 | Cella |
| 2008/0103931 A1 | 5/2008 | Cella |
| 2008/0103932 A1 | 5/2008 | Cella |
| 2008/0103933 A1 | 5/2008 | Cella |
| 2008/0109325 A1 | 5/2008 | Cella |
| 2008/0215457 A1 | 9/2008 | Pappas |
| 2008/0215495 A1 | 9/2008 | Pappas |
| 2009/0006184 A1 | 1/2009 | Leech et al. |
| 2009/0036192 A1 | 2/2009 | Hughs |
| 2010/0094722 A1 | 4/2010 | Cella et al. |
| 2011/0131109 A1 | 6/2011 | Pappas et al. |
| 2011/0208710 A1 | 8/2011 | Lesavich |
| 2011/0301986 A1 | 12/2011 | Pappas et al. |
| 2011/0307279 A1 | 12/2011 | Pappas et al. |
| 2012/0078698 A1 | 3/2012 | Pappas et al. |
| 2012/0278622 A1 | 11/2012 | Lesavich et al. |
| 2013/0096965 A1 | 4/2013 | Pappas et al. |
| 2013/0144726 A1 | 6/2013 | Pappas et al. |
| 2013/0191124 A1 | 7/2013 | Pappas et al. |
| 2013/0191244 A1 | 7/2013 | Pappas et al. |
| 2013/0191296 A1 | 7/2013 | Pappas et al. |
| 2013/0198009 A1 | 8/2013 | Pappas et al. |
| 2013/0198036 A1 | 8/2013 | Pappas et al. |
| 2013/0254003 A1 | 9/2013 | Pappas et al. |
| 2014/0189792 A1 | 7/2014 | Lesavich et al. |

OTHER PUBLICATIONS

Partial PCT Search Report PCT/US2008/079,275 Dated: Dec. 24, 2008.

Estache, Antonio and Alexander, Ian, Infrastructure Restructuring and Regulation: Building a Base for Sustainable Growth (Sep. 1999). World Bank Policy Research Working Paper No. 2415.

Business Wire; "(TVLY) Priceline.com, Travelpcity.com Marketing Alliance Launches"; Monday, Apr. 10, 2000, Document Type: NEWSWIRE.

PR_Newswire_1; "TWA introduces TWA Club 60 for senior citizens"; Jan. 22, 1986; NYPR78, Supplier No. 04105692.

PR Newswire 2; "Travelers Indemnity to support International Capital Equipment in financial guarantees"; Jan. 6, 1984; NYPR38; Supplier No. 03089298.

Sep. 16, 2014, Notice of Intent to Issue Reexamination Certificate USPTO Ex-Parte Reexamination 90/013,061 for U.S. Patent No. 7,865,424.

\* cited by examiner

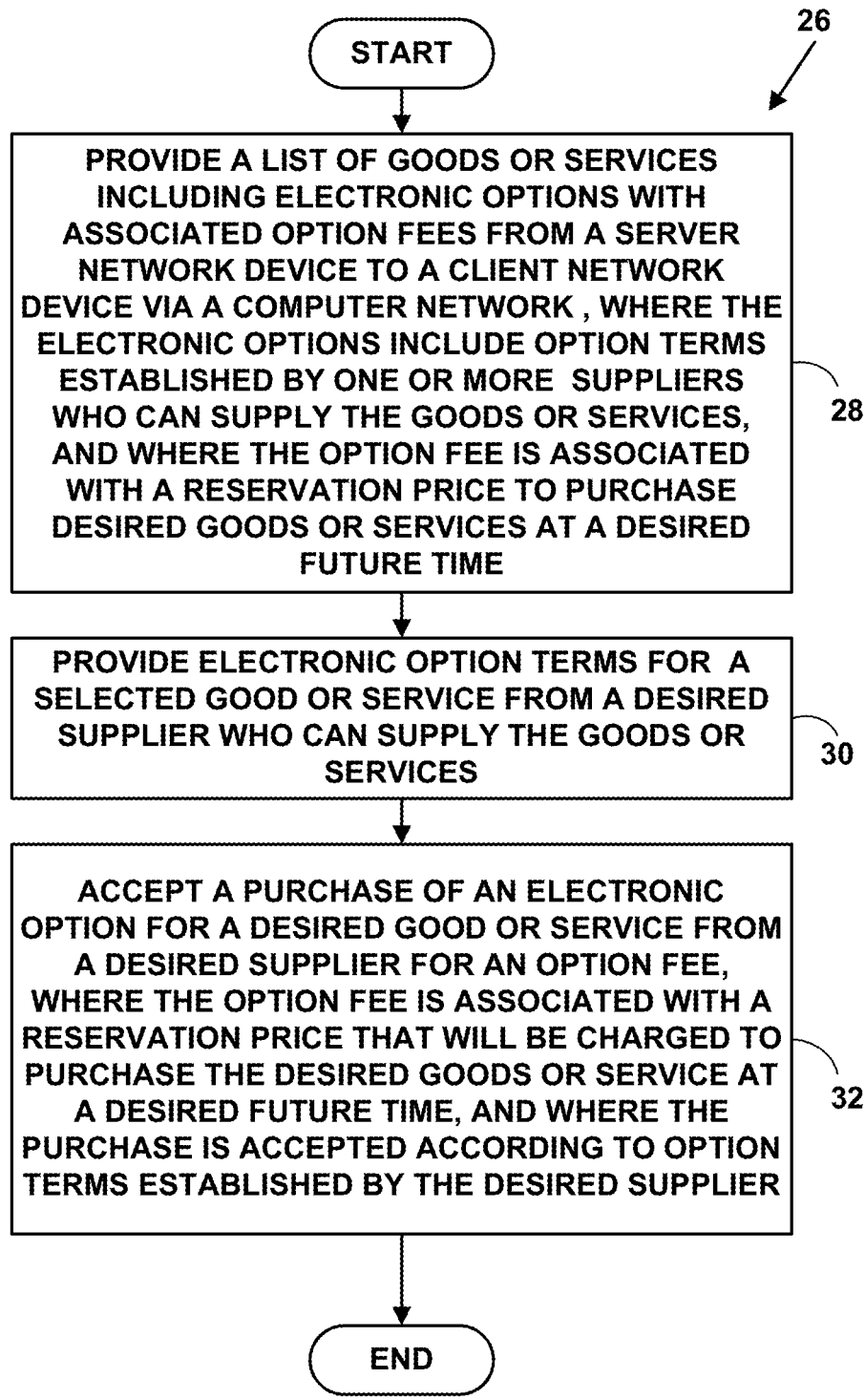

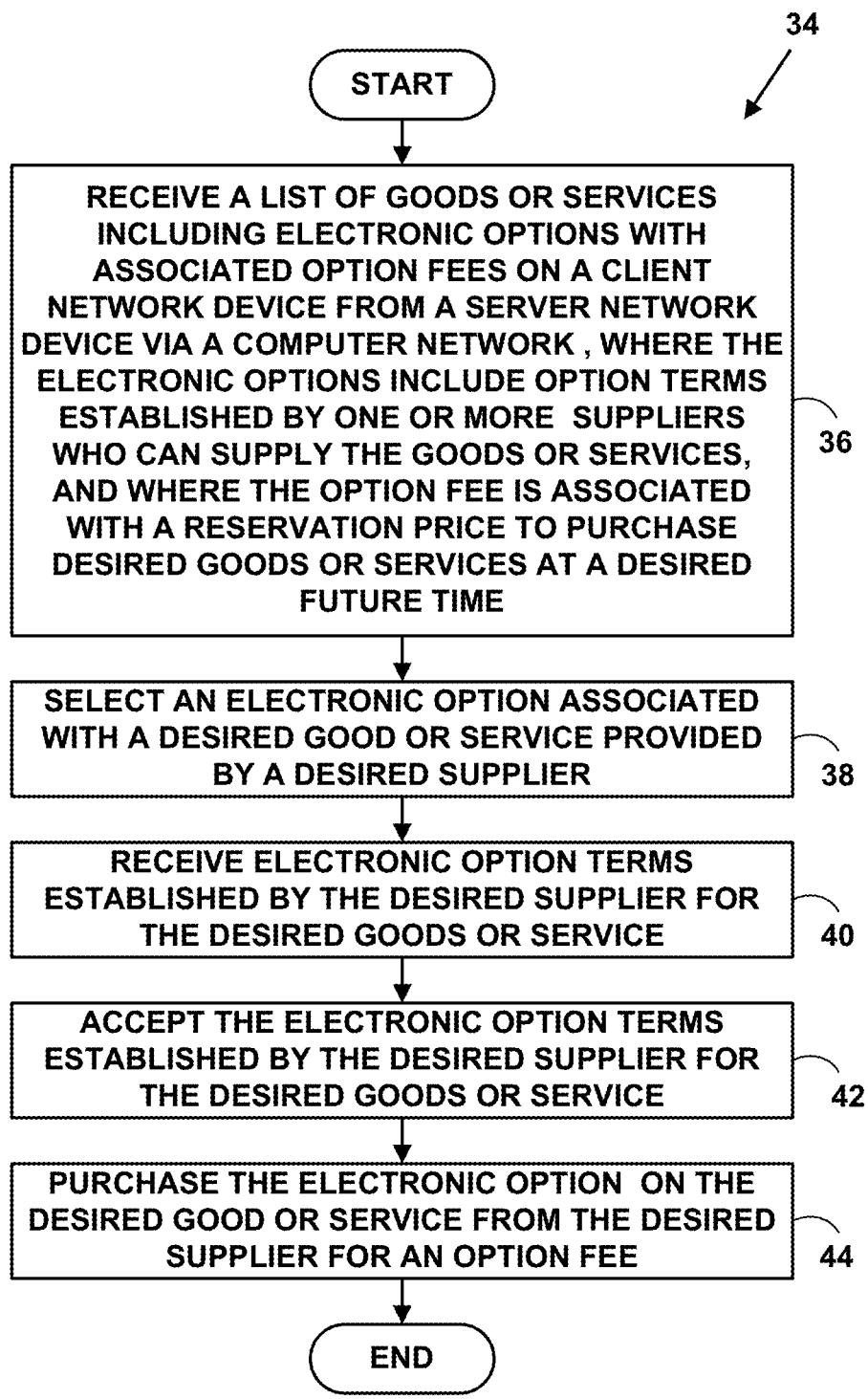

GUI

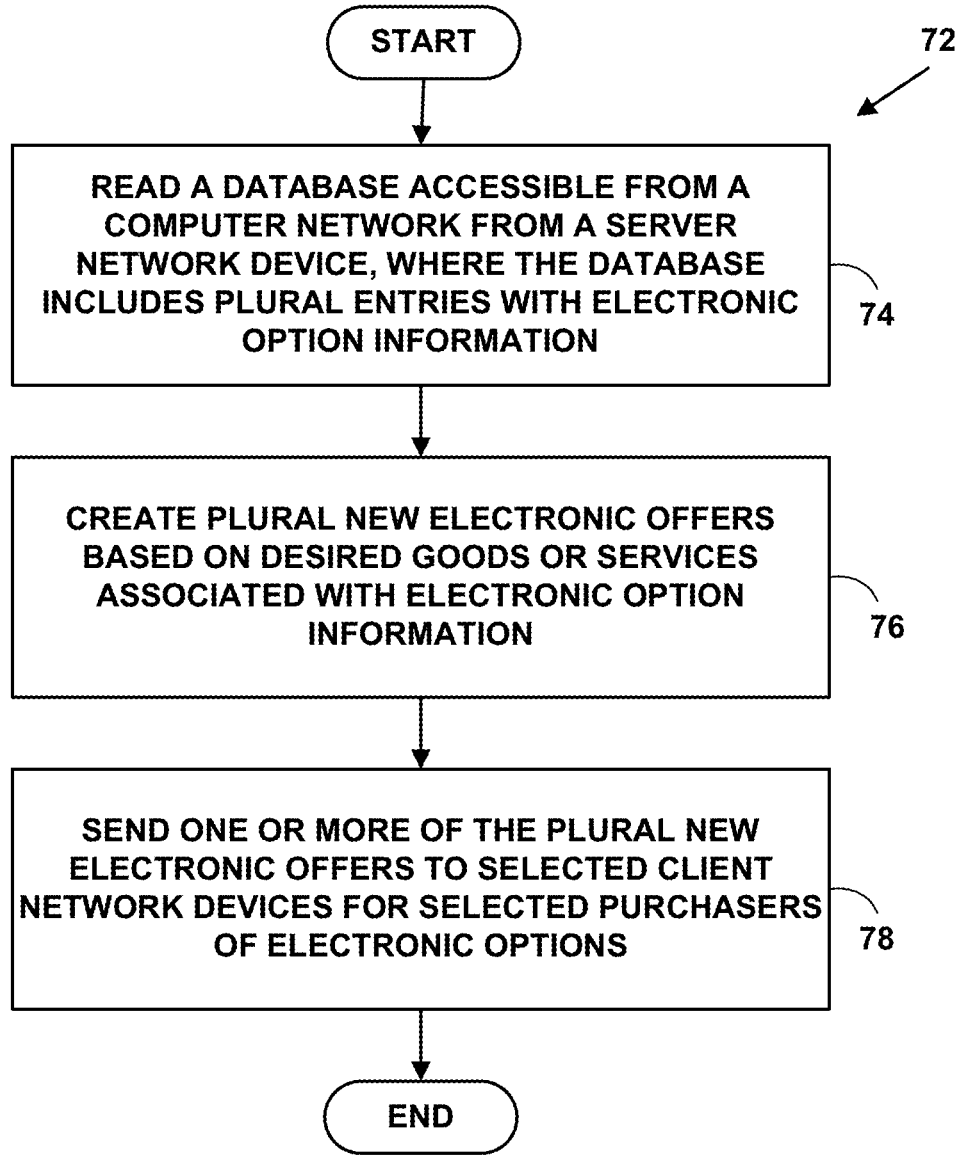

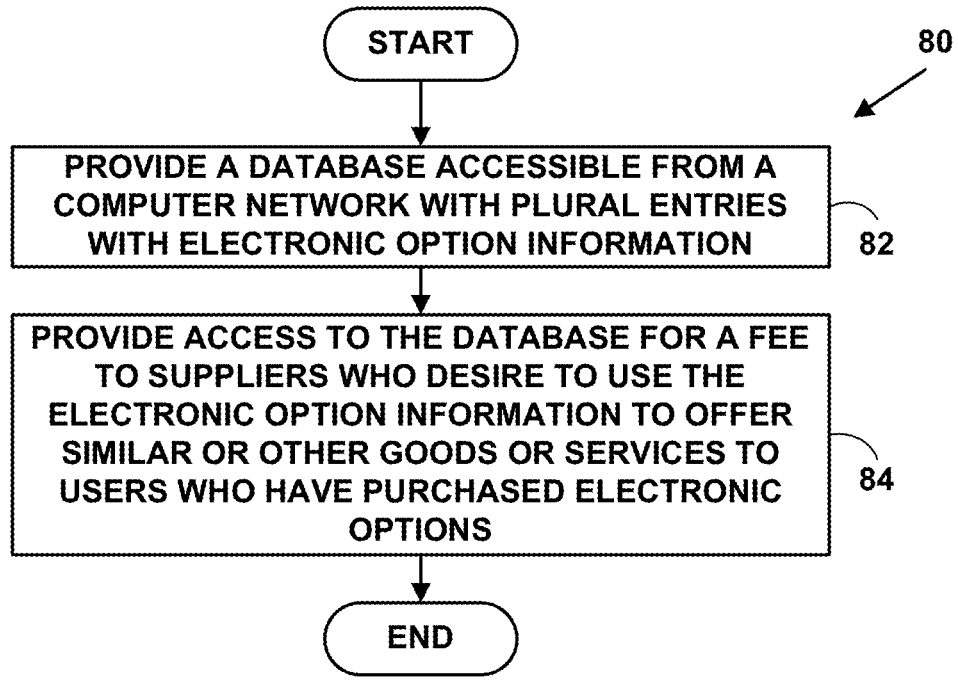

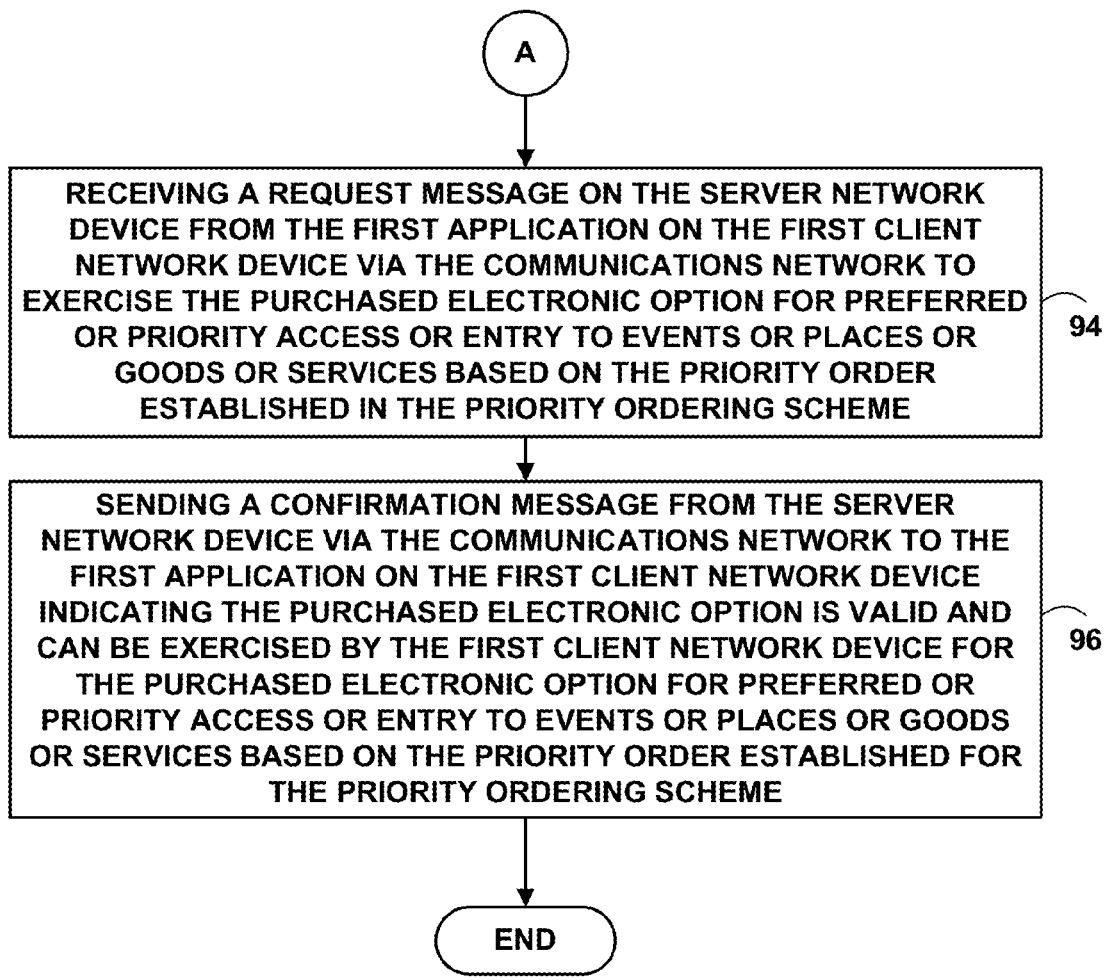

ELECTRONIC OPTION
EXERCISED AND
VERIFIED

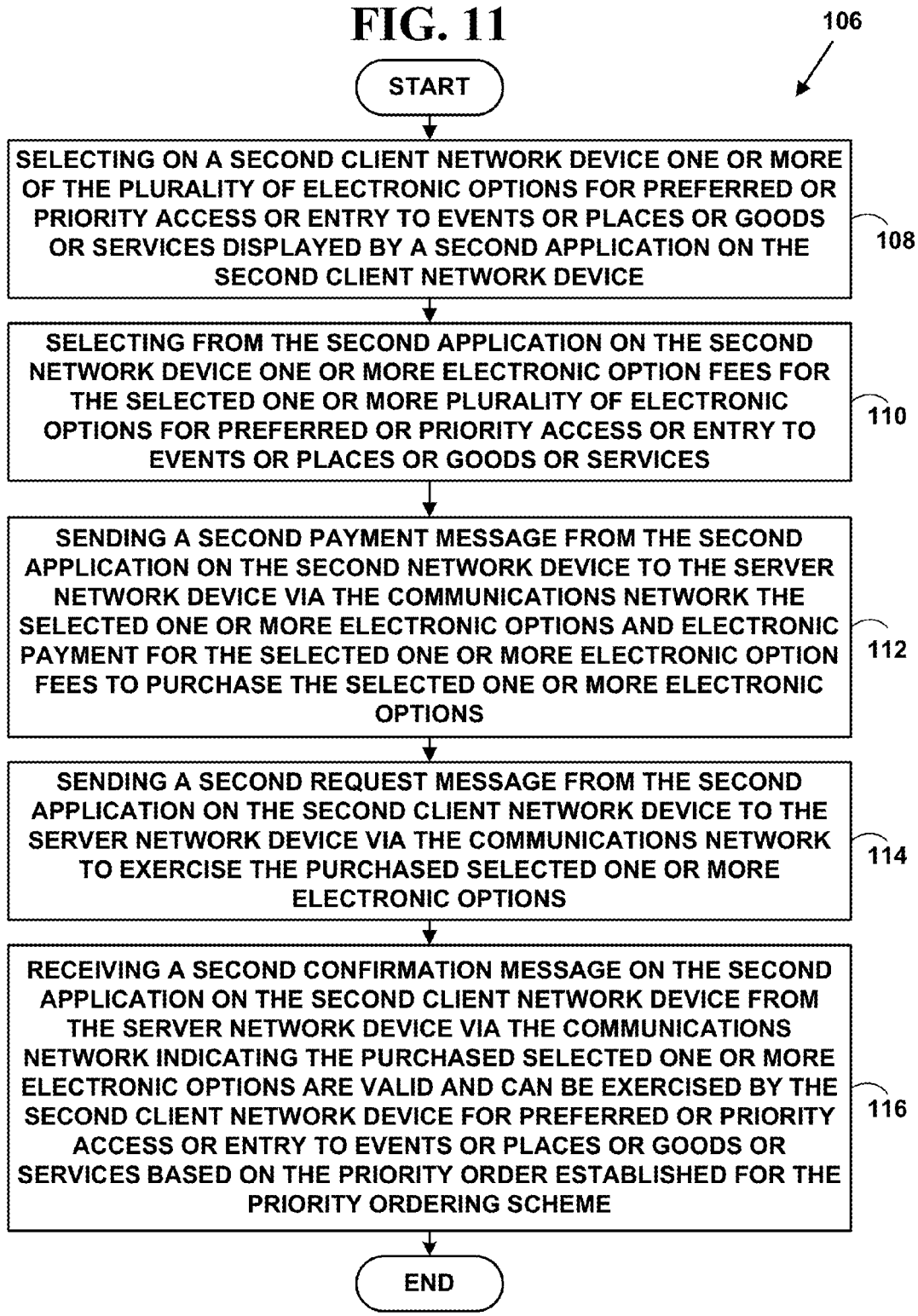

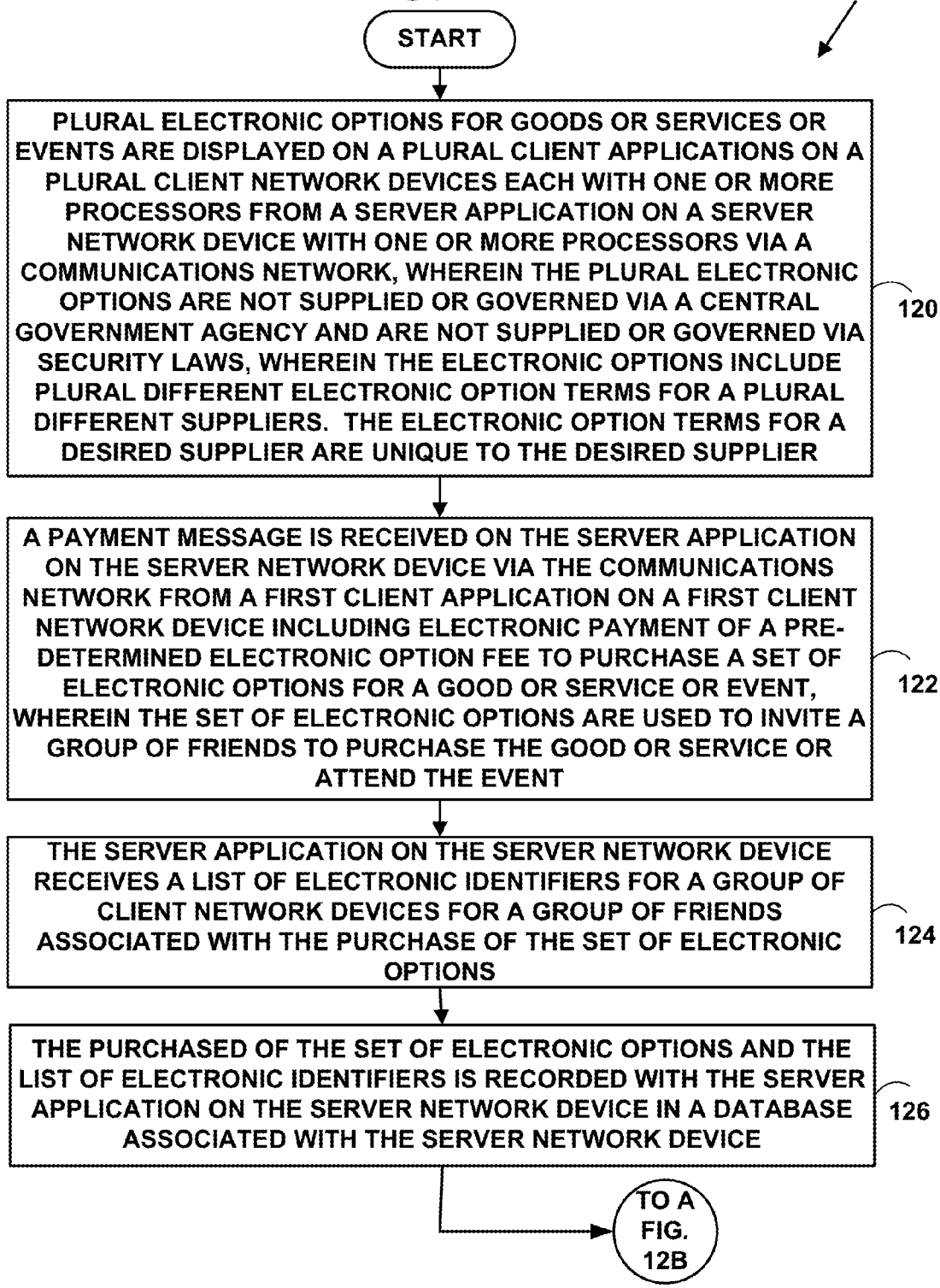

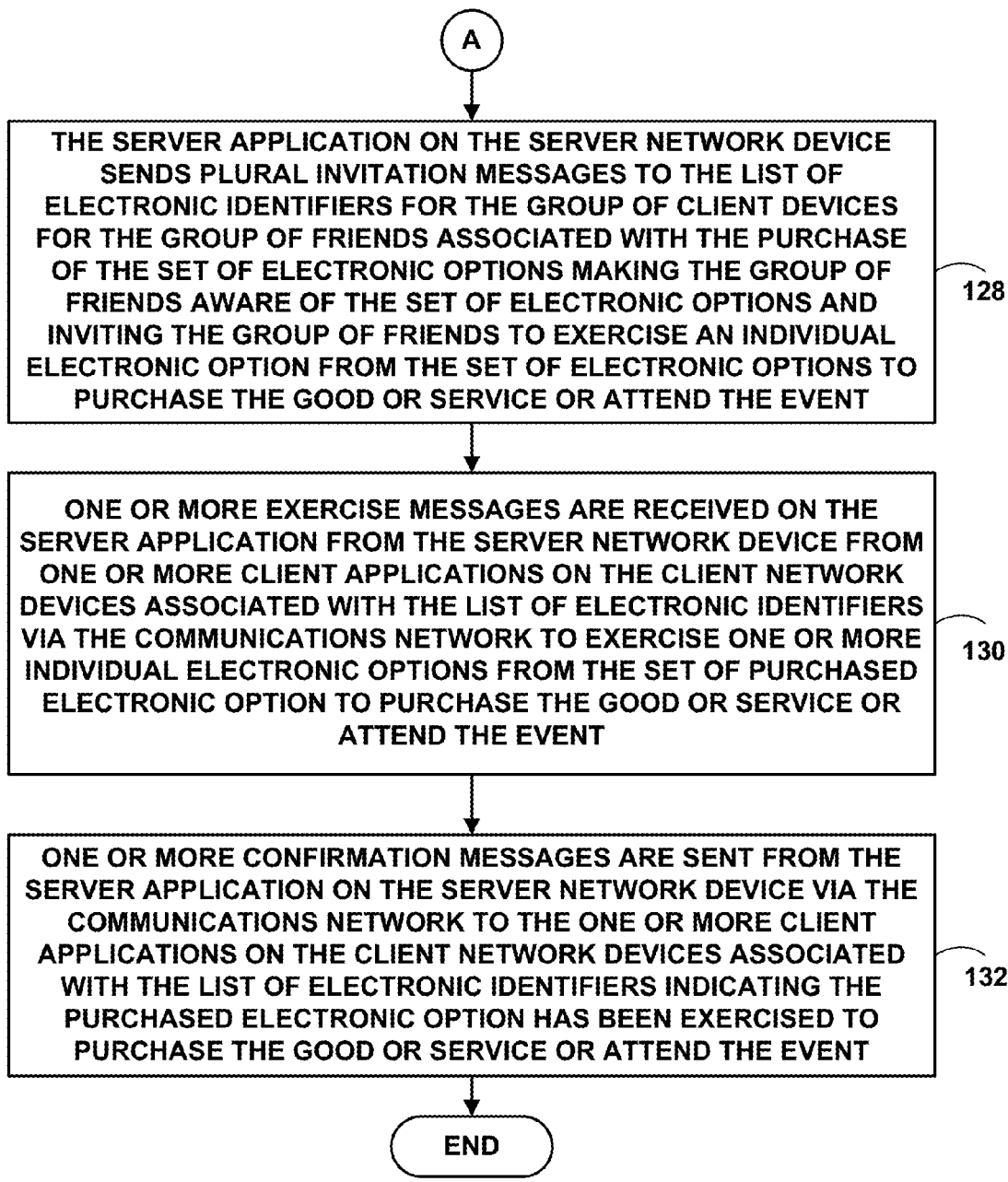

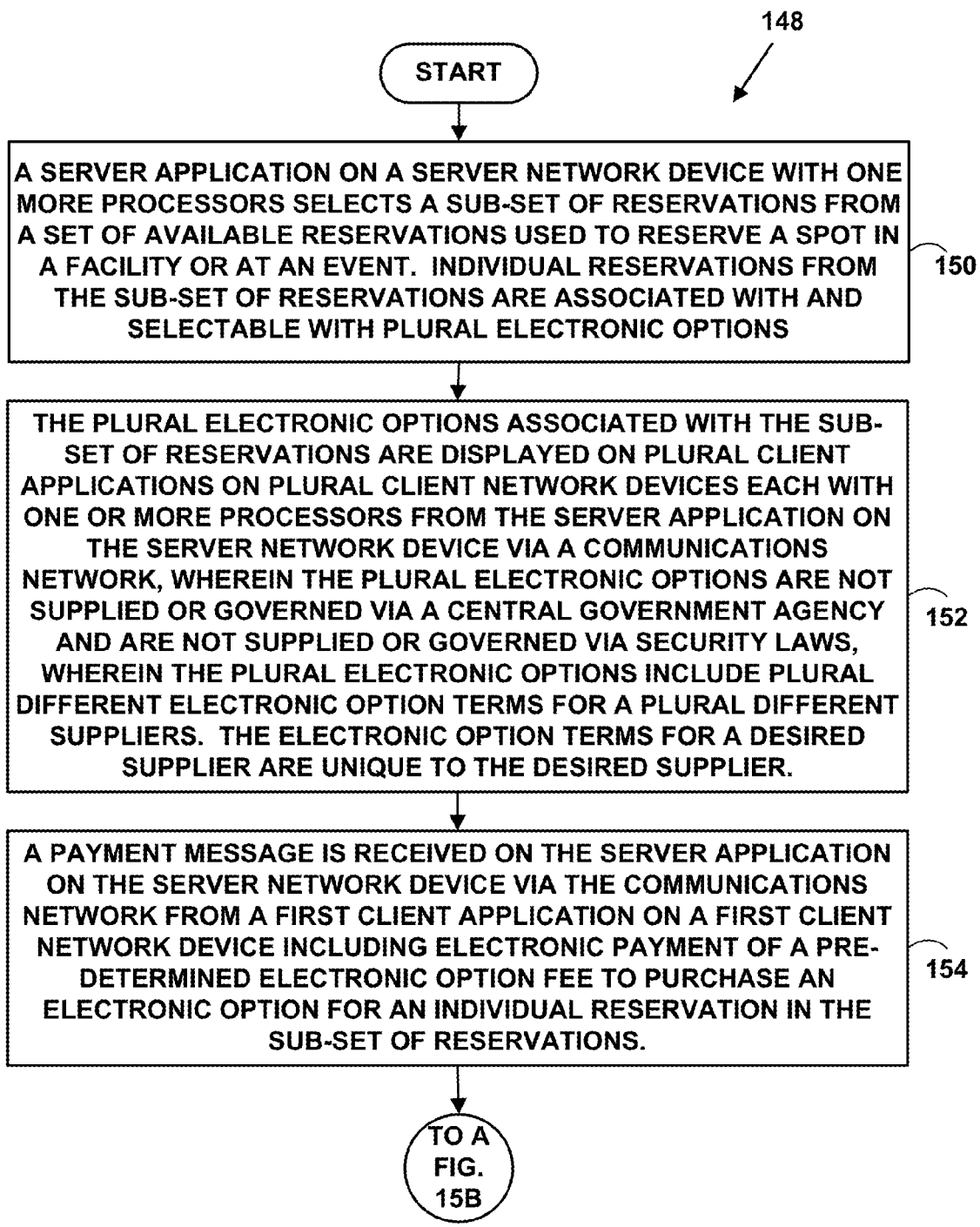

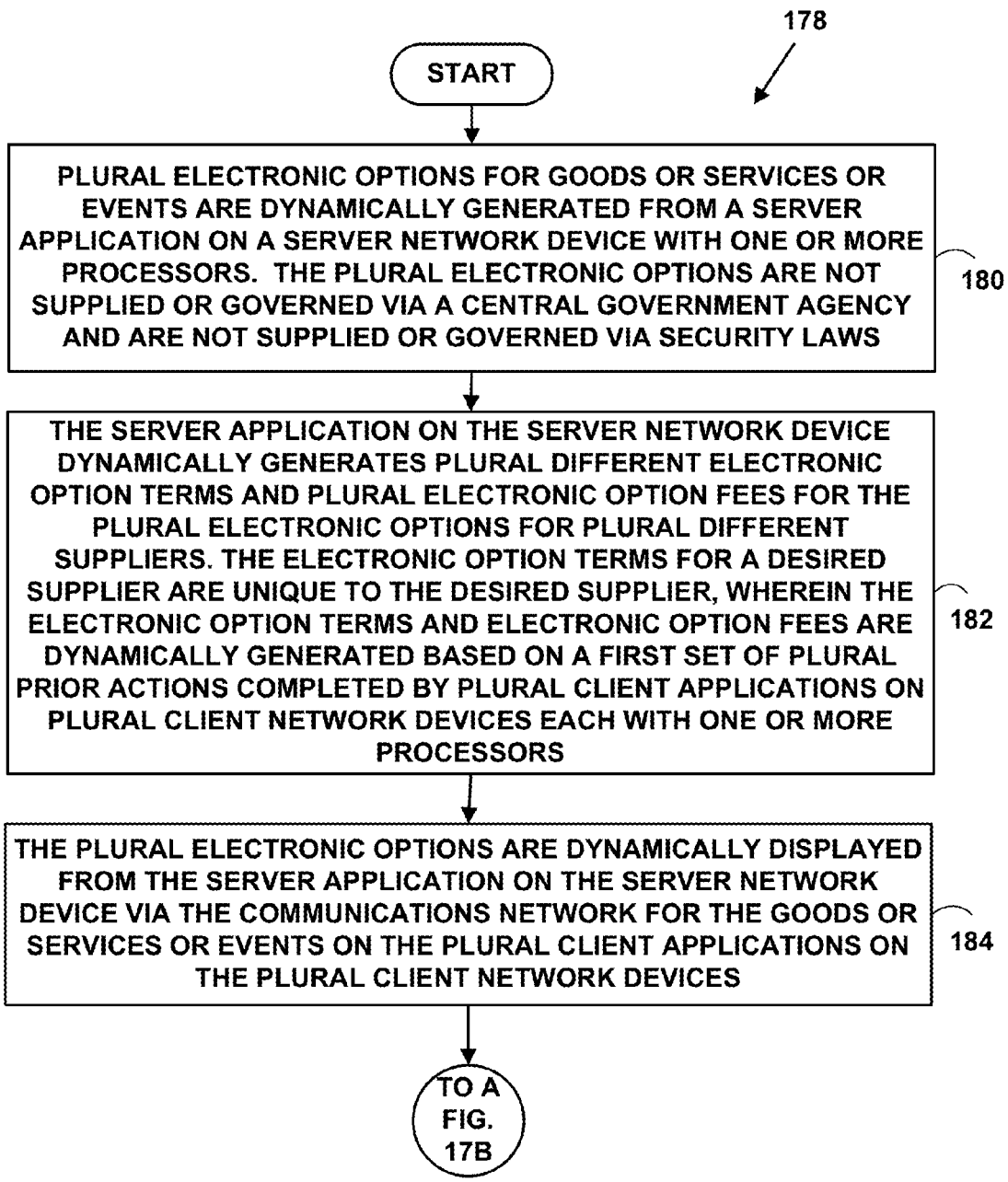

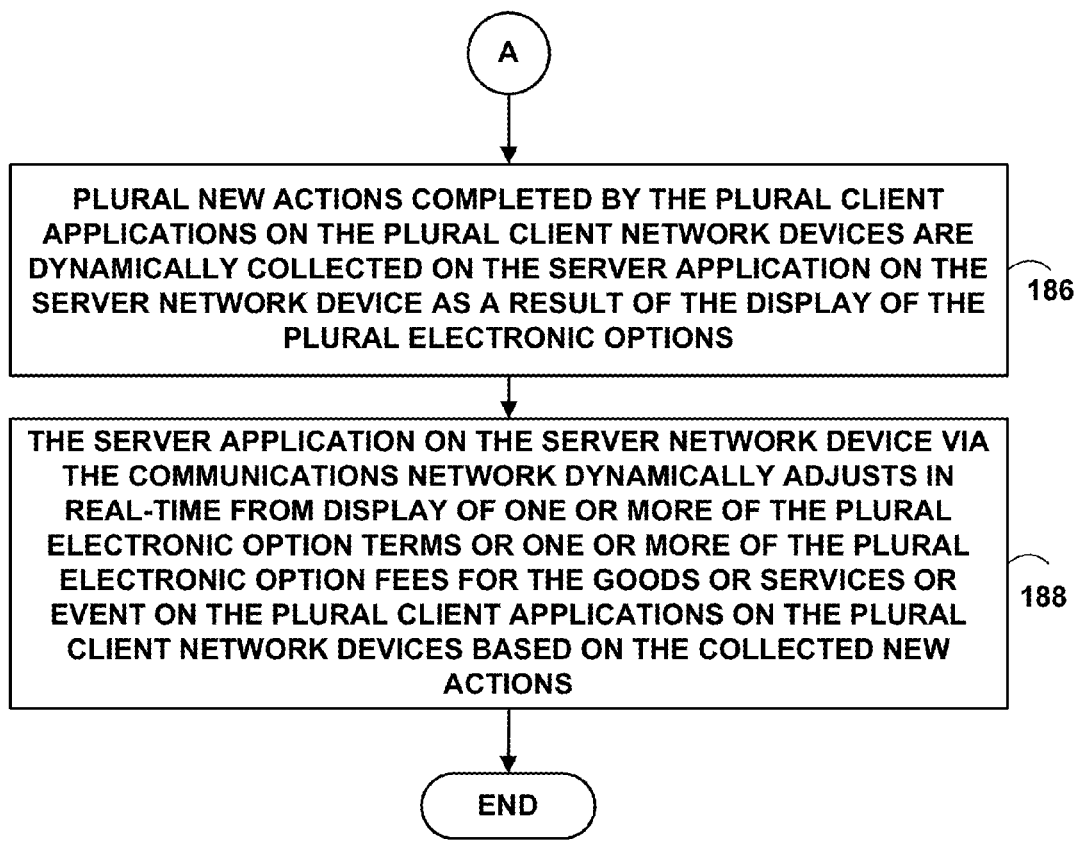

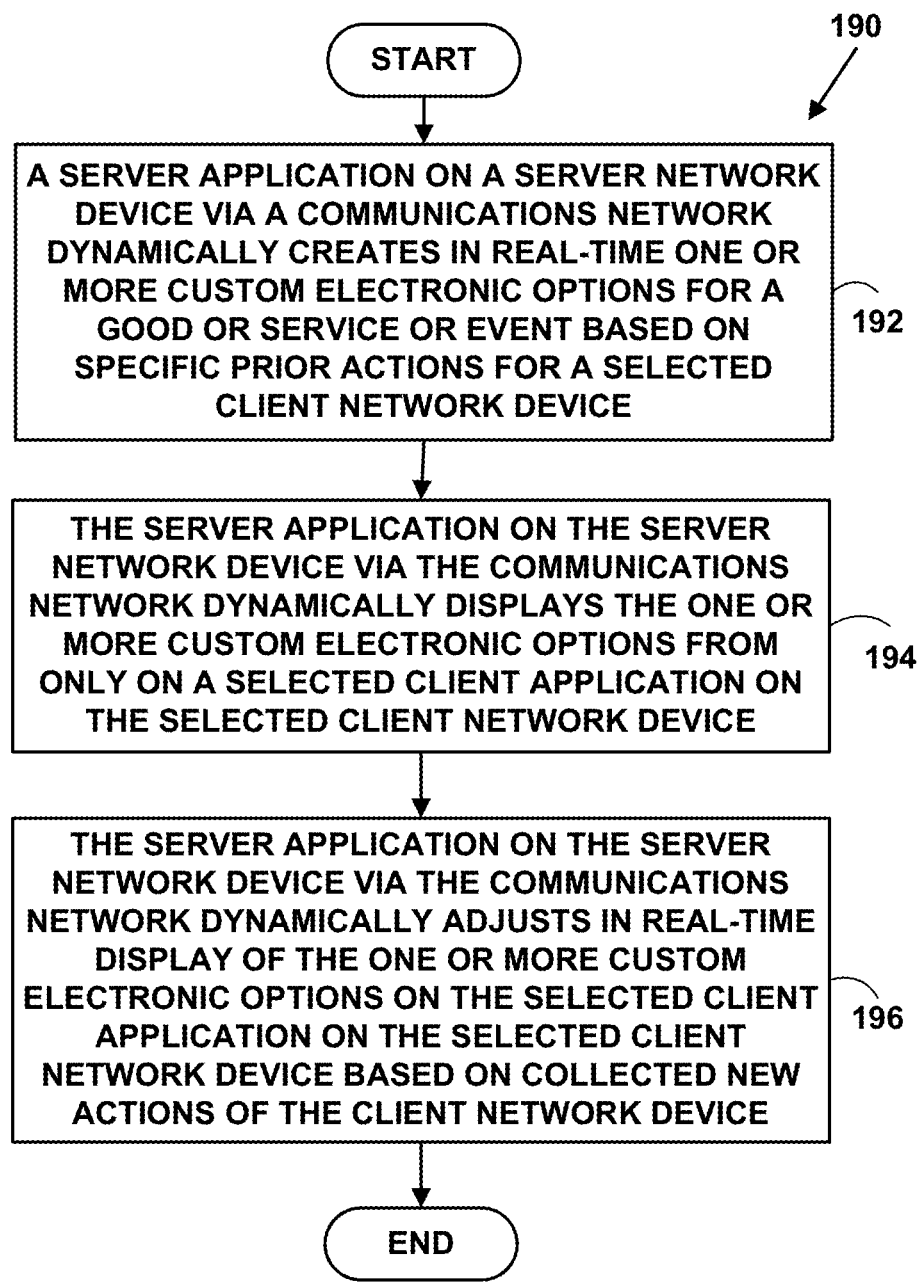

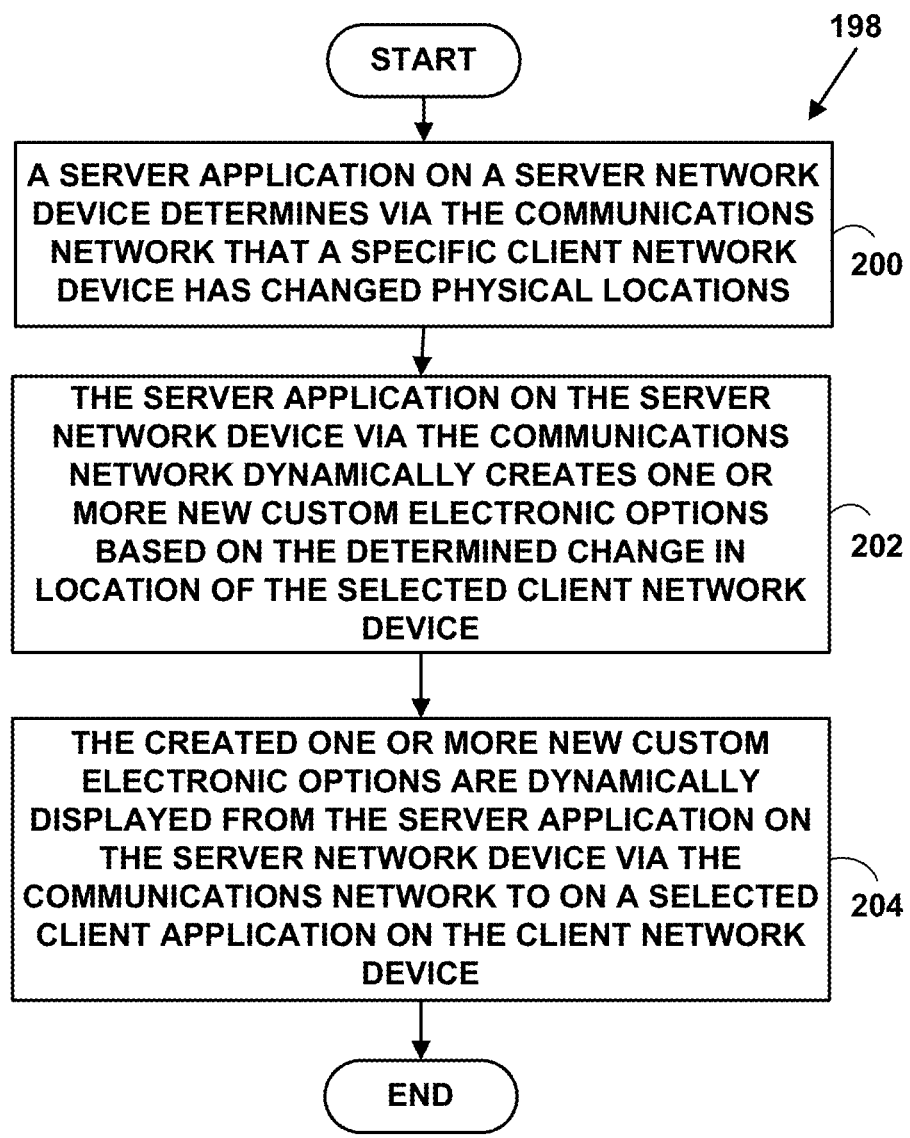

METHOD AND SYSTEM FOR RESERVING FUTURE PURCHASES OF GOODS AND SERVICES

CROSS REFERENCES TO RELATED APPLICATIONS

This application is a Continuation-In-Part (CIP) of U.S. patent application Ser. No. 13/737,164, filed Jan. 9, 2013, that is a CIP of U.S. patent application Ser. No. 13/549,751, filed Jul. 16, 2012, which is a Continuation of application Ser. No. 13/251,826, filed on Oct. 3, 2011, that issued as U.S. Pat. No. 8,229,841 on Jul. 24, 2012, which is a Continuation of U.S. application Ser. No. 12/970,165, filed on Dec. 16, 2010, that issued as U.S. Pat. No. 8,032,447 on Oct. 3, 2011, which is a Continuation of U.S. patent Ser. No. 11/805,564, filed May 23, 2007, that issued as U.S. Pat. No. 7,865,424, on Jan. 4, 2011, which is a Divisional of U.S. application Ser. No. 09/566,671 filed on May 8, 2000, that issued as U.S. Pat. No. 7,313,539, on Dec. 25, 2007, this application is ALSO a CIP of Ser. No. 13/158,528 filed on Jun. 13, 2011, that is CIP of U.S. application Ser. No. 12/005,129, filed on Dec. 21, 2007, which issued as U.S. Pat. No. 7,962,375, on Jun. 14, 2011, which is a CIP of U.S. application Ser. No. 09/566,671 filed on May 8, 2000, that issued as U.S. Pat. No. 7,313,539, on the Dec. 25, 2007, the contents of all which are incorporated by reference.

FIELD OF THE INVENTION

This invention relates to providing goods or services over a computer network. More specifically, this invention relates to providing electronic options for goods or services via a computer network such as the Internet or an intranet.

BACKGROUND OF THE INVENTION

The Internet has provided consumers a medium for shopping that is available twenty-four hours a day, seven days a week and 365 days a year. The Internet has also provided suppliers that ability to offer goods or services and receive orders from consumer in an automated, and potentially more cost-effective way.

There are many occasions for which a consumer may be interested in goods or services but not be able or willing to purchase the goods or services at the present time. For example, a supplier may be offering a new electronic component that may interest a consumer. The consumer may not presently have the money to purchase the new electronic component. However, the consumer may want to lock in a current favorable price or guaranty the availability of the electronic component. The consumer may also want to "lock-in" a desired price while he/she does comparison shopping on the electronic component at other locations.

As is known in the art, an option can be used to reserve a proprietary interest in an item at a future time. An option is typically a contract conveying a right to buy or sell a designated item at a specified time during a stipulated period. There are many examples of using options for financial instruments, such as stocks, bonds and other items known in the art. See for example, U.S. Pat. No. 6,049,783, entitled "Interactive Internet Analysis Method," U.S. Pat. No. 6,024,641, entitled "Method apparatus and system for lottery gaming," and U.S. Pat. No. 5,991,744, entitled "Method and apparatus that process financial data relating to wealth accumulations plans" U.S. Pat. No. 5,844,286, entitled "Apparatus and process for executing an expirationless option transaction," U.S. Pat. No. 5,671,363, entitled "Private stock option account control and exercise system," and others.

There are also examples of making conditional purchases known in the art. See for example, U.S. Pat. No. 6,041,308, entitled "System and method for motivating submission of conditional purchase offers," U.S. Pat. No. 6,012,045, entitled "Computer-based electronic bid auction and sale system," U.S. Pat. No. 5,897,620, entitled "Method and apparatus for the sale of airline-specified flight tickets," U.S. Pat. No. 5,297,031, entitled "Method and apparatus for order management by market brokers" and others.

However, there are several problems associated with using options known in the art to reserve a proprietary interest in a product at a future time. One problem is that unlike securities products (e.g., stocks, bonds, etc.) which are limited in number, there are far too many types of diverse products available on the Internet to logistically and effectively create one set of mutually agreeable contract terms for options to be used for such products.

Another problem is that options typically are created to protect a high-value, high-volume, high-risk products against price volatility. Price volatility is generally not large enough for most consumer or business products to use options. Without large price volatility, there is typically no incentive for a supplier to supply options for low volume, low margin, or low risk products.

Another problem is that options typically have uniform terms set by a central governing agency (e.g., the Security Exchange Commission). Such uniform terms are typically not suitable for an individual supplier of a product. A supplier may desire to provide his/her own option terms for specific products to help manage his/her inventory, risk or revenue.

Another problem is that the Internet and other computer networks have generic, everyday, consumer or business products available to consumers worldwide. However, options have typically not been available on such products.

Another problem is that suppliers may want to sell options on products that are not fully developed or don't even exist yet. Presently, option systems do not allow an option to be purchased for a product that does not exist or may never exist.

Another problem is that the Internet and other computer networks have provided the ability for suppliers to use new e-commerce business models to supply products. Options typically have not been used to support new e-commerce business models.

Another problem is that options typically have been used only for goods and not for services. A consumer may desire to purchase an option for a type of service (e.g., accounting services, a musical performer's services, an actor's services, etc.).

Thus, it is desirable to provide a method for using options for goods or services that is available on a computer network, such as the Internet. The method should make it easy and convenient for a purchaser to buy an option on goods or services to reserve a right to purchase desired goods or services with option terms set by a supplier of the goods or services.

SUMMARY OF THE INVENTION

In accordance with preferred embodiments of the present invention, some of the problems associated with using options for goods or services are overcome. A method and system for reserving future purchases of goods or services or events is presented.

Electronic options are provided for desired goods or services or event. Electronic options are provided for desired goods or services or events. Electronic options, electronic option terms and electronic option fees are dynamically generated and dynamically adjusted based on prior and current actions completed on a client network device. A business-to-business (b2b) marketplace is established using electronic options.

The foregoing and other features and advantages of a preferred embodiment of the present invention will be more readily apparent from the following detailed description. The detail description proceeds with references to accompanying drawings.

BRIEF DESCRIPTION OF THE DRAWINGS

Preferred embodiments of the present invention are described with reference to the following drawings, wherein:

FIG. 2 is a flow diagram illustrating a method for providing electronic options for goods and services from a server network device;

FIG. 3 is a flow diagram illustrating a method for requesting electronic options for goods and services from a client network device;

FIG. 6 is a flow diagram illustrating a method for using electronic options by desired supplier;

FIG. 7 is a flow diagram illustrating a method for using electronic options by other suppliers;

FIGS. 8A and 8B are a flow chart illustrating method for providing electronic options for goods or services or events or entry to places with a priority system;

FIG. 11 is a flow chart illustrating method for providing electronic options for goods or services or events or entry to places with a priority system;

FIGS. 12A and 12B are a flow diagram illustrating a method for providing electronic options for goods or services or events;

FIGS. 15A and 15B are a flow diagram illustrating a method for providing electronic options for goods or services or events;

FIGS. 17A and 17B are a flow diagram illustrating a method for providing electronic options for goods or services or events;

FIG. 18 is a flow diagram illustrating a method for providing electronic options for goods or services or events;

FIG. 19 is a flow diagram illustrating a method for providing electronic options for goods or services or events.

DETAILED DESCRIPTION OF THE INVENTION

Exemplary Electronic Option System

Figure 1:
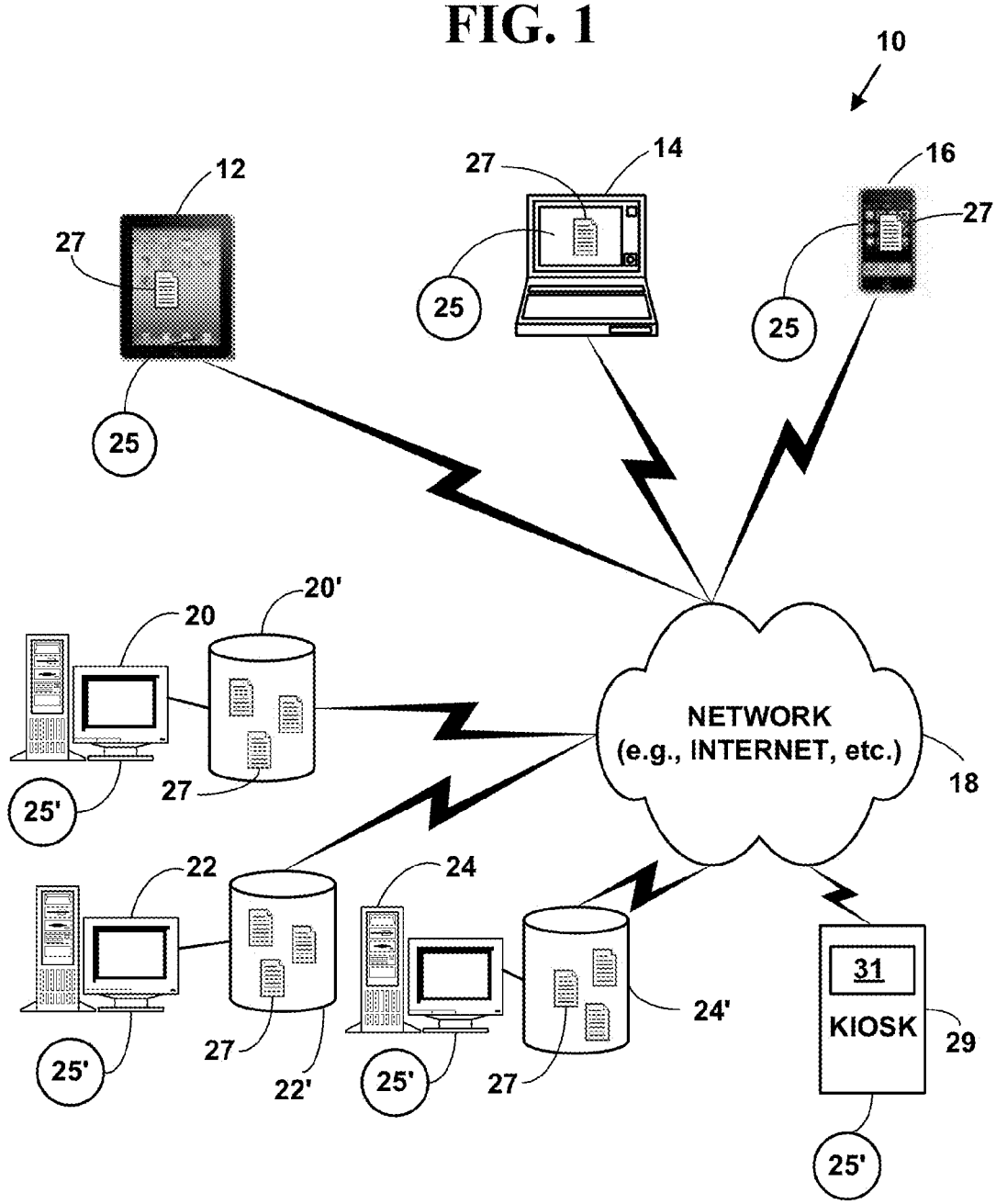
FIG. 1 is a block diagram illustrating an exemplary electronic option system.

FIG. 1 is a block diagram illustrating an exemplary electronic option system 10 for one exemplary embodiment of the present invention. The electronic option system 10 includes one or more client network devices 12, 14, 16 (only three of which are illustrated), each with one or more processors. The client network devices 12, 14, 16 include, but are not limited to, personal computers, laptop computers, wireless telephones, smart phones, personal information devices, personal digital assistants (PDA), hand-held devices, tablet devices, network appliances, and other types of electronic devices and network devices. However, the present invention is not limited to these devices and more, fewer or equivalent types of client electronic devices can also be used.

The client network devices 12, 14, 16 are in communications with a communications network 18 (e.g., the Internet, intranet, etc.). The communication includes, but is not limited to, communications over a wire with a wired interface and protocols connected to the client network devices 12, 14, 16, wireless communications with a wireless interface and protocols, and/or other types of communications (e.g., a combination of wired and wireless communications, etc.)

The client network devices, 12, 14, 16, include one or more applications 25. The applications 25 include smart software applications 25 including smart phone and/or electronic tablet applications 25. The applications 25 include a graphical user interface (GUI). A GUI is typically used to display information. Applications 25 include electronic option information displayed on a GUI (e.g., see FIGS. 4 and 5, etc.)

The one or more client network devices 12, 14, 16 include smart phones (e.g., 16, etc.) such as the iPhone by Apple, Inc., Blackberry Storm and other Blackberry models by Research In Motion, Inc. (RIM), Droid by Motorola, Inc. HTC, Inc. other types of smart phones, other types of mobile and non-mobile phones, etc. However, the present invention is not limited to such devices, and more, fewer or other devices can be used to practice the invention.

A "smart phone" is a mobile phone that offers more advanced computing ability and connectivity than a contemporary basic feature phone. Smart phones and feature phones may be thought of as handheld computers integrated with a mobile telephone, but while most feature phones are able to run applications based on platforms such as Java ME, a smart phone usually allows the user to install and run more advanced applications. Smart phones and/or tablet computers run complete operating system software providing a platform for application developers.

The operating systems include the iPhone OS, Android, Windows, etc. iPhone OS is a proprietary operating system for the Apple iPhone. Android is an open source operating system platform backed by Google, along with major hardware and software developers (such as Intel, HTC, ARM, Motorola and Samsung, etc.), that form the Open Handset Alliance.

The one or more client network devices 12, 14, 16 also include tablet computers (e.g., 12, etc.) such as the iPad, by Apple, Inc., the HP Tablet, by Hewlett Packard, Inc., the Playbook, by RIM, Inc., the Tablet, by Sony, Inc. However, the present invention is not limited to such devices, and more, fewer or other devices can be used to practice the invention.

The one or more client network devices 12, 14, 16 may communicate with other network devices with near field communications (NFC) and/or machine-to-machine (M2M) communications.

"Near field communication (NFC)" is a set of standards for smartphones and similar devices to establish radio communication with each other by touching them together or bringing them into close proximity, usually no more than a few centimeters. Present and anticipated applications include contactless transactions, data exchange, and simplified setup of more complex communications such as Wi-Fi. Communication is also possible between an NFC device and an unpowered NFC chip, called a "tag" including radio frequency identifier (RFID) tags.

NFC standards cover communications protocols and data exchange formats, and are based on existing radio-frequency identification (RFID) standards including ISO/IEC 14443 and FeliCa. These standards include ISO/IEC 1809 and those defined by the NFC Forum, all of which are incorporated by reference.

"Machine to machine (M2M)" refers to technologies that allow both wireless and wired systems to communicate with other devices of the same ability. M2M uses a device to capture an event (such as option purchase, etc.), which is relayed through a network (wireless, wired cloud, etc.) to an application (software program), that translates the captured event into meaningful information. Such communication was originally accomplished by having a remote network of machines relay information back to a central hub for analysis, which would then be rerouted into a system like a personal computer.

However, modern M2M communication has expanded beyond a one-to-one connection and changed into a system of networks that transmits data many-to-one and many-to-many to plural different types of devices and appliances. The expansion of IP networks across the world has made it far easier for M2M communication to take place and has lessened the amount of power and time necessary for information to be communicated between machines.

The one or more client network devices 12, 14, 16 may also include a smart phone and/or tablet computer software "application" 25 to interface with the methods described herein.

Plural server network devices 20, 22, 24, each with one or more processors each including a server application 25' and each associated with one or more associated databases 20', 22', 24', include electronic options 27 and/or pricing information for goods and/or services supplied by plural suppliers.

The plural server network devices 20, 22, 24 also include one or more interactive electronic kiosks each with one or more processors and a graphical user interface (GUI) (only one of which is illustrated 29) connected to the computer network 18 with a wired or wireless connection. "Interactive electronic kiosks" typically include network information terminals featuring specialized hardware and software designed within a public or private space that provides access to information and applications for communication, commerce, entertainment and education. A GUI is typically used to display information.

Figure 4A:
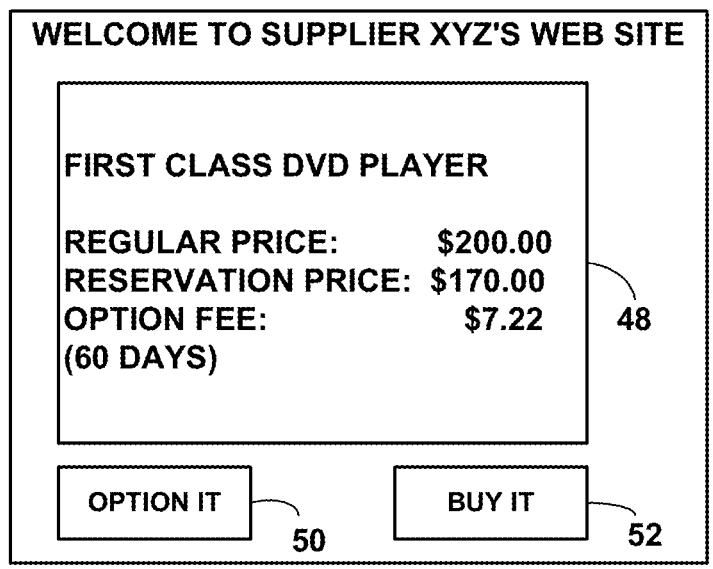
FIGS. 4A, 4B and 4C are block diagrams of a graphical user interface (GUI) visually illustrating the methods of FIG. 2 and FIG. 3.
Figure 4B:
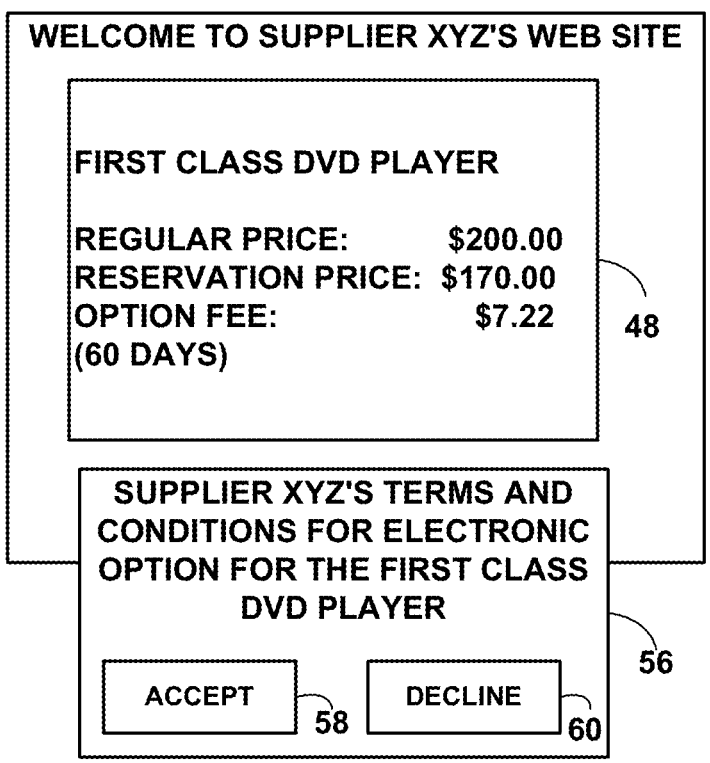
Figure 4C:
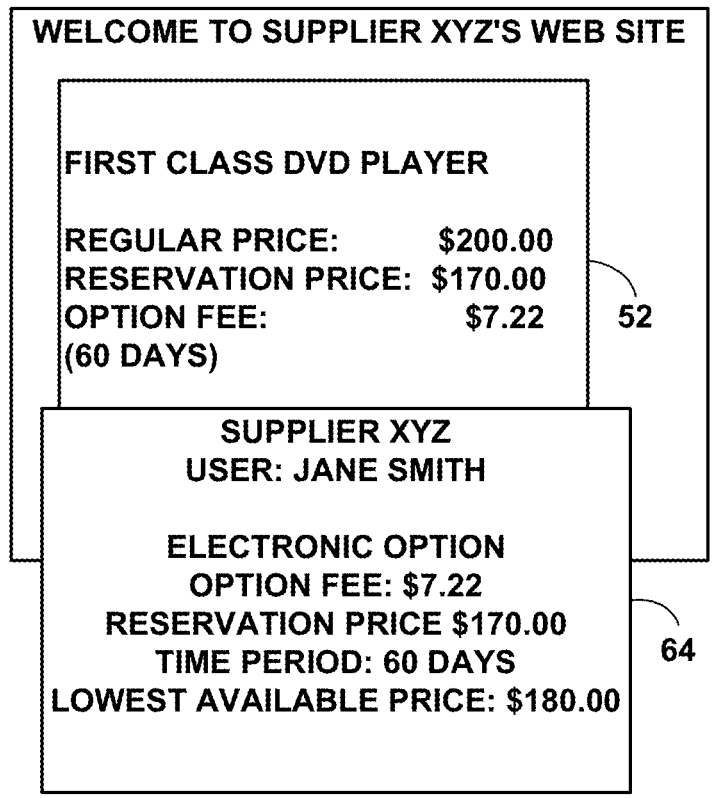
Figure 5:
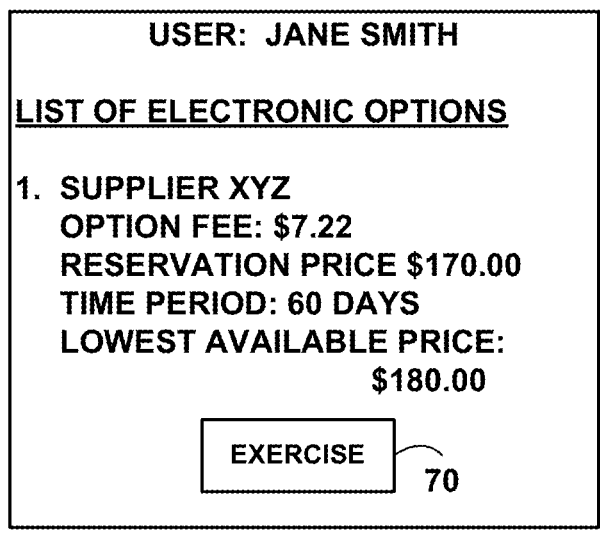
FIG. 5 is a block diagram illustrating exemplary electronic option confirmation information for the electronic option of FIG. 4C.

Kiosk 29 includes electronic option information displayed on a GUI (e.g., see FIGS. 4 and 5, etc.) Plural kiosks 29 are placed in public areas (e.g., restaurants, airports, bus stations, train stations, sports venues, entertainment venues, retail stores, etc.) and include software and hardware to practice the current invention for electronic options. The same kiosks 29 may also provide for the direct purchase of tickets of various kinds including goods, reservations for services, tickets for events, etc. However, the kiosks 29 are not required to provide for the direct purchase of goods or services or events. The present invention is also not limited to such interactive electronic kiosks and more, fewer or other types of interactive electronic kiosks can be used to practice the invention.

An operating environment for components of the electronic option system 10 for preferred embodiments of the present invention include a processing system with at least one high speed Central Processing Unit ("CPU"), other processor and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed" or "CPU executed" or "processor executed."

It will be appreciated that acts and symbolically represented operations or instructions include the manipulation of electrical signals or biological signals by the CPU. An electrical system or biological system represents data bits which cause a resulting transformation or reduction of the electrical signals or biological signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a non-transitory computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

Wired and Wireless Interfaces

In one embodiment of the present invention, the wired and wireless interfaces include wired and wireless interfaces and corresponding networking protocols for wired connections to the computer network 18 including, a Public Switched Telephone Network (PSTN) or a cable television network (CATV) including HDTV that connect the network devices 12, 14, 16 via one or more twisted pairs of copper wires, digital subscriber lines (e.g. DSL, ADSL, VDSL, etc.) coaxial cable, fiber optic cable, other connection media or other wired connection interfaces. The PSTN is any public switched telephone network provided by AT&T, GTE, Sprint, MCI, SBC, Verizon and others.

The computer network 18 may also include a paging and wireless messaging network, a wireless cellular telephone network, a Packet Cellular Network (PCN), Global System for Mobile Communications, (GSM), Generic Packet Radio Services (GPRS), network/Personal Communications Services network (PCS), a Cellular Digital Packet Data (CDPD), Wireless Application Protocol (WAP), Digital Audio Broadcasting (DAB) network, Transmission Control Protocol (TCP)/User Datagram Protocol (UDP)/Internet Protocol (IP) network, or other types of computer networks.

The wireless cellular telephone network includes, but is not limited to Code Division Multiple Access (CDMA), Time Division Multiple Access (TDMA), or other wireless technologies.

As is known in the art, PCS networks include network that cover a range of wireless, digital communications technologies and services, including cordless phones, mobile phones, voice mail, paging, faxing, mobile personal digital/data assistants (PDAs), etc. PCS devices are typically divided into narrowband and broadband categories.

Narrowband devices, which operate in the 900 MHz band of frequencies, typically provide paging, data messaging, faxing, and one- and two-way electronic messaging capabilities. Broadband devices, which operate in the 1850 MHz to 1990 MHz range typically provide two-way voice, data, and video communications. Other wireless technologies such as GSM, CDMA and TDMA are typically included in the PCS category.

As is known in the art, GSM is another type of digital wireless technology widely used throughout Europe, in Australia, India, Africa, Asia, and the Middle East. GSM is gaining popularity in the United States. GSM is a wireless platform based on TDMA to digitize data. GSM includes not only telephony and Short Message Services (SMS) but also voice mail, call forwarding, fax, caller ID, Internet access, and e-mail.

As is known in the art, SMS is type of communications service that enables a user to allow private message communications with another user. GSM typically operates at three frequency ranges: 900 MHz (GSM 900) in Europe, Asia and most of the rest of the world; 1800 MHz (GSM 1800 or DCS 1800 or DCS) in a few European countries; and 1900 MHz (GSM 1900 also called PCS 1900 or PCS) in the United States. GSM also operates in a dual-band mode including 900/1800 Mhz and a tri-band mode include 900/1800/1900 Mhz.

As is known in the art, GPRS is a standard for wireless communications, which runs at speeds up to 150 kilo-bits-per-second ("kbit/s"). GPRS, which supports a wide range of bandwidths is an efficient use of limited bandwidth and is particularly suited for sending and receiving small bursts of data such as e-mail and Web browsing, as well as large volumes of data.

As is known in the art, CDPD is a wireless standard providing two-way, 19.2-Kbps or higher packet data transmission over existing cellular telephone channels. As is known in the art, a Packet Cellular Network (PCN) includes various types of packetized cellular data.

In one embodiment, of the invention, the wireless interfaces include WPAN wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, two-way pager, etc.)

Typically, a wireless personal area network uses some technology that permits communication only within about 10 meters. One such technology is "Bluetooth." Another such technology is "Zigbee."

A key concept in WPAN technology is known as "plugging in." In the ideal scenario, when any two WPAN-equipped devices come into close proximity (within several meters of each other) or within a few kilometers of a central server (not illustrated), they can communicate via wireless communications as if connected by a cable. WPAN devices can also lock out other devices selectively, preventing needless interference or unauthorized access to secure information.

In one embodiment of the present invention, the wireless interfaces include but are not limited to, an IEEE 802.11a, 802.11b, 802.11g, 802.11n, 802.15.4 (ZigBee), 802.16a, 802.16g, "Wireless Fidelity" (WiFi), "Worldwide Interoperability for Microwave Access" (WiMAX), ETSI High Performance Radio Metropolitan Area Network (HIPERMAN) "RF Home," or other types of wireless interfaces. However, the present invention is not limited to such wireless interface and other types of wireless interfaces can also be used.

In another embodiment of the present invention, the wireless mesh network device 14, 16, 18, 22 includes a wireless sensor device that comprises an integral or separate Bluetooth and/or infra data association (IrDA) module for wireless Bluetooth or wireless infrared communications.

As is known in the art, an 802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11xx interfaces can also be used and the present invention is not limited to the 802.11 protocols defined. The IEEE 802.11a, 802.11b and 802.11g standards are incorporated herein by reference.

As is known in the art, WiFi is a type of 802.11xx interface, whether 802.11b, 802.11a, dual-band, etc. WiFi devices include an RF interfaces such as 2.4 GHz for 802.11b or 802.11g and 5 GHz for 802.11a. More information on Wi-Fi can be found at the URL "www.weca.net."

As is known in the art, 802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps, two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference. More information on 802.15.4 and ZigBee can be found at the URL "www.ieee802.org" and "www.zigbee.org" respectively.

As is known in the art, WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the URL "www.wimaxforum.org." WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the URL "www.etsi.org." ETSI HIPERMAN can be used to provide a WLP.

As is known in the art, Bluetooth is a short-range radio frequency technology aimed at simplifying communications among network devices and between network devices. Bluetooth wireless technology supports both short-range point-to-point and point-to-multipoint connections. The Bluetooth Specification, GL 11r02, March 2005, prepared by the Bluetooth SIG, Inc. is incorporated herein by reference.

In one embodiment, network devices 12, 14, 16, 20, 22, 24 include wired and wireless interfaces including the NICs include "4G" components. As is known in the art "4G" refers to the fourth generation of wireless communications standards and speeds of 100 megabits/second to gigabits/second or more. It is a successor to 3G and 2G standards. The nomenclature of the generations generally refers to a change in the fundamental nature of the service. The first was the move from analogue (1G) to digital (2G) transmission. This was followed by multi-media support, spread spectrum transmission and at least 200 kbits/second (3G). The 4G NICs include IP packet-switched NICs, wired and wireless ultra-broadband (i.e., gigabit speed) access NICs, Worldwide Interoperability for Microwave Access (WiMAX) NICs and multi-carrier transmission NICs. However, the present invention is not limited to this embodiment and 1G, 2G and 3G and/or any combination thereof, with or with out 4G NICs can be used to practice the invention.

As is known in the art, IP is an addressing protocol designed to route traffic within a network or between networks. For more information on IP see IETF RFC-791 incorporated herein by reference.

TCP provides a connection-oriented, end-to-end reliable protocol designed to fit into a layered hierarchy of protocols that support multi-network applications. For more information on TCP see RFC-793, incorporated herein by reference.

UDP provides a connectionless mode of communications with datagrams in an interconnected set of networks. For more information on UDP see ITEF RFC-768 incorporated herein by reference.

Security and Encryption

Devices and interfaces of the present invention include plural security and/or encryption methods for secure communications via the communications network 18. Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

As is known in the art, RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wireless or Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES). More information on NIST AES can be found at the URL "www.nist.gov/aes."

As is known in the art, DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

As is known in the art, RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

As is known in the art, "hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

As is known in the art, providing a way to check the integrity of information transmitted over or stored in an unreliable medium such as a wireless network is a prime necessity in the world of open computing and communications. Mechanisms that provide such integrity check based on a secret key are called "message authentication codes" (MACS). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

As is known in the art, an Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

As is known in the art, Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

However, the present invention is not limited to the security or encryption techniques described and other security or encryption techniques can also be used.

As is known in the art, the HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

As is known in the art, the SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security method are negotiated between the source and destination at the start of establishing a protocol session. The SSL 2.0 protocol specification, by Kipp E. B. Hickman, 1995 is incorporated herein by reference. More information on SSL is available at the URL See "netscape.com/eng/security/SSL_2.html."

As is known in the art, Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, Calif. is supplier of networking hardware and software, including router and security products.

Television Services

In one embodiment, the applications 25 provide electronic option services from television services over the communications network 18. The television services include digital television services, including, but not limited to, cable television, satellite television, high-definition television, three-dimensional, televisions and other types of network devices.

However, the present invention is not limited to such television services and more, fewer and/or other television services can be used to practice the invention.

Internet Television Services

In one embodiment, the applications 25 provide electronic option services from Internet television services over the communications network 18. The television services include Internet television, Web-TV, and/or Internet Protocol Television (IPtv) and/or other broadcast television services.

"Internet television" allows users to choose a program or the television show they want to watch from an archive of programs or from a channel directory. The two forms of viewing Internet television are streaming content directly to a media player or simply downloading a program to a viewer's set-top box, game console, computer, or other mesh network device.

"Web-TV" delivers digital content via non-mesh broadband and mobile networks. The digital content is streamed to a viewer's set-top box, game console, computer, or other mesh network device.

"Internet Protocol television (IPtv)" is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and cable television formats.

However, the present invention is not limited to such Internet Television services and more, fewer and/or other Internet Television services can be used to practice the invention.

General Search Engine Services

In one embodiment, the applications 25 provide electronic option services from general search engine services. A search engine is designed to search for information on a communications network 18 such as the Internet including World Wide Web servers, HTTP, FTP servers etc. The search results are generally presented in a list of electronic results. The information may consist of web pages, images, electronic information, multimedia information, and other types of files. Some search engines also mine data available in databases or open directories. Unlike web directories, which are maintained by human editors, search engines typically operate algorithmically and/or are a mixture of algorithmic and human input.

In one embodiment, the applications 25 provide electronic option services from general search engine services. In another embodiment, the applications 25 provide general search engine services by interacting with one or more other public search engines (e.g., GOOGLE, BING, YAHOO, etc.) and/or private search engine services.

In another embodiment, the applications 25 provide electronic option services from specialized search engine services, such as vertical search engine services by interacting with one or more other public vertical search engines (and/or private search engine services).

However, the present invention is not limited to such general and/or vertical search engine services and more, fewer and/or other general search engine services can be used to practice the invention.

Social Networking Services

In one embodiment, the applications 25 provide electronic option services from one more social networking services including to/from one or more social networking web-sites (e.g., FACEBOOK, U-TUBE, TWITTER, MY-SPACE, MATCH.COM, E-HARMONY, GROUP ON, SOCIAL LIVING, etc.). The social networking web-sites also include, but are not limited to, social couponing sites, dating web-sites, blogs, RSS feeds, and other types of information web-sites in which messages can be left or posted for a variety of social activities.

However, the present invention is not limited to the social networking services described and other public and private social networking services can also be used to practice the invention.

Providing Electronic Options for Goods and Services from a Server Network Device FIG. 2 is a flow diagram illustrating a Method 26 for providing electronic options for goods and services. At Step 28, a server network device provides to a client network device via a communications network, a list of available goods or services including plural electronic options with associated option fees for the goods or services. The plural electronic options include electronic option terms established by one or more suppliers who can supply the goods or services. An option fee is associated with a reservation price to purchase desired goods or services at a desired future. At Step 30, electronic option terms for a selected good and/or service and/or event for a desired supplier who can supply the selected good and/or service and/or event are provided. At Step 32, a purchase of an electronic option for an option fee for a desired good and/or service and/or event for a desired supplier is accepted on the server network device. The purchase of the electronic option is accepted according to electronic option terms established by the desired supplier. A confirmation for purchase of the electronic option for the option fee is provided to the client network device. Information about the electronic option is stored in a database associated with the server network device.

A type of electronic option 27 used with Method 26 is governed by the option terms established by an individual supplier. The option terms may vary greatly among the individual suppliers and no two suppliers may want to use the same option terms. Use of variable option terms provides significant flexibility for use of the electronic options with Method 26.

The electronic options 27 are not supplied or governed via a central government agency and are not supplied or governed via security laws. The electronic option information further includes a plural different electronic option terms for the plural different suppliers. The electronic option terms for a desired supplier are unique to the desired supplier Method 26 and a communications network 18 such as the Internet allows a supplier to supply options for virtually any good and/or service and/or event based on his/her own terms. The electronic options 27 may be used for low price, low volume, low margin, or low risk products. The goods may include virtually any consumer or business products (e.g., toys, electronic devices, etc.). The services may include virtually any services (e.g., accounting services, a musical performer's services, an actor's services, etc.).

In one embodiment of the present invention, the list of goods and services with plural electronic options 27 provided at Step 28 includes a "counter" that includes a number of available options for a desired goods or services. In such an embodiment, the counter may count down to zero in real-time as electronic options 27 are purchased.

In one embodiment of the present invention, a supplier may desire to desire to provide an electronic option only on desired products, but not all products. The electronic options 27 can be used to better manage inventory, risk or revenues.

In one embodiment of the present invention, a supplier is a "vendor." In such an embodiment, a vendor allows electronic options 27 to be purchased for goods or services the vendor creates, manufactures, etc. In another embodiment of the present invention, a supplier is a "broker." In such an embodiment, a broker obtains desired goods or services from one or more other vendors, but does not create the desired goods or services. In another embodiment of the present invention, a supplier is both a vendor and a broker depending on the goods or services offered. In such an embodiment, the supplier will act as a vendor for a first portion of goods or services provided and also act as a broker for a second portion of goods or services provided. For example, a supplier may act as a vendor to sell it's own goods, but may also act as a broker for other goods from other suppliers.

In one embodiment of the present invention, the list of plural electronic options 27 with associated option fees is provided from one central location on a communications network 18. In another embodiment of the present invention, the list of plural electronic options 27 with associated option fees is provided from multiple distributed locations on the communications network 18.

When an electronic option is purchased, a purchaser is sent periodic reminders about the electronic options 27 until the electronic option expires at the desired future time. The periodic reminders can be sent electronically, such as with electronic mail, ("e-mail") or sent in other electronic or non-electronic formats (e.g., a post card in regular mail).

A list of purchase prices for the goods or services is typically provided along with the list of electronic options. This allows a purchaser to either directly purchase desired goods or services or potentially defer a purchase to a desired time in the future by purchasing an electronic option on desired goods or services.

In another embodiment of the present invention, electronic options 27 may be made available other suppliers who supply similar goods and/or services and/or events. A fee will typically be charged to a supplier who may request a list of purchasers of electronic options. In such an embodiment, the electronic options 27 may be made available only if the purchaser gives his/her permission.

In another embodiment of the present invention, the electronic options 27 may be made available to other suppliers based on the electronic option terms set by a supplier. Making the electronic options 27 available to other suppliers allows the other suppliers to send additional offers for similar goods or services directly to a purchaser of an electronic option. The additional offers may include similar goods or services or goods or services with additional or enhanced features or functionality. The offers may also include sale items that may be purchased instead of the desired goods or services reserved with the electronic option.

In one embodiment of the present invention, a purchaser is allowed to exercise the electronic option at any time before the desired future time to purchase the desired goods or services at the reservation price. In another embodiment of the present invention, the purchaser is only allowed to exercise the option when the desired future time arrives.

In one embodiment of the present invention, a supplier may sell electronic options 27 on goods or services that are not fully developed or don't even exist yet. Purchasing interest in such electronic options 27 could be used to determine the economic feasibility of continuing to develop such a product or used to determine final pricing and features for a desired good and/or service and/or event. In another embodiment of the present invention, a supplier may use electronic options 27 to support new e-business models.

In another embodiment of the present invention, an electronic option can be purchased for an event that may never happen. For example, an option service may provide electronic options 27 for World Series tickets for all major league baseball teams before the season starts. Only two teams will play in the World Series. However, a purchaser is able to purchase an option to buy World Series tickets for any team, even those that team may not play in the World Series.

In another embodiment of the present invention, the option terms established by a supplier may indicate purchasing an electronic option with a lower option fee will only guarantee a purchaser an X % (e.g., 50%) chance that the desired goods or services will be available at all at the desired future time. The option terms may also indicate that purchasing an electronic option with a higher option fee will guarantee a purchaser a Y % (e.g., 99%) chance that the desired goods or services will be available at the desired future time. In such an embodiment, paying an option fee does not guarantee that desired goods or services will be available for a purchaser.

In another embodiment of the present invention, the electronic option may include a volatility factor and a range of reservation prices. The volatility factor may cause an actual price paid for desired goods or services at a desired future time to be greater than the reservation price reserved by a purchaser. For example, an electronic option with a volatility factor may be made available for goods or services including a new toy, a new electronic product, tickets for sporting events, concerts, etc. The electronic option may include a volatility factor since the demand for the goods or services is uncertain, but demand may eventually exceed supply based on a scenario of conditions.

If an electronic option with a volatility factor is purchased for goods or services at a reservation price, and the demand for the goods or services is weak, the purchaser will be able purchase the goods or services at the reservation price at the future time if the purchaser so desires. If demand for the goods or services is strong, and the purchaser may be required to purchase the goods or services at a higher price than the reservation price if the purchaser still desires to actually purchase the goods or services.

In one embodiment of the present invention, an electronic option fee may be determined, in part, by electronic option terms input by a purchaser. A individual supplier may also provide different types of electronic options 27 to different individual users based on their current or previous interactions.

In another embodiment of the present invention, the electronic option is a "personalized electronic coupon" dynamically created by a server network device and sent to a client network device based on current or previous input from a user. In such an embodiment, a purchaser of the electronic option may also input one or more desired options terms to create his/her own personalized electronic coupon. The personalized electronic coupon is governed by the electronic options 27 terms determined by a desired supplier and/or by the purchaser.

In one embodiment of the present invention, the electronic option is a "personalized reservation." dynamically created by application 25 on a client network device 12, 14, 16 and sent to a server network device 20, 22, 24 device based on current or previous inputs from a user. In such an embodiment, a purchaser of the electronic option may also input one or more desired options terms to create his/her own personalized electronic reservation. For example, the user is accompanied by four other people, a private table is requested and a favorite bottle of liquor is pre-ordered. The personalized electronic reservation is governed by the electronic options 27 terms determined by a desired supplier and/or by the purchaser. The personalized reservations allow plural people to be included to receive priority treatment.

For example, a user of a client network device 12, 14, 16 may desire to receive priority treatment at a hot new night club or restaurant. the electronic option as a "personalized reservation" can be purchased and used to receive priority treatment to skip any lines at a place (e.g., hot new night club, restaurant, bar, etc.) and/or event (e.g., concert, art gallery opening, festival, theme park, etc.).

The "personalized reservation" may also include a "personalized electronic coupon." The personalized electronic coupon includes other goods and/or services offered at a place and/or event. For example, if a user desired to purchase an electronic option as a personalized reservation at hot new night club, the personalized coupon may include a private table in a roped offer area and a bottle of the user's favorite wine and/or liquor.

The personalized reservation may also include other items not offered at the event or place. However, the present invention is not limited to these embodiments and other embodiments, and more, fewer an other types of electronic options 27 can be used to practice the invention.

A electronic option is sold for an option fee that is typically set as a small percentage of the reserved purchase price (e.g., 1% to 25%). A purchaser is risking a small amount of money to potentially purchase desired goods or services at a reservation price at a desired future time. The reservation price is typically lower than a regular price charged for the goods and services.

However, the electronic option does not obligate a purchaser to actually purchase the desired goods or services for the reservation price at the desired future time. A purchaser may choose not to exercise the electronic option. As a result, the purchaser only loses a small amount of money that was paid to buy the electronic option (i.e., the option fee). The supplier may make a small amount of money from each electronic option that was not exercised and is typically able to sell the optioned goods or services to other purchasers.

In one specific embodiment of the present invention, the option fee may be determined by one or more of the electronic option factors illustrated in Table 1. However, the present invention is not limited to an electronic option using the electronic option factors illustrated in Table 1, and equivalent or other types of electronic options 27 factors can also be used.

TABLE 1

| Electronic Option Factor | Description |
| --- | --- |
| S | A factor relating to a selected strike price (i.e., a price at which an optioned good and/or service and/or event may be purchased). The strike price may be zero. |
| D | A factor relating to a selected time period an option is valid for (i.e., a number of days) |
| V | A factor relating to a standard deviation in an average price volatility of a good and/or service and/or event. |
| L | A factor relating to a list price of the product. |
| BE | A factor relating to a distributor's break even point of a good and/or service and/or event. |
| LAP | A factor relating to a lowest available sales price for the good and/or service and/or event that can be obtained with comparison shopping. |
| NR | A factor relating to a possible non-availability of the good and/or service and/or event upon option exercise. |
| DIS | A factor relating to a discounting toward a break even point |

In one embodiment, an electronic option 27 strike price set by a supplier could be zero dollars. The electronic option 27 price set by the supplier could also be zero dollars. The strike price may fluctuate prior to exercise of the electronic option. It may go up, down or stay same. The supplier could also divide the electronic option price into multiple payments paid at different times. When option price divided into multiple payments, the strike price may remain fixed, it may adjust at each partial payment point, it may fluctuate freely, it may increase or decrease progressively in sync with, or independently of each payment, or it may be zero dollars.

In one embodiment of the present invention, determining an option fee for an electronic option is illustrated with Equations 1, 2 and 3 using the electronic option factors from Table 1. However, the present invention is not limited to calculation of an option fee as is illustrated in Equations 1, 2 and 3 and other or equivalent option formulas may be used to calculate the option fee. In addition, Equations 1, 2 and 3 may be combined into one equation, or further split into additional equations, and the present invention is not limited to calculating an option fee for an electronic option using three equations.

$$(LAP*(1+V)-S)=A \quad (1)$$

$$A-(DIS*(LAP*(1+V)-BE))=SUM \quad (2)$$

$$(SUM+(NR*S))*(D/365+1)=\text{ELECTRONIC OPTION FEE} \quad (3)$$

For example, suppose a user desired to purchase an electronic option for a 60 day time period on a Digital Video Disk ("DVD") player with a list price of $200 and a reservation price of $170. Table 2 illustrates exemplary values for electronic option factors from Table 1 used to determine an exemplary electronic option fee charged at Step 32 by a supplier. Table 3 illustrates the use of the electronic option factors from Table 2 in Equations 1, 2 and 3.

TABLE 2

| Electronic Option Factor | Description |
| --- | --- |
| S | $170 |
| D | 60 |
| V | 0.05 |
| L | $200 |
| BE | $160 |
| LAP | $180 |
| NR | 0.01 |
| DIS | 0.5 |

TABLE 3

| | |
| --- | --- |
| $180 * (1 + 0.05) − $170 = $19.00 | (1) |
| $19.00 − (0.5 * ($189 − $160)) = $4.50 | (2) |
| ($4.50 + (0.01 * $170)) * (60/365 + 1) = $7.22 | (3) |

As is illustrated in Table 3, a purchaser would pay $7.22 option fee for an electronic option to buy a DVD player within 60 days. The electronic option gives the purchaser a right to pay a total price of $177.22 ($170+$7.22) for the DVD player that sells for a list price of $200, if the electronic option is exercised. Otherwise, the purchaser risked only $7.22 for 60 days to potentially "reserve" a DVD player for purchase. This example assumes that the lowest possible price a purchaser could find the DVD player anywhere else by comparison shopping would be $180 (i.e., the LAP price), if the DVD player was available from a supplier when the purchaser desired the DVD player. Thus, the purchaser can actually be reserved the DVD player, guarantee the DVD player would be available for 60 days, and save $2.78 for the lowest available offered price for the DVD layer ($180-177.22) with wasting time shopping for a lower price.

The option fee is set by a supplier to make the electronic options 27 attractive to a purchaser, and help convince a purchaser that it is not necessary to spend any of his or her own time to try and find a lower price for desired goods or services.

In one embodiment of the present invention, all of the option fee is paid to an electronic option service that provided the electronic option information. In another embodiment of the present invention, a first portion of the option fee is paid to an electronic option service that provided the electronic information. A second portion of the option fee is paid to the desired supplier who can provide the desired good and/or service and/or event. For example, for an option fee of $7.22, the option service may collect $0.22 and the desired supplier may collect $7.00. The option service collects a small fee for each electronic option purchased for providing the electronic option service. The desired supplier collects a larger fee for taking the risk to potentially supply the desired good and/or service and/or event. In another embodiment of the present invention, all of the option fee is paid to the desired supplier who can provide the desired good and/or service and/or event.

In another embodiment of the present invention, an option service may be paid a small percentage of the option fee as well as a percentage of a purchase price for every good and/or service and/or event that is actually purchased by exercising an electronic option. For example, an option service may be paid 5% of the option fee as well as 2% of the actual purchase price of the good and/or service and/or event. In another embodiment of the present invention, all of the option fee may be paid to a supplier, while the option service may be paid only a percentage of a purchase price for an exercise electronic option on a good and/or service and/or event.

Selected ones of the one or more pre-determined option fees include a predetermined option fee of zero. In such an embodiment, the "purchaser" providers the vendor with other types of consideration for the value received in turn for purchasing the electronic option with a purchase fee of zero.

For example, the purchaser may provide an e-mail address, phone, number, social networking identifier, picture, etc. in exchange for a pre-determined option fee of zero. Such identifiers are valuable to option providers and vendors to establish a customer database 20', 22', 24' and to send future new and additional offers (e.g., FIG. 6, etc.) to directly interested purchasers. However, the present invention is not limited to such an embodiment and more, fewer and other types of pre-determined option fees can be used to practice the invention.

Other selected ones of the one or more pre-determined option fees include a pre-determined option fee of zero. In such an embodiment, the vendor providers the purchaser with consideration for the value received in turn for purchasing the electronic option with a purchase fee of zero in exchange for direct participation in marketing and promotional activities. For example, a vendor such as an airline may provide a passenger an electronic option with a purchase fee of zero to try out a night club, bar, or restaurant service (e.g., priority entrance, priority seating, skipping to a front of a line, etc.) in exchange for providing a mandatory testimonial or completing a mandatory survey, etc.

Yet other selected ones of the one or more electronic options 27 include a final option exercise price that fluctuates prior to exercise. The final option exercise price may fluctuate prior to exercise, or it may go up, down or stay same or become zero. In such an embodiment, the electronic option only guarantees availability of a desired airline service but not the final option exercise price. The final option exercise price may also fluctuate and then the electronic option guarantees to lock in the lowest price during a defined period.

These embodiments are illustrative only. Virtually any type of option fee or purchase price sharing can be used with the present invention.

Requesting Electronic Options for Goods and Services from a Client Network Device FIG. 3 is a flow diagram illustrating a Method 34 for requesting electronic options for goods and services from a client network device. At Step 36, a list of available goods or services including plural electronic options with associated option fees for the goods or services, is received from a server network device on a client network device via a communications network. The plural electronic options include electronic option terms established by one or more suppliers who can supply the goods or services. An option fee is associated with a reservation price to purchase desired goods or services at a desired future time. At Step 38, an electronic option associated with a desired good and/or service and/or event provided by a desired supplier is selected. At Step 40, electronic option terms established by the desired supplier for the desired good and/or service and/or event are received on the client network device. At Step 42, the electronic option terms for the desired good and/or service and/or event are accepted on the client network device. At Step 44, the electronic option is purchased on the desired good and/or service and/or event provided by the desired supplier based on the accepted electronic option terms established by the desired supplier for an option fee. A confirmation for purchasing the electronic option is received from the server network device on the client network device.

In one embodiment of the present invention, the electronic option terms established by the desired supplier for the desired good and/or service and/or event received on the client network device include a request for a user to enter personal information (e.g., name, address, phone number, e-mail address, etc.) that is used to associate a user with a desired electronic option.

In one embodiment of the present invention, the confirmation includes an indication of the option fee paid for the electronic option, an expiration date for the electronic option, the reservation price and the desired supplier. In another embodiment of the present invention, the confirmation includes the information listed in the previous sentence as well as other information such as the LAP price, etc.

The interaction between Methods 26 and 34 are illustrated with one specific exemplary embodiment of the present invention. However, the present invention is not limited to this specific exemplary embodiment and other embodiments can also be used with Methods 26 and 34. FIGS. 4A, 4B and 4C are block diagrams 46, 54, 62 of a graphical user interface (GUI) visually illustrating the interactions between Methods 26 and 34.

In such a specific embodiment of the present invention, at Step 28 (FIG. 2) the server network device 24 provides to a client network device 16 via the Internet 18, a list of available goods and electronic options with associated option fees. At Step 36 (FIG. 3), the client network device 16 receives the list of available goods and electronic options with associated option fees from the server network device 24 via the Internet 18. In this example, FIG. 4A illustrates a GUI with a list 48 of DVD players currently being offered by Supplier XYZ. The list 48 includes an electronic option with associated option fee for the "First Class" DVD player. The DVD player is currently being sold for $200. An electronic option can be purchased for 60 days for an option fee of $7.22 to allow the DVD player to be purchased at a reservation price of $170.

At Step 38 (FIG. 3) an electronic option associated with the DVD player provided by Supplier XYZ is selected from the client network device 16. In this example, the electronic option is selected by selecting the "OPTION IT" button 50 (FIG. 4A). However, the present invention is not limited to selecting an electronic option with this method and other methods can also be used. The DVD player can also be purchased directly for $200 by selecting the "BUY IT" button 52 (FIG. 4C).

At Step 30 (FIG. 2) electronic option terms 56 (FIG. 4B) for the selected First Class DVD player from the Supplier XZY are provided from the server network device 24 to the client network device 16. At Step 40 (FIG. 3), the electronic option terms 56 (FIG. 4B) are received on the client network device 16. At Step 42 (FIG. 3), the electronic option terms 60 for the DVD player are accepted on the client network device 16. In this example, the electronic option terms are accepted by selecting the "ACCEPT" button 58 (FIG. 4B). However, the present invention is not limited to selecting electronic option terms with this method and other methods can also be used. A user can also decline to accept the electronic option terms by selecting the "DECLINE" button 60 (FIG. 4B). If a user declines to accept the electronic option terms provided by the Supplier XYZ, the electronic option can not be purchased.

At Step 44 (FIG. 3), the electronic option is purchased on the DVD player based on the accepted electronic option terms 56 established by Supplier XYZ for an option fee of $7.22. The reservation price for the DVD player is $170. At Step 32 (FIG. 2) the electronic option purchased for the DVD played accepted on the server network device 24 according to electronic option terms established by the Supplier XYZ. The electronic option information is stored in a database associated with the server network device 24.

A confirmation for purchase of the electronic option for the option fee is provided to the client network device 16 from the server network device 24. A confirmation 64 (FIG. 4C) for purchasing the electronic option is received from the server network device 24 on the client network device 16. In this example, the confirmation 64 (FIG. 4C) includes an indication of the supplier (Supplier XYZ), user (Jane Smith), option fee paid ($7.22), reservation price ($170), time period (60 days) and current LAP price ($180). However, the present invention is not limited to a confirmation with this information, and more, fewer or equivalent confirmation information items can also be used.

In one embodiment of the present invention, a user who purchases an electronic option can access electronic option information from a client network device via the communications network 18. In such an embodiment, a user would be provided a method to securely obtain electronic option information (e.g., a login and password, etc.). In one embodiment of the present invention, a central server network device is used to store electronic option information for all suppliers.

In another embodiment of the present invention, electronic option information is stored on one or more server network devices for individual suppliers who provide the desired goods or services for which the electronic option was purchased. In another embodiment of the present invention, the electronic option information can be obtained from both a central server network device as well as from the one or more server network devices for individual suppliers who provide the desired goods or services for which the electronic option was purchased.

FIG. 5 is a block diagram 66 illustrating exemplary electronic option information 64 for the electronic option of FIG. 4C. In this example, the electronic option information includes an "EXERCISE" button 70 that allows a user to immediately exercise the electronic option and obtain the DVD player for a reservation price of $170. Since the electronic option information is provided electronically (i.e., via a communications network 18, etc.), when a user selects the EXERCISE button 70, the desired good may then be automatically shipped directly the purchaser without further input from the purchaser.

In one embodiment of the present invention, Method 34 can be used by purchase managers to proactively reserve goods or services that will be needed at a future time for a known reservation price. Method 34 not only provides a method to aid future planning for resources and/or budgets, but also provides a method to allow non-executive staff to efficiently assist executive staff in a business organization. For example, if a manufacturer knows that it typically must purchase four machine presses per year because of normal wear and tear, a purchase manager could purchase four electronic options on the presses in January or each year. Thus, the purchase manager has effectively authorized the purchase of four presses at the reservation price.

When a press breaks down and needs to be replaced, an electronic option for a press could be exercised at the reservation price. Since the purchase manager has purchased the electronic options 27 for a pre-determined reservation price, a low-level assistant could actually exercise the electronic option and obtain the press without input from the purchase manager.

Use of Electronic Option Information by Desired Suppliers

FIG. 6 is a flow diagram illustrating a Method 72 for using electronic options by a desired supplier. At Step 74, a database accessible from a communications network is read from a server network device. The database includes plural entries with electronic option information. At Step 76, plural new electronic offers are created based on desired goods or services associated with the electronic option information. At Step 78, one or more of the plural new electronic offers are sent to selected client network devices for selected purchasers of electronic options.

Method 72 allows a desired supplier who was willing to accept an electronic option for a desired good and/or service and/or event to try and sell other items to a purchaser of an electronic option. For example, if a purchaser had purchased an electronic option on a DVD player from a desired supplier, the desired supplier may send the purchaser offers to buy DVD disks for the DVD player. Method 72 may also allow a desired supplier to alert a purchaser of sale items. Method 72 may also allow a desired supplier to coax a purchaser to exercise an electronic option by sending offers to remind the purchaser to purchase the desired good and/or service and/or event at the reservation price or a price below the reservation price. Method 72 may help a desired supplier better manage inventories of goods or better manage services.

Use of Electronic Option Information by Other Suppliers

FIG. 7 is a flow diagram illustrating a Method 80 for using electronic options by other suppliers. At Step 82, a database accessible from a communications network 18 including a plurality of entries with electronic option information is provided. At Step 84, access to the database is provided for a fee to suppliers who desire to use the electronic option information to offer similar or other goods or services to users who have purchased electronic options.

Method 80 allows other suppliers to target purchasers of electronic options 27 with information about similar goods or services or different types of goods and services offered by a supplier. As was discussed above the electronic options 27 may be made available to other suppliers only if the purchaser gives his/her permission. However, the electronic options 27 may also be made available to other suppliers based on the option terms set by a supplier, and agreed to by a purchaser.

The methods and system described herein may be used for to provide options for b2b, b2c, c2b, c2c or other types of transactions over the Internet. However, the present invention is not limited to these transactions and other types of transactions can also be used.

The methods and systems described herein may offer the following advantages for suppliers: (1) a supplier may make additional revenue from electronic option fees even if an electronic option is not exercised by a purchaser; (2) a supplier is in complete control of the electronic option terms; (3) a supplier may be able convert browsers into purchasers by allowing a browser to risk a small amount of money for the ability to reserve a purchase of a desired good and/or service and/or event with an electronic option; and (4) a supplier can use demographic information collected from a user and associated with an electronic option to cross-sell additional goods or services.

The methods and system described herein may offer the following advantages for purchasers: (1) a purchaser can use an option to lock in a lower price for an item that may be in high demand; (2) a purchaser can use the reservation price from a communications network supplier to comparison shop at "brick and mortar" suppliers; (3) a purchaser can reserve a purchase of a good and/or service and/or event for a gift for an occasion that is months into the future and take actual delivery just before the occasion; and (4) a purchaser can risk a small amount of money to reserve the right to purchase a good and/or service and/or event in the future, but not be obligated to actually purchase the good and/or service and/or event.

Prioritized Electronic Option Purchase Rights

Figure 8A:
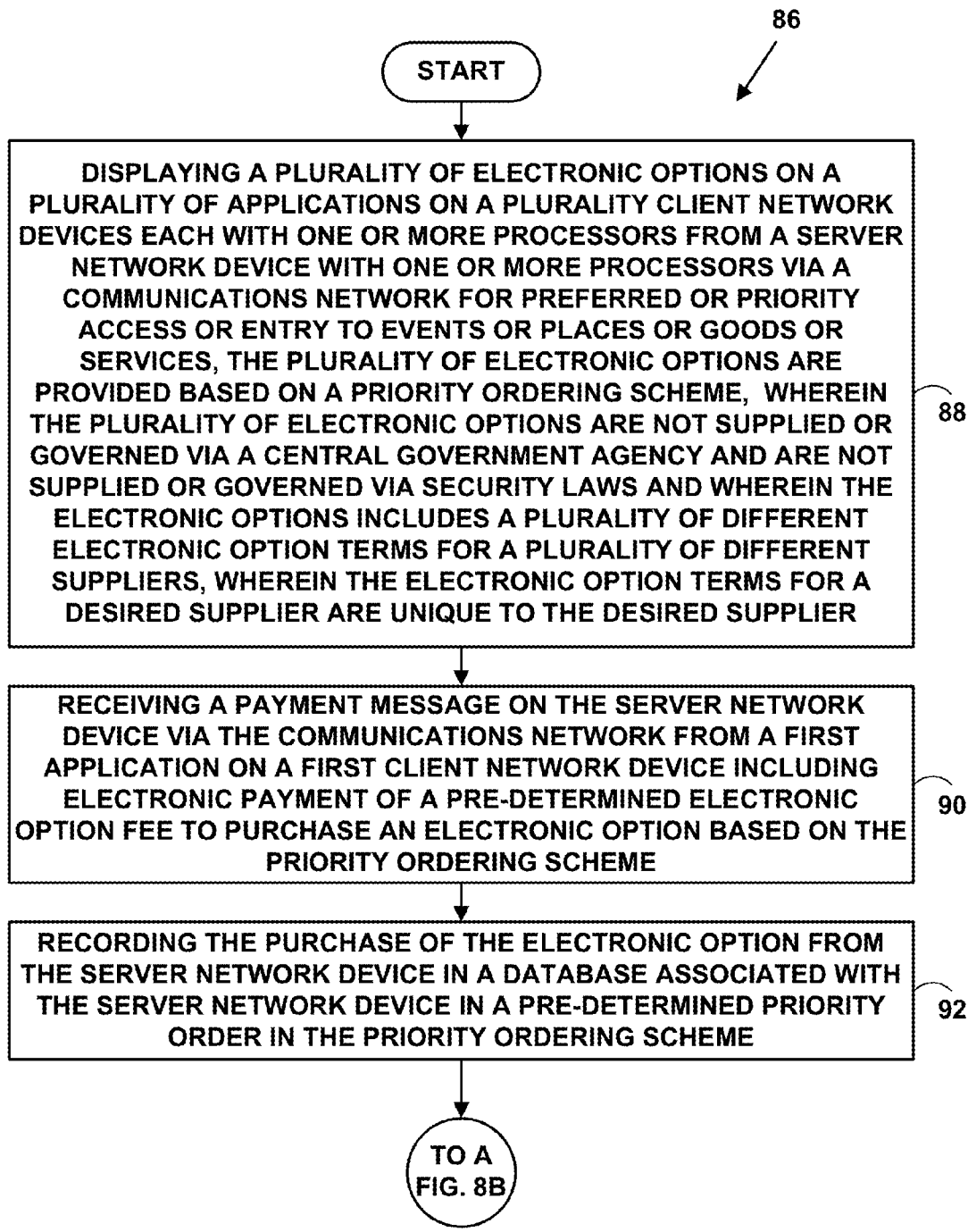

FIGS. 8A and 8B are a flow chart illustrating Method 86 for providing electronic options for goods or services or events or entry to places with a priority system. In FIG. 8A at Step 88 plural electronic options are displayed on plural applications on plural client network devices each with one or more processors from a server network device with one or more processors via a communications network for preferred or priority access or entry to events or places or goods or services. The plural electronic options are provided based on a priority ordering scheme. The plural electronic options are not supplied or governed via a central government agency and are not supplied or governed via security laws. The electronic options include plural different electronic option terms for plural different suppliers. The electronic option terms for a desired supplier are unique to the desired supplier. At Step 90, server network device receives a payment message via the communications network from a first application on a first client network device that includes an electronic payment for a pre-determined electronic option fee to purchase an electronic option based on the priority ordering scheme. At Step 92, the purchase of the electronic option is recorded from the server network device in a database associated with the server network device in a predetermined priority order for the priority ordering scheme. In FIG. 8B, at Step 94, a request message is received on the server network device from the first application on the first client network device via the communications network to exercise the purchased electronic option for preferred or priority access or entry to events or places or goods or services based on the priority order established for the priority ordering scheme. At Step 96, a confirmation message is sent from the server network device via the communications network to the first application on the first client network device indicating the purchased electronic option is valid and can be exercised can be exercised by the first client network device for preferred or priority access or entry to events or places or goods or services based on the priority order established for the prioritized group in the priority ordering scheme.

Method 86 is illustrated with one exemplary embodiment. However, the present invention is not limited this exemplary embodiment and other embodiments can be used to practice the invention.

In such an exemplary embodiment at Step 88, plural electronic options 27 are displayed on plural applications 25 on plural client network devices 12, 14, 16 each with one or more processors from a server network device 20, 22, 24 with one or more processors via a communications network for preferred or priority access or entry to events or places or goods or services. The plural electronic options 27 are provided based on a priority ordering scheme to provide preferred or priority access or entry to events or places or goods or services. The plural electronic options 27 are not supplied or governed via a central government agency and are not supplied or governed via security laws. The plural electronic options 27 include plural different electronic option terms for plural different suppliers (See FIGS. 2, 3, 6 and 7).

In one embodiment, the pre-determined priority order includes access to a current first spot in a line for preferred or priority access or entry to events or places or goods or services. In such an embodiment, the current first spot is dynamic and variable. For example, a First purchaser of an electronic option arrives at a restaurant with line of 20 people. The First purchaser exercises the purchased electronic option and then is allowed stand at the first spot in the line of 20 people to receive the next available table in the restaurant. A Second purchaser of an electronic option arrives at a bar with the line of 30 people at the door. The Second purchaser exercises the purchased electronic option and is then allowed to bypass the line of 30 people and directly enter the bar.

In one embodiment, the pre-determined priority order also includes purchased electronic options 27 from one or more different pre-determined priority time periods (e.g., 10:30 pm, 10:45 pm, etc.) and/or for one or more prioritized groups (e.g., first spot in line for a next table, ability to bypass a line to gain immediate entry, a first spot in a line for a next available seat at a bar, etc.

In another embodiment, a purchaser of an electronic option can also pay a larger pre-determined option fee to obtain a more favorable position in the predetermined priority order to allow exercise of the electronic option. For example, spot number in a line at a night club may require an electronic option fee of $20.00. The electronic option fees for spots two through nine in the line may be $10.00, ten through twenty may be $5.00, etc.

In another embodiment, a purchaser of an electronic option can also dynamically pay another additional pre-determined option fee to obtain a more favorable position in the pre-determined priority order to allow exercise of the electronic option in a different priority order than that initially purchased. For, example a purchaser of an electronic option may have purchased access to "spots ten to twenty" in a line at a night club for $5.00 Such an electronic option includes a lower purchase price for other priority position as was just described. When the purchaser arrives at the night club, he/she desires to now be in spot number one in the line. The purchaser would have to pay another additional pre-determined option fee (e.g., an additional $15.00 ($20.00 for electronic option fee for position 1 minus $5.00 electronic option fee paid for positions 10 to 20, are a higher fee, such as an additional $25.00 for privilege of changing the electronic option dynamically, etc.) to obtain the more favorable position number one at the font of the line, etc.

In another embodiment, the priority ordering scheme is based on a total amount of option fees paid for priority entry and/or access and/or all additional goods and/or services purchased.

However, the present invention is not limited to these embodiments and other priority ordering schemes can also be used to practice the invention Various other combinations can also be used for the pre-determined priority order. However, the present invention is not limited to these embodiments and other embodiments can be used to practice the invention.

In one embodiment the purchased electronic option includes a purchased personalized reservation. In such an embodiment, the personalized reservation includes all fees for preferred or priority access or entry to events or places and all fees for purchases of all goods and/or services. For example, the electronic option fee includes a priority access fee for personalized reservation for entry for four people into a night club, another fee for a private table and another fee for a bottle of a favorite liquor and another fee for a priority server at the private table. Once the electronic option fee is paid, the user of the first client network device 12 does not have to pay any additional fees and is provide immediate preferred or priority access or entry to events or places and to all pre-purchase goods and/or services.

In another embodiment, the purchased electronic option includes only a fee preferred or priority access or entry to events or places. Goods and/or services available are the event and/or place are purchased separately.

In another embodiment, the purchased electronic option also includes a personalized electronic coupon as was described above.

However, the present invention is not limited to the electronic options described and other types of electronic options can be used to practice the invention.

Returning to FIG. 8 at Step 90, the server network device (e.g., 20, etc.) receives a payment message via the communications network 18 from a first application 25 on a first client network device (e.g., 12, etc.) that includes electronic payment of a pre-determined electronic option fee to purchase an electronic option 27 based on the priority ordering scheme.

In one embodiment, the electronic payment includes a credit card, debit card, electronic check, payment account (e.g., PAYPAL, GOOGLE MARKETPLACE, etc.) or electronic funds transfer payment. However, the present invention is not limited to the electronic payments described and other types of electronic payments can be used to practice the invention In one embodiment, the pre-determined electronic option fee includes only preferred or priority access or entry to events or places or goods or services. In such an embodiment, the electronic option fee only includes preferred or priority access or entry. When the electronic option is exercised a user of the client network device will have to pay additional fees for additional preferred or priority access and to purchase goods or services at the event or place.

In another embodiment, the pre-determined electronic option fee includes a first portion of electronic option free for preferred or priority access or entry to events or places or goods or services and a second portion of the electronic option for pre-purchases of tickets for preferred or priority access or entry to events or places and pre-purchased of goods or services. In such an embodiment, when a user of a client network device pays the electronic option fee, the user does not have to pay any additional fees when the electronic option is exercised, unless the user desired to purchase additional types or preferred or priority access or additional goods or services at the event or place.

In a specific embodiment, selected ones of the one or more pre-determined option fees include a pre-determined option fee of zero. In such an embodiment, the "purchaser" providers the vendor with other types of consideration for the value received in turn for purchasing the electronic option with a purchase fee of zero.

For example, the purchaser may provide an e-mail address, phone, number, social networking identifier, picture etc. in exchange for a pre-determined option fee of zero. Such identifiers are valuable to option providers and vendors to establish a customer database 20', 22', 24' and to send future new and additional offers (e.g., FIG. 6, etc.) to directly interested purchasers. However, the present invention is not limited to such an embodiment and more, fewer and other types of pre-determined option fees can be used to practice the invention.

In another specific embodiment, other selected ones of the one or more predetermined option fees include a pre-determined option fee of zero. In such an embodiment, the vendor providers the purchaser with consideration for the value received in turn for purchasing the electronic option with a purchase fee of zero in exchange for direct participation in marketing and promotional activities. For example, a vendor such may provide an electronic option with a purchase fee of zero to try out a new night club, bar, or restaurant service (e.g., priority entrance, priority seating, skipping to a front of a line, etc.) or come to a place on an less busy night (e.g., Tuesday night, etc. in exchange for providing a mandatory testimonial or completing a mandatory survey, etc.

However, the present invention is not limited to the electronic option fees described and other types of electronic option fees can be used to practice the invention Returning to FIG. 8 at Step 92, the purchase of the electronic option 27 is recorded from the server network device 20 in a database 20' associated with the server network device 20 in a pre-determined priority order for a prioritized group in the priority ordering scheme.

In FIG. 8B at Step 94, a request message is received on the server network device 20 from the first application 25 on first client network device 12 via the communications network 18 to exercise the purchased electronic option 27 for preferred or priority access or entry to events or places or goods or services based on the priority order established for the priority ordering scheme.

In one embodiment, the request message includes a bar code, such as a QR-code generated by the first client network device 12.

A "barcode" is an optical machine-readable representation of data, which shows data about the object to which it attaches. Originally, barcodes represented data by varying the widths and spacings of parallel lines, and may be referred to as linear or 1 dimensional (1D). Later they evolved into rectangles, dots, hexagons and other geometric patterns in 2 dimensions (2D). Although 2D systems use a variety of symbols, they are generally referred to as barcodes as well. Barcodes originally were scanned by special-optical scanners called barcode readers, scanners and interpretive software are available on devices including desktop printers and smart phones 14 and tablet computers 12.

Table 4 illustrates exemplary linear barcodes, the standards of all of which are incorporated by reference. However, the present invention is not limited to the exemplary linear barcodes listed in Table 4, and more, fewer and other linear barcodes can also be used to practice the invention.

TABLE 4

Linear Bar Codes

U.P.C.
Codabar
Code 25 - Non-interleaved 2 of 5
Code 25 - Interleaved 2 of 5

TABLE 4-continued

Linear Bar Codes

Code 39
Code 93
Code 128
Code 128A
Code 128B
Code 128C
Code 11
CPC Binary
DUN 14
EAN 2
EAN 5
EAN 8, EAN 13
Facing Identification Mark
GS1-128 (formerly known as UCC/EAN-128), incorrectly referenced as EAN 128 and UCC 128
GS1 DataBar, formerly Reduced Space Symbology (RSS)
HIBC (HIBCC Health Industry Bar Code)
ITF-14
Latent image barcode
Pharmacode
Plessey
PLANET
POSTNET
Intelligent Mail barcode
MSI
PostBar
RM4SCC/KIX
JAN
Telepen Table 5 illustrates exemplary matrix (2D) barcodes, the standards of all of which are incorporated by reference. However, the present invention is not limited to the exemplary matrix barcodes listed in Table 5, and more, fewer and other matrix barcodes can also be used to practice the invention.

TABLE 15

Matrix Bar Codes

3-DI
ArrayTag
Aztec Code
Small Aztec Code
Chromatic Alphabet
Codablock
Code 1
Code 16K
Code 49
ColorCode
Compact Matrix Code
CP Code
CyberCode
d-touch
DataGlyphs
Datamatrix
Datastrip Code
Dot Code A
EZcode
Grid Matrix Code
High Capacity Color Barcode
HueCode
INTACTA.CODE
InterCode
JAGTAG
Lorem ipsum
MaxiCode
mCode
MiniCode
MicroPDF417
MMCC
Nintendo e-Reader#Dot code
Optar
PaperDisk

TABLE 15-continued

Matrix Bar Codes

PDF417
PDMark
QR Code
QuickMark Code
SmartCode
Snowflake Code
ShotCode
SPARQCode
SuperCod
Trillcode
UltraCode
UnisCode
VeriCode, VSCode
WaterCode In one specific embodiment, the application 25 interacts with a bar code reader application. In another embodiment, the application 25 includes an integral bar code reader application. However, the present invention is not limited to a bar code reader application and other applications can also be used to practice the invention.

In one specific exemplary embodiment, a QR bar code is used. However, the present invention is not limited to QR codes and other types of bar codes can also be used to practice the invention A "QR Code" is a specific matrix barcode (or two-dimensional code), readable by dedicated QR barcode readers and camera phones. The code consists of black modules arranged in a square pattern on a white background. The information encoded can be text, URL or other data. QR codes are defined in *ISO/IEC* 18004:2006 *Information technology—Automatic identification and data capture techniques—QR code 2005 bar code symbology specification,* 1 Sep. 2006, the contents of which are incorporated by reference.

QR codes are also used to display text, contact information, connect to a wireless network, open a web page in the phone's browser or initiate a communications event over the communications network 18 (e.g., voice call, data call, etc.) This act of linking from physical world objects is known as a "hardlink" or "physical world hyperlinks."

For example, Google's smart phone Android operating system supports the use of QR codes by natively including the barcode scanner (e.g., Zxing, etc.) on some models, and the browser supports Uniform Resource Identifier (URI) redirection, which allows QR Codes to send metadata to existing applications on the device. Nokia's Symbian operating system is also provided with a barcode scanner, which is able to read QR codes, while mbarcode is a QR code reader for the Maemo operating system. In the Apple iOS, a QR code reader is not natively included, but hundreds of free applications available with reader and metadata browser URI redirection capability. However, the present invention is not limited to these network device operating systems and other bar code readers and device operating systems can also be used to practice the invention.

Figure 9:
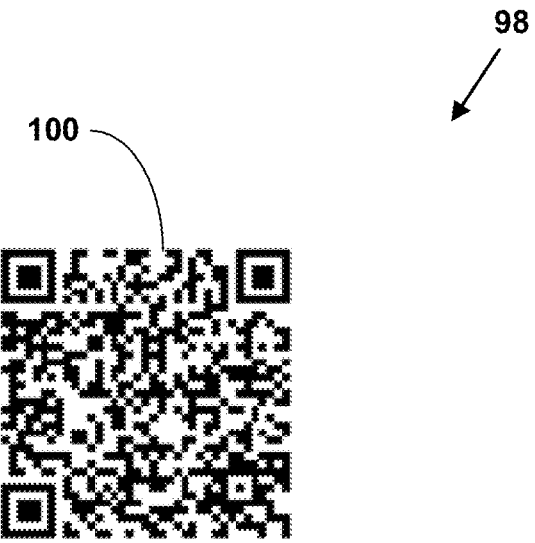
FIG. 9 is a block diagram illustrating display of an exemplary QR bar code.

FIG. 9 is a block diagram 98 illustrating display of an exemplary QR bar code 100.

Encoded in the QR bar code 100 is the text "This a QR code verifies the holder purchased and electronic option for priority entry to Edge Night Club" When a QR bar code reader is used to read the QR bar code 100, this text will be returned.

Figure 10:
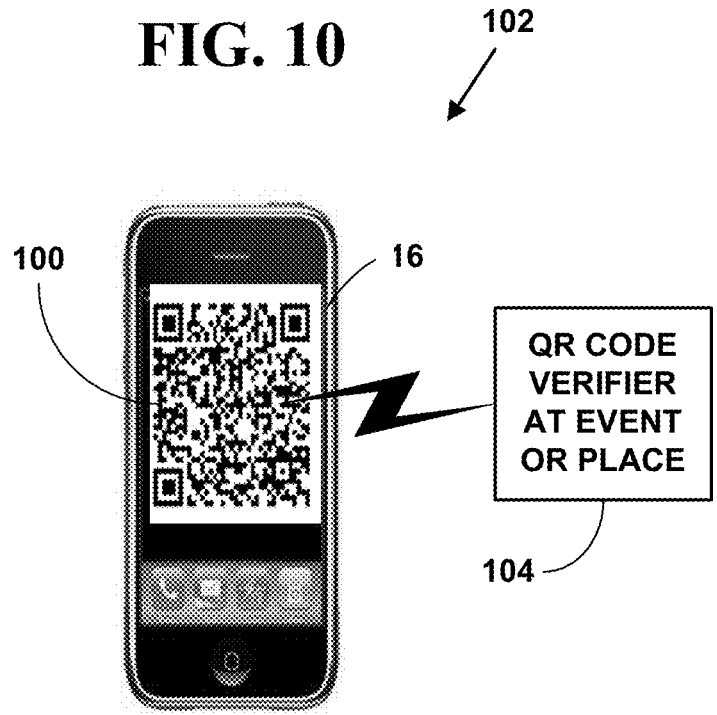
FIG. 10 a block diagram illustrating a reading of a QR bar code at an event or place.

FIG. 10 a block diagram 102 illustrating a reading of a QR bar code 100 with a reader 104 at an event or place.

In one embodiment, users with a camera equipped smart phone 16 (or tablet computer 12, or computer 14, etc.) with a the camera component, a bar code reader application appropriate for the bar code can create a digital image of the QR Code 100 directly without receiving it from the server network device 20. In such an embodiment, the server network device 20 would just return a verification code at Step 96 to confirm the purchased electronic option was valid and can be exercised to confirm preferred or priority access or entry to events or places or goods or services based on the priority order established for the priority ordering scheme.

The camera component can also be used to capture existing QR codes from print and electronic advertising and other sources (e.g., from other network devices, etc.) The application 25 on the client network device 12, 14, 16 converts the QR code 98 into appropriate QR-code created by the user that can be used directly at an event, place, etc. to provide priority access and/or entry.

In one embodiment, a user may scan a number of QR bar codes from non-electronic information such as magazines, business cards, billboards, other non-electronic advertising, etc. A user may also scan a number of QR bar codes from electronic advertising such from web-sites, other client network devices 12, 14, 16, from e-mails, text messages, instant messages, etc. In such an embodiment, the user generated QR-codes may be sent at Step 92 from the first application 25 on the first client network device 12, for verification by the server network device 20 at Step 94.

Plural QR bar codes may also be sent from one or more server network devices 22, 24, in the confirmation message sent at Step 94. Plural QR codes may also be sent from one or more server network devices 22, 24 to the first client network device 12 that can be used by the first client network device 12 in the request to exercise the purchased electronic option at Step 92.

However, the present invention is not limited to these embodiments and the bar codes and QR codes described and other embodiments and more, fewer and other bar codes and/or QR codes can be used to practice the invention.

Returning to FIG. 8B at Step 96, a confirmation message is sent from the server network device 20 via the communications network 18 to the first application 25 on the first client network device 12 indicating the purchased electronic option 27 is valid and can be exercised by the first client network device 12 for preferred or priority access or entry to events or places or goods or services based on the priority order established for the prioritized group in the priority ordering scheme.

In one embodiment, the confirmation message includes a bar code. In one specific embodiment, the bar code includes a QR-code 100 generated by server network device 12. The bar code and/or QR-code 100 from the confirmation message is scanned and/or read by another electronic device 104 at a place or event to confirm the exercised electronic option is valid and preferred or priority access or entry to events or places or goods or services based on the priority order established for the priority ordering scheme.

FIG. 11 is a flow chart illustrating Method 106 for providing electronic options for goods or services or events or entry to places with a priority system. At Step 108, a second client network device selects one or more of the plural electronic options for preferred or priority access or entry to events or places or goods or services displayed by a second application on the second client network device. At Step 110, the second application on the second network device selects one or more electronic option fees for the selected one or more plural electronic options for preferred or priority access or entry to events or places or goods or services. At Step 112, a second payment message is sent from the second application on the second network device to the server network device via the communications network including the selected one or more electronic options and electronic payment for the selected one or more electronic option fees to purchase the selected one or more electronic options. At Step 114, a second request message is sent from the second application on the second client network device to the server network device via the communications network to exercise the purchased selected one or more electronic options. At Step 116, a second confirmation message is received on the second application on the second client network device from the server network device via the communications network indicating the purchased selected one or more electronic options are valid and can be exercised by the second client network device for preferred or priority access or entry to events or places or goods or services based on the priority order established for the priority ordering scheme.

Method 106 is illustrated with one exemplary embodiment. However, the present invention is not limited this exemplary embodiment and other embodiments can be used to practice the invention.

In such an exemplary embodiment at Step 108, a second client network device (e.g., 16) selects one or more of the plural electronic options 27 for preferred or priority access or entry to events or places or goods or services displayed by a second application 25 on the second client network device 16.

At Step 110, the second application 25 on the second network device 16 selects one or more electronic option fees for the selected one or more plural electronic options 27 for preferred or priority access or entry to events or places or goods or services.

At Step 112, a second payment message is sent from the second application 25 on the second network device 12 to the server network device 20 via the communications network 19 including the selected one or more electronic options 27 and electronic payment for the selected one or more electronic option fees to purchase the selected one or more electronic options 27.

At Step 114, a second request message is sent from the second application 25 on the second client network device 16 to the server network device 20 via the communications network 18 to exercise the purchased selected one or more electronic options 27.

At Step 116, a second confirmation message is received on the second application 25 on the second client network device 16 from the server network device 20 via the communications network 18 indicating the purchased selected one or more electronic options 27 are valid and can be exercised by the second client network device 16 for preferred or priority access or entry to events or places or goods or services based on the priority order established for the priority ordering scheme.

All of the embodiments, options and alternatives discussed for Method 86 also apply to Method 106.

The methods and system provide plural electronic options are provided based on a priority ordering scheme. Plural electronic options are provided based on a priority ordering scheme. The plurality of electronic options are not supplied or governed via a central government agency and are not supplied or governed via security laws. The plural electronic options include plural different electronic option terms for a plural different suppliers and a priority ordering scheme. The electronic option terms for a desired supplier are unique to the desired supplier. The electronic options include personalized electronic reservations and personalized electronic coupons.

The purchased electronic option is exercised for preferred or priority access or entry to events or places or goods or services based on the priority ordering scheme.

Social Networking/Social Ticketing, Including General Product Use of Social Options Electronic options 27 are used with a social invite/accept model, where the invitation is the sharing of acquired electronic options for a good or service or event, and includes third-party invitees exercising the electronic options 27. Thus, electronic options can be used for virtually any group event, including trips, restaurant reservations, new or special product offerings, with social coupons, etc.

Social Electronic Options

Groups of friends and other groups often are attend events or socialize together. For example, a group of friends may desire to attend a music concert together, travel together, eat a restaurant together, etc. A leader of such a group will often organize the group and purchase tickets. However, the group leader often has problem selecting an appropriate date for organizing the event, purchasing tickets and getting paid for purchased tickets for group member who decide not to attend or cannot attend for some reasons. The electronic options 27 are used as social options.

Electronic social networks cover a broader area of electronic communication than what is typically referred to these days as a "social network" such as FACEBOOK, TWITTER, UTUBE, etc. For the purposes of this document, the term social network includes the FACEBOOK, etc. type social networks, and also includes email groups, personal email lists, blogs, IM (instant message list), phone directories, etc. Posting of purchased electronic options is available to any subset of these groups and includes an electronic notification/invitation to any group of people of chosen to participate in an event/activity with the inviter, particularly when the inviter has purchased electronic options 27 to reserve access to the good or service or event for the group that is being invited.

User can buy options and post to their social network just to let people know of their plans to go to the event. Users can decide to sell options and post to their social network to let people know of the availability of the options. This post includes an electronic link to a page for an options market (See FIGS. 4 and 5).

FIGS. 12A and 12B are a flow diagram illustrating a Method 118 for providing electronic options for goods or services or events. In FIG. 12A at Step 120, plural electronic options for goods or services or events are displayed on a plural client applications on a plural client network devices each with one or more processors from a server application on a server network device with one or more processors via a communications network. The plural electronic options are not supplied or governed via a central government agency and are not supplied or governed via security laws. The electronic options include plural different electronic option terms for a plural different suppliers. The electronic option terms for a desired supplier are unique to the desired supplier. At Step 122, a payment message is received on the server application on the server network device via the communications network from a first client application on a first client network device including electronic payment of a pre-determined electronic option fee to purchase a set of electronic options for a good or service or event. The set of electronic options are used to invite a group of friends to purchase the good or service or attend the event. At Step 124, the server application on the server network device receives a list of electronic identifiers for a group of client network devices for a group of friends associated with the purchase of the set of electronic options. At Step 126, the purchased of the set of electronic options and the list of electronic identifiers is recorded with the server application on the server network device in a database associated with the server network device. In FIG. 12B at Step 128, the server application on the server network device sends plural invitation messages to the list of electronic identifiers for the group of client devices for the group of friends associated with the purchase of the set of electronic options making the group of friends aware of the set of electronic options and inviting the group of friends to exercise an individual electronic option from the set of electronic options to purchase the good or service or attend the event. At Step 130, one or more exercise messages are received on the server application from the server network device from one or more client applications on the client network devices associated with the list of electronic identifiers via the communications network to exercise one or more individual electronic options from the set of purchased electronic option to purchase the good or service or attend the event. At Step 132, one or more confirmation messages are sent from the server application on the server network device via the communications network to the one or more client applications on the client network devices associated with the list of electronic identifiers indicating the purchased electronic option has been exercised to purchase the good or service or attend the event.

Figure 13:
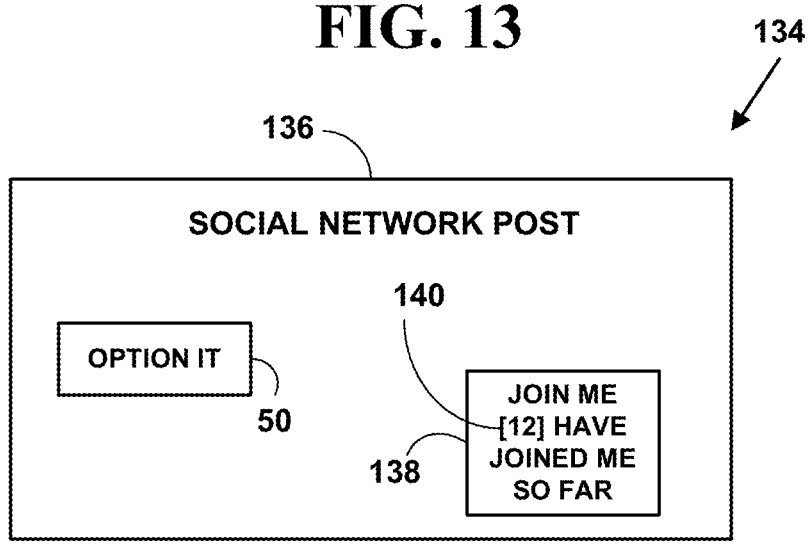
FIG. 13 is a block diagram illustrating a social networking post with a graphical button with a real-time counter associated with a purchased set of electronic options for a good or service or event.

FIG. 13 is a block diagram 134 illustrating a social networking post 136 with one graphical button 138 with a realtime counter 140 associated with a purchased set of electronic options for a good or service or event.

Figure 14:
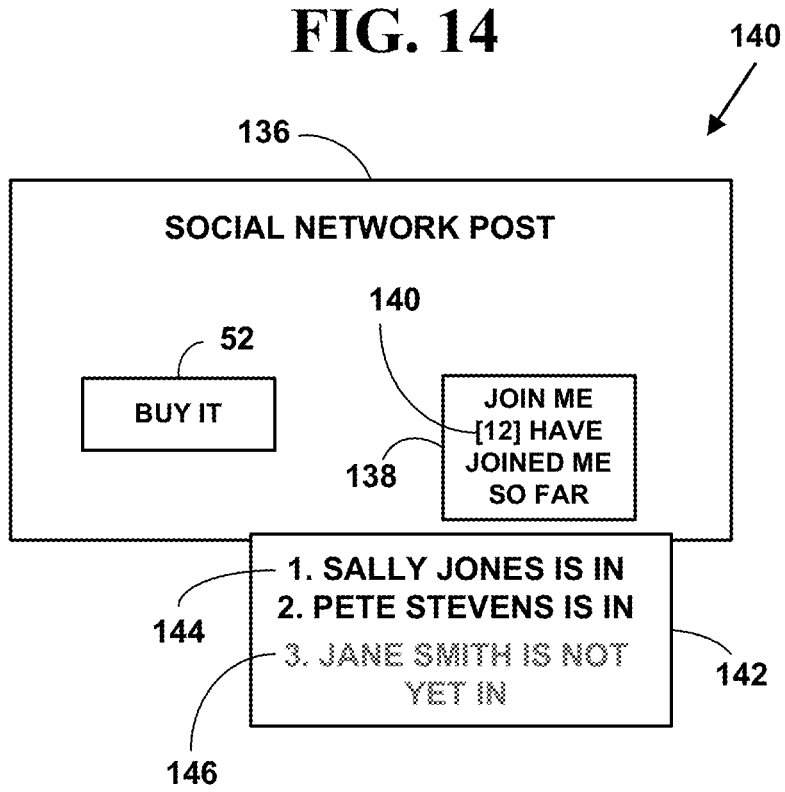
FIG. 14 is a block diagram illustrating additional details of the graphical button of FIG. 13.

FIG. 14 is a block diagram 140 illustrating additional details of the graphical button 138 of FIG. 13.

Method 118 is illustrated with one exemplary embodiment. However, the present invention is not limited this exemplary embodiment and other embodiments can be used to practice the invention.

In such an exemplary embodiment in FIG. 12A at Step 120, plural electronic options 27 for goods or services or events are displayed on a plural client applications 25 on plural client network devices 12, 14, 16, each with one or more processors from a server application 25' on a server network device 20 with one or more processors via a communications network 18. The plural electronic options 27 are not supplied or governed via a central government agency and are not supplied or governed via security laws. The electronic options 27 include plural different electronic option terms for a plural different suppliers. The electronic option terms for a desired supplier are unique to the desired supplier.

For example, the plural electronic options include electronic options for tickets for sporting event and/or entertainment event and/or related seats at a table at a restaurant, a group for a tee time at a golf course, airline and/or other travel related tickets and/or on a transportation vehicle such as an airplane, bus, boat, train, limousine, tour bus, etc. related group in theme park, amusement park, priority entry place for a facility and/or related group for priority place in a line, etc.

As another example, the plural electronic options include electronic options for a new good, such as a new game platform, a new electronic game, a new consumer product, etc. a professional service, such as a legal, accounting, medical, veterinary service, etc. other services such as hair, nail, massage, etc.

In one embodiment, the electronic options include a personalized electronic reservation and/or a personalized electronic coupon. However, the present invention is not limited to these types electronic options and more fewer or other types of electronic options can be used to practice the invention.

For example, the personalized electronic reservation includes a reservation for a table at restaurant, a reservation for a personal services appointment (e.g., hair, nails, massage, etc.), etc. The personalized electronic coupon includes those offered by social coupon sites (e.g., GROUPON, SOCIAL LIVING, etc.).

Suppliers of the good or service or event set aside a certain number goods, seats, appointments, etc. to allow the use of social options. Such suppliers receive revenue from purchase of the electronic options for setting aside the goods, seats, appointments, etc. The suppliers also receive revenue when electronic options are executed for the goods, seats, appointments, etc. If the goods, seats, appointments, etc. set aside for use with electronic options are not purchased via exercising the electronic options, they are offered for sale in channels where electronic options are not used.

The electronic options 27 are provided by the server network device 20 via the communications network 18 via telecommunication services (e.g., voice, text message, etc.) data services (e.g., e-mail, instant message, etc.) television services, Internet television services, social networking services, general search engine services and/or vertical search engine services. However, the present invention is not limited the service listed and more, fewer and other services can also be used to practice the invention.

At 120, the server application 25' on the server network device 20 also displays plural electronic options for goods or services or events on one or more other server applications 25' on one or more other server network devices 22, 24 for one or more third-party sites. For example, the server application 25' on the server network device 20 may provide a list of plural electronic options on a social networking site (e.g., FACEBOOK, TWITTER, etc.), a ticketing site, a sports team site, an entertainment site, a retail site (e.g., BEST BUY, AMAZON.COM, BUY.COM, BARNESANDNOBLE.COM, etc.), a professional services site (e.g., legal, medical, accounting, etc.), etc. with information of the ability of electronic options able to invite friends to purchase a good or service or attend an event.

In one embodiment, the server network device 20, is replaced with an electronic kiosk 29 with application 25'. In such an embodiment at Step 120, the plural electronic options for goods or services or events are displayed on a display portion 31 of the kiosk instead of the client applications 25 on the client network devices 12, 14, 16. However, the present invention it not limited to this embodiment and can be practiced without use of an electronic kiosk.

At Step 122, a payment message is received on the server application 25' on the server network device 25 via the communications network 18 from a first client application 25 on a first client network device 12 including electronic payment of a predetermined electronic option fee to purchase a set of electronic options 27 for a good or service or event. The set of electronic options 27 are used to invite a group of friends to purchase the good or service or attend the event.

Electronic payment includes payment via credit card, debit card, electronic transfer for a bank and/or checking account, third-party payment services such as PAYPAL and GOOGLE WALLET, etc. However, the present invention is not limited to the payment types listed and more, fewer and other payment types can also be used to practice the invention.

In one embodiment, pre-determined electronic option fee is zero and a "purchaser" of the set of electronic options provides a supplier of the electronic option with other types of consideration including providing a set of e-mail addresses, phone, numbers, social networking identifiers, pictures, mandatory audio or video testimonials or completing a mandatory surveys. However, the present invention is not limited to the zero option fee or payment types listed and more, fewer and other payment types can also be used to practice the invention.

With respect to the set of electronic options, for example, a group leader may decide to invite a group of friends to attend a music concert and purchase a set of electronic options 27 for a group of adjacent seats at the music concert. The group leader purchases the set of electronic options for a small electronic option fee (e.g., $1-$5 per option, etc.) for a group of adjacent seats. The group leader purchases the set of electronic options (e.g., $25 for 5 electronic options) instead of purchasing the corresponding tickets (e.g., $500 for 5 $100 tickets for adjacent seats, etc.), and thus allows his/her friend to decide if they want to attend the music concert and sit with the group.

At Step 124, the server application 25' on the server network device 20 receives a list of electronic identifiers for a group of client network devices a group of friends associated with the purchase of the set of electronic options 27.

The electronic identifiers include hardware addresses of a client network device (e.g., MAC address, etc.), a network address of a client network device (e.g., an IP address, etc.) telephone numbers, e-mail addresses, text message identifiers, instant message identifiers, social networking identifiers, social networking hash tags, etc. However, the present invention is not limited to these electronic identifiers and more, fewer or other electronic identifiers can be used to practice the invention.

At Step 126, the purchased of the set of electronic options 27 and the list of electronic identifiers is recorded with the server application 25' on the server network device 20 in a database 20' associated with the server network device 20.

In FIG. 12B at Step 128, the server application 25' on the server network device 20 sends plural invitation messages to the list of electronic identifiers for the group of friends associated with the purchase of the set of electronic options 27 making the group of friends aware of the set of electronic options 27 and inviting the group of friends to exercise an electronic option 27 to purchase the good or service or attend the event.

In one embodiment the invitation messages include one or more graphical buttons 136 for specifically exercising one or more of the plural electronic options purchased for the good or service or event. For example, continuing the music concert example, the graphical button may include the text "Join my at the Buzzkill concert."

In one embodiment the one or more graphical buttons 136 includes the OPTION IT 50 and/or BUT IT 52 (FIG. 4) and/or EXERCISE IT 70 (FIG. 5) graphical buttons. The one or more graphical buttons may also include a JOIN ME 136 (FIG. 13), SIT WITH ME, MEET ME, TRAVEL WITH ME, DINE WITH ME, EAT WITH ME, etc. graphical button, etc. However, the present invention is not limited to such an embodiment, and more fewer of other types of graphical buttons can be used to practice the invention.

In one embodiment, the one or more graphical buttons 136 includes a counter 138 that is displayed in real-time indicating how many of the purchased electronic options have been exercised to purchase the good or service or to attend the event. The counter changes in real-time as electronic options are executed. As a result, member of a group can visually determine how many of the group members are planning to purchase the good or service or attend the event at a current moment in time.

In another embodiment, one or more graphical buttons, directly and/or with one or more sub-lists/menu 142 (FIG. 14)

includes a list of people who have been invited to exercise the electronic option and a first list indicator of which people have exercised the electronic option and a second indicator of which people have not yet exercise the electronic option. For example, the first list indicator may include a first type font face (e.g., bold) or first font type, a first color (e.g., green, etc.) 144 and the second list indicator may include a second font face (e.g., italic, etc.), second font type, a second color (e.g., red, etc.) 146. However, the present invention is not limited to the font faces, font types of colors listed and more, fewer or other font faces, font types, and colors can be used to practice the invention.

In another embodiment, the one or more graphical buttons are displayed in plural different colors. Each different color indicates one of plural different states for the purchased set of electronic options. For example, the plural states include states for an amount of time left to exercise the purchased electronic option (e.g., two weeks left to exercise, one week left to exercise, etc), states for a number of people who have exercised and/or not exercised the purchased electronic options, etc. The plural states include plural different display colors.

At Step 130, one or more exercise messages are received on the server application 25' from the server network device 20 from one or more client applications 25 on the client network devices 12, 14, 16 associated with the list of electronic identifiers via the communications network 18 to exercise the purchased electronic option to purchase the good or service or attend the event.

The one or more exercise messages are used by the server application 25' on the server network device 20 to change a counter, a state and/or a color of a graphical button for the group of purchased electronic options.

In one embodiment, a remaining number of electronic options in the purchased set of electronic options are automatically executed when a pre-determined number of electronic options in the purchased set of electronic options are purchased. For example, if a group leader bought a set of ten electronic options and six members of the group purchased electronic options, the remaining four options would be automatically exercised for the remaining four group members. Such automatic executions help ensure a group event will actually take place and reduces uncertainty among group members and situations where indecision prevents action (e.g., I will go only if Johnny and Sally also go, etc.). Such automatic execution can be included as one or the electronic option terms used by the supplier of the electronic option or by agreement among the group members. However, the present invention is not limited to this automatic execution and the invention can be practice without automatic execution.

At Step 132, one or more confirmation messages are sent from the server application 25' on the server network device 20 via the communications network 18 to the one or more client applications 25 on the client network devices 12, 14, 16 associated with the list of electronic identifiers indicating an individual electronic option from the set of purchased electronic option 27 has been exercised to purchase the good or service or attend the event.

In one embodiment, the client network devices 12, 14, 16 and the server network devices 20, 22, 24 include a wireless networking interface comprising a near field communications (NFC) or machine-to-machine (M2M) communications wireless networking interface. Such NFC or M2M communications enhance a social option experience by allowing electronic option information to be sent and received directly between two or more client network devices (e.g., 12, 14) when the client network devices are in close proximity. For example a user of a first client network device 12, physically "bumps" a second client network device 14, both using NFC and/or M2M to transfer electronic option information including the graphical option button between devices. However, the present invention is not limited to such an embodiment and more, fewer and other types of wired and wireless networking interfaces can be used to practice the invention.

Using the methods and system described herein users can buy a set of electronic options 27 and post to their social network the availability of the electronic options 27 and access to the underlying event, and invite their friends to join them for the event. When a user is definitely going to the event, and hopes that friends can join them, the users can also buy a combination of one or more actual tickets, and in addition, one or more options to reserve adjoining seats, then post to their social network the availability of the options and access to the underlying event, and invite their friends to join them for the event. The invitation includes graphical buttons and/or other widget to allow the friends to electronically notify the inviter of their level of interest (yes/no/maybe).

The client and server applications 25, 25' allows the inviter to view invitees replies and the total number of each type of answer, allows the inviter to re-send the invitation, automatically send periodic reminders to the non-responding invitees to let them know how many options remain. The inviter can keep track of their friends' responses through the application and make a decision on when to exercise and how many options to exercise.

Once the options have been exercised, one or more of the people who committed to go have a change of plans and will be unable to make it. In this case, the application 25, 25' that sent them the invitation, can allow them to send a notification to the same invitation group and give the people from the inviter's original group the opportunity to purchase the good or service or event.

Event promoters using electronic options 27 can sell more tickets, or in the case of a sold-out venue, generate additional revenue for selling the same number of tickets simply by providing the convenience of enabling friends who decide at different times to all sit together.

Electronic Options for Reserving a Spot at Facility or at an Event from a Reservation Pool Electronic options 27 are used to reserve spots at facilities (e.g., restaurants, golf courses, etc.) or events (e.g., sporting events, entertainment events, etc.).

Figure 15B:
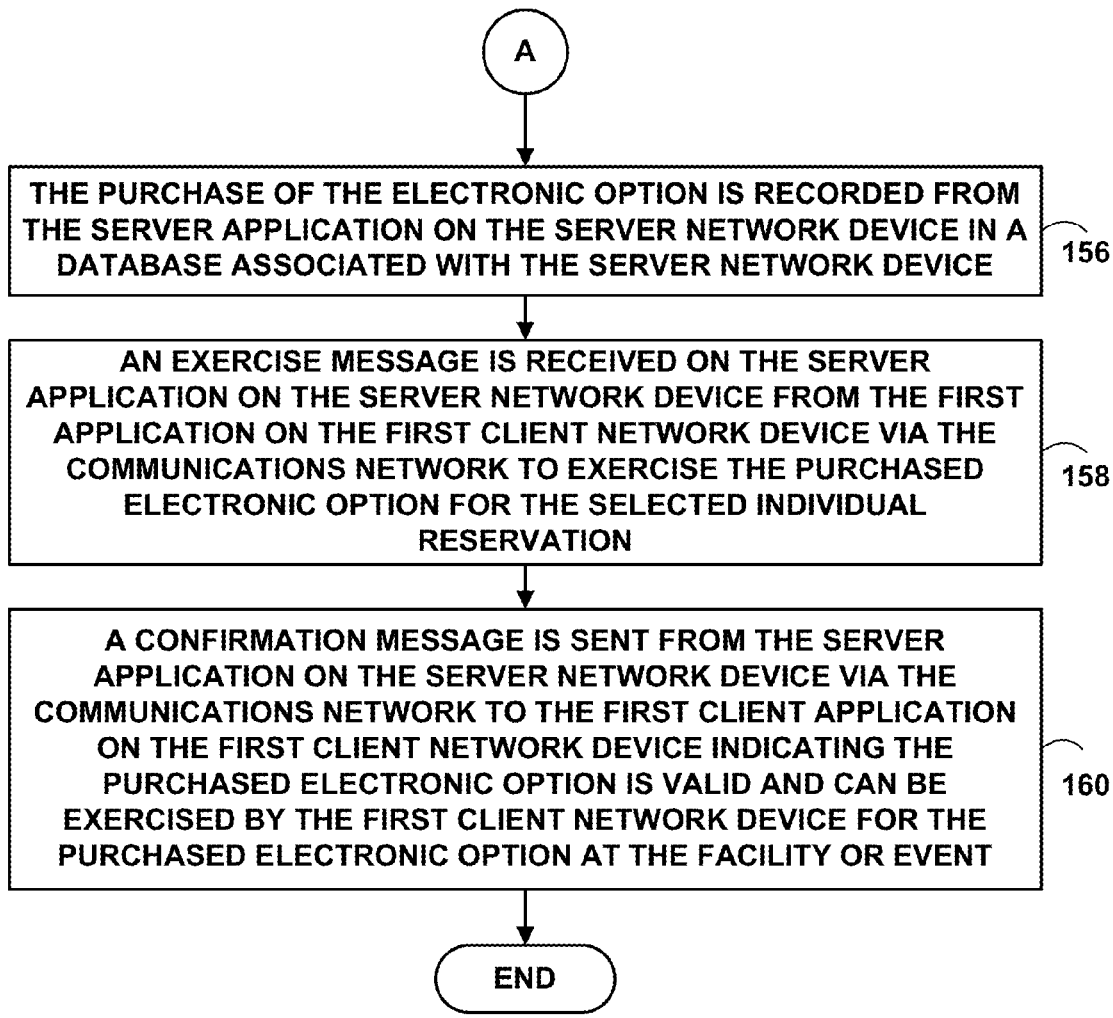

FIGS. 15A and 15B are a flow diagram illustrating a Method 148 for providing electronic options for goods or services or events. In FIG. 15A at Step 150, a server application on a server network device with one more processors selects a sub-set of reservations from a set of available reservations used to reserve a spot in a facility or at an event. Individual reservations from the sub-set of reservations are associated with and selectable with plural electronic options. At Step 152, the plural electronic options associated with the sub-set of reservations are displayed on plural client applications on plural client network devices each with one or more processors from the server application on the server network device via a communications network. The plural electronic options are not supplied or governed via a central government agency and are not supplied or governed via security laws. The plural electronic options include plural different electronic option terms for a plural different suppliers. The electronic option terms for a desired supplier are unique to the desired supplier. At Step 154, a payment message is received on the server application on the server network device via the communications network from a first client application on a first client network device including electronic payment of a pre-determined electronic option fee to purchase an electronic option for an individual reservation in the sub-set of reservations. In FIG. 15B At Step 156, the purchase of the electronic option is recorded from the server application on the server network device in a database associated with the server network device. At step 158, an exercise message is received on the server application on the server network device from the first application on the first client network device via the communications network to exercise the purchased electronic option for the selected individual reservation. At Step 160, a confirmation message is sent from the server application on the server network device via the communications network to the first client application on the first client network device indicating the purchased electronic option is valid and can be exercised by the first client network device for the purchased electronic option at the facility or event.

Method 148 is illustrated with one exemplary embodiment. However, the present invention is not limited this exemplary embodiment and other embodiments can be used to practice the invention.

In such an exemplary embodiment in FIG. 15A at Step 150 a server application 25' on a server network device 20 with one more processors selects a sub-set of reservations from a set of available reservations used to reserve a spot in a facility or at an event. Individual reservations from the sub-set of reservations are associated with and selectable with plural electronic options 27.

In one embodiment, a subset of reservation slots are held out of a general reservation pool and put into a priority reservation system accessible with the electronic options 27 described herein. The priority reservation system includes use of the methods described in FIGS. 8-11. However, the present invention is not limited to such an embodiment, and more, fewer and other types of reservation systems can be used to practice the invention.

In another embodiment, a subset of reservation slots are held out of a general reservation pool and put into general reservation system accessible with the electronic options 27 described herein.

In another embodiment, the sub-set of reservations include plural sub-sets of reservations from plural sets of available reservations and are used to reserve spots in plural different facilities and/or at plural different events during a same time period. For example, a user may desired to use a purchased electronic option to reserve a spot in a first restaurant at 8:00 pm on Friday night and to reserve a second spot in a second restaurant at the same time and on the same night and make a final selection of the first restaurant or the second restaurant when the electronic option 27 is exercised at Step 158. Factors the user may consider for selecting the first restaurant or the second restaurant may include, but are not limited to, a dining preference or atmosphere preference of a spouse or significant other, how crowded or busy a given restaurant is, etc.

In another embodiment, the sub-set of reservations include plural sub-sets of reservations from plural sets of available reservations and are used to reserve spots in plural different facilities and/or at plural different events during plural different time periods.

Restaurants, other facilities and events offering electronic options 27 may add or remove reservation slots from a priority (and/or general pool. etc.) reservation system dynamically, manually or on a predetermined schedule. Option rights within the priority reservation system may be prioritized by time slot and/or by amount paid for the electronic option 27 and/or by the user's status level in a membership or loyalty club, and/or by any other prioritization method such as those described above in FIGS. 8-11 and with other prioritization methods (e.g., FIGS. 1-7).

In one embodiment, the sub-set of reservations include, include but are not limited to, reservations for airline tickets, other travel related tickets, bus tickets, boat tickets, theme part tickets, sporting event tickets or entertainment event tickets.

At Step 152, the plural electronic options 27 associated with the sub-set of reservations are displayed on a plural client applications 25 on plural client network devices 12, 14, 16 each with one or more processors from the server application 25' on the server network device 20 via a communications network 18. The plural electronic options 27 are not supplied or governed via a central government agency and are not supplied or governed via security laws. The plural electronic options 27 includes a plural different electronic option terms for a plural different suppliers. The electronic option terms for a desired supplier are unique to the desired supplier.

In another embodiment, the plural electronic options 27 are displayed on a display portion 31 of an electronic kiosk 29 instead of on the plural client applications 25 on plural client network devices 12, 14, 16. In such an embodiment, a kiosk application 25' on the kiosk 29 sends messages to and receives messages from the display portion 31 of the kiosk instead of to and from the client applications 25 on the client network devices 12, 14, 16. In such an embodiment, a user may interact directly with the kiosk 29. However, the present invention is not limited to such an embodiment and other embodiments, with or without kiosks can be used to practice the invention.

At Step 154, a payment message is received on the server application 25' on the server network device 12 via the communications network 18 from a first client application 25 on a first client network device 12 including electronic payment of a predetermined electronic option fee to purchase an electronic option for an individual reservation in the sub-set of reservations.

In one embodiment, users purchase such priority electronic options to gain access to the priority reservation system. To secure one of the priority reservations in the priority reservation system, the user exercises one of their purchased electronic options. If no priority reservations are available a user can make a "reservation request" with an another electronic option 27, indicating preferred time(s), acceptable time ranges, number of people in the party (minimum and maximum), etc.

If a reservation slot opens up, because of a cancellation or other reason, the requesting user, either automatically or via the exercise 158 and/or confirmation steps 160 exercises a purchased electronic option 27 to secure an actual reservation. If the electronic option is exercised via the exercise step 158, a restaurant may place a time limit on the right to exercise a purchased electronic option 27 for that reservation slot to avoid allowing the purchase electronic option 27 to lapse without being exercised, thereby not allowing an available table to be utilized by other customers.

In another embodiment, the electronic options 27 are used with an non-priority or general pool reservation system. In such an embodiment, the electronic options may also be used for reservation requests when no spots are available at the facility or event.

In one embodiment, the pre-determined electronic option fee is zero and a "purchaser" of the electronic option providers a supplier of the electronic option with other types of consideration including providing an e-mail address, phone, number, social networking identifier, picture, mandatory audio or video testimonial or completing a mandatory survey.

In one embodiment the electronic options 27 are offered and purchased according to a priority order and/or a priority ordering method as described by Method 86 of FIG. 8 above.

In FIG. 15B at Step 156, the purchase of the electronic option 27 is recorded from the server application 25 on the server network device 20 in a database 20' associated with the server network device 20.

In one embodiment, the server application 25' on the server network device 20 send plural invitation messages to a list of electronic identifiers for a group of client network devices for a group of friends associated with the purchase of the set of electronic options making the group of friends aware of the purchased set of electronic options and inviting the group of friends to exercise one or more individual electronic options from the purchased set of electronic options to join a reservation (Method 118, Step 128, FIG. 12, etc.). As was described for Method 118 above, the invitation messages are sent and/or posted to social networking sites.

The plural invitation messages include one or more graphical buttons for selecting, purchasing or exercising one or more of the plurality of electronic options purchased for the sub-set of reservations. The one or more graphical buttons include an OPTION IT 50, EXERCISE IT 70, JOIN ME 138, SIT WITH ME, MEET ME, or DINE WITH ME, graphical buttons. However, the present invention is not limited to this embodiment and invention can be practiced without making others aware of purchased electronic options.

At step 158, an exercise message is received on the server application 25' on the server network device 20 from the first client application 25 on the first client network device 12 via the communications network 12 to exercise the purchased electronic option for the selected individual reservation.

In one embodiment, if the electronic option is being used to select among plural reservations, the exercise message will include a selection of only one reservation for which the electronic option 27 will actually be exercised. The other reservations not selected will be automatically canceled and/or automatically returned to the reservation pool for use by others.

At Step 160, a confirmation message is sent from the server application 25' on the server network device 20 via the communications network 18 to the first client application 25 on the first client network device 12 indicating the purchased electronic option is valid and can be exercised by the first client network device 12 for the purchased electronic option 27 at the facility or event.

In one embodiment the confirmation message may include a bar-code, QR-code 100 (FIG. 9) or other confirmation code as was described above.

The methods and system provide for reserving future purchases of goods or services or events. A sub-set of reservations from a set of available reservations are used to reserve a spot in a facility or at an event are associated with and selectable with plural electronic options. The plural electronic options are also associated with reservation requests if no actual available reservations are available and automatically converted to electronic options for actual reservation if a reservation later becomes available at the facility or event.

Supplier Pricing Methods for Electronic Options

Suppliers have the ability to set option terms, including pricing, on the electronic options 27 and electronic option exercise rights that they provide.

Figure 16A:
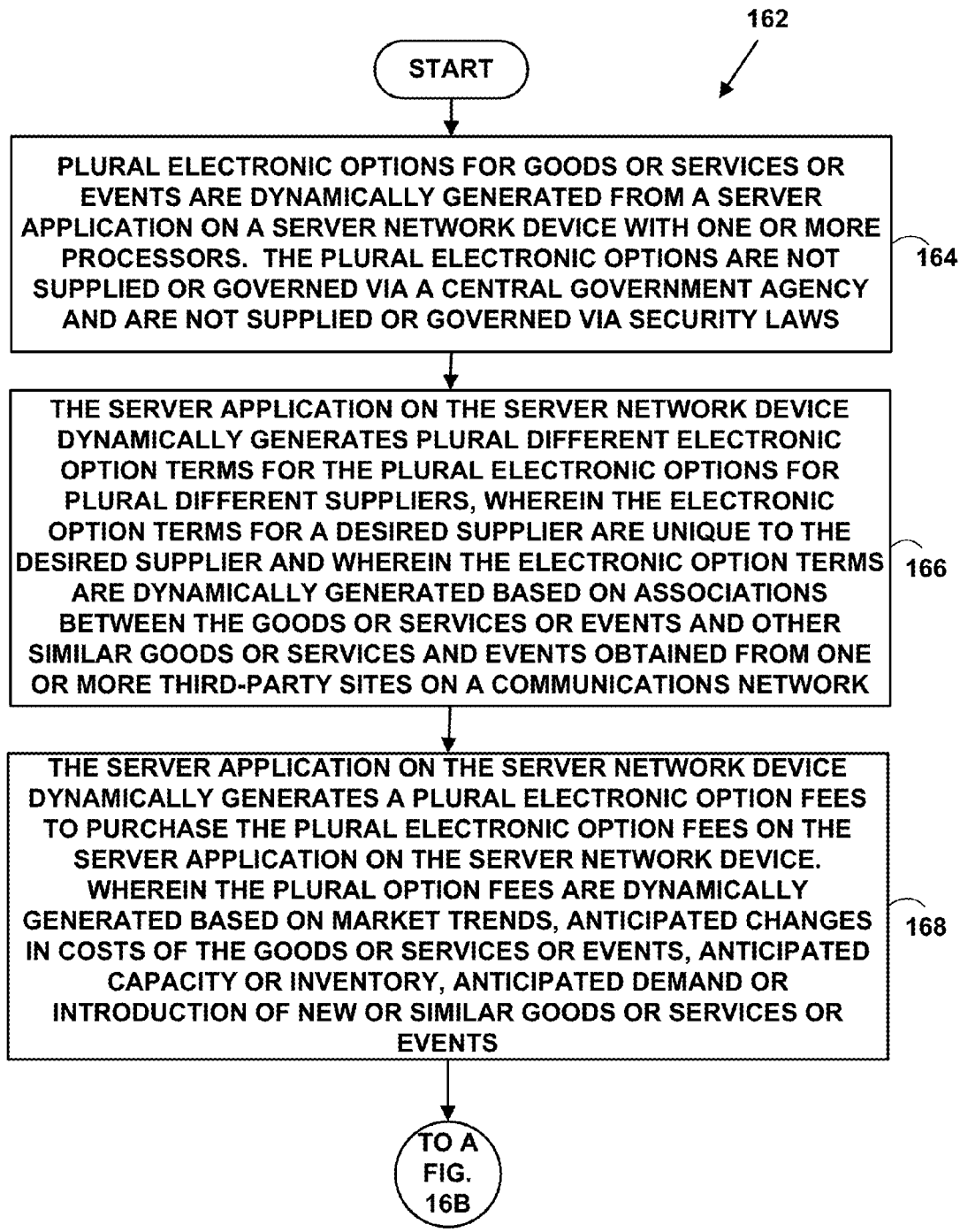
FIGS. 16A and 16B are a flow diagram illustrating a method for providing electronic options for goods or services or events.
Figure 16B:
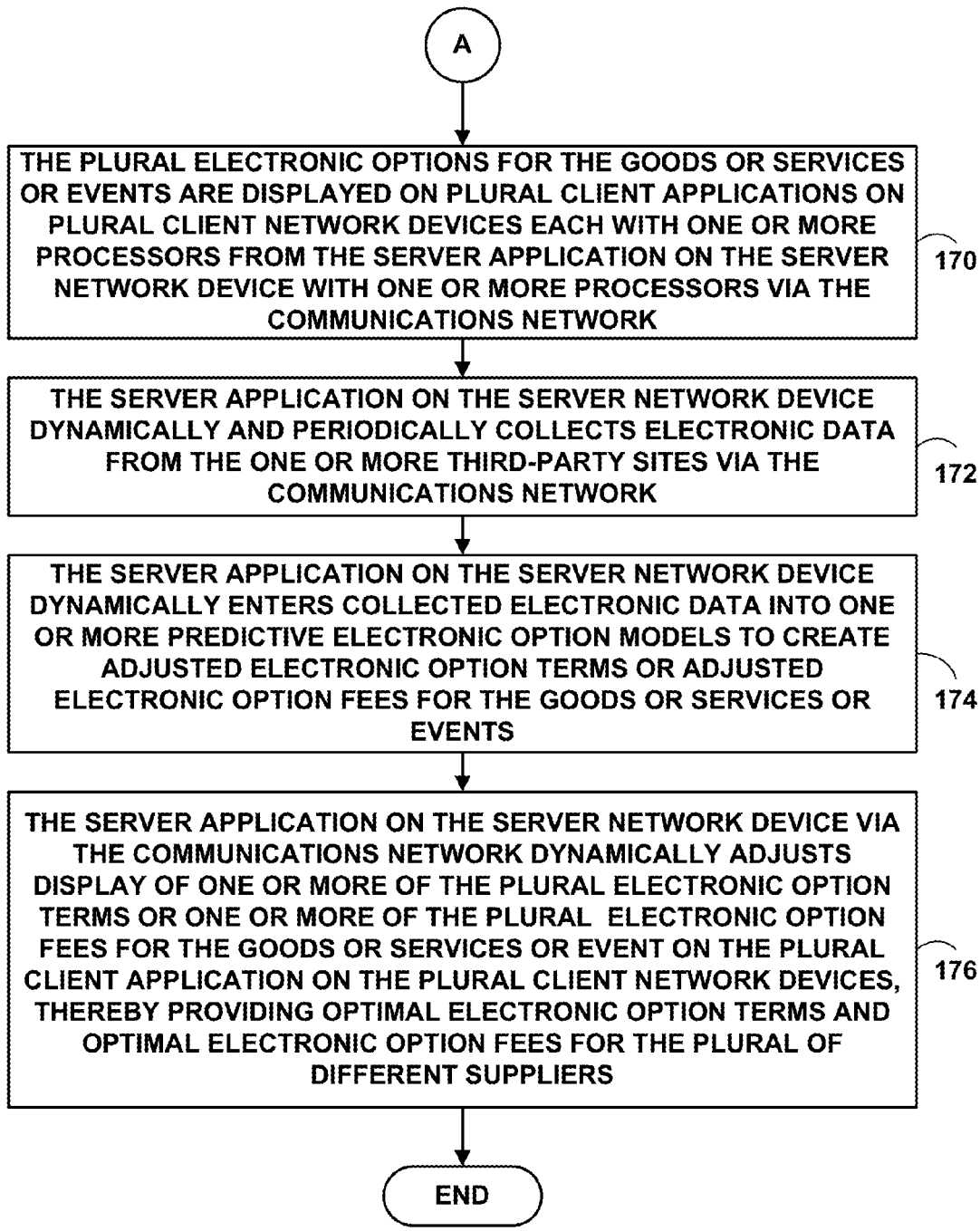

FIGS. 16A and 16B are a flow diagram illustrating Method 162 for providing electronic options for goods or services or events. In FIG. 16A at Step 164, plural electronic options for goods or services or events are dynamically generated from a server application on a server network device with one or more processors. The plural electronic options are not supplied or governed via a central government agency and are not supplied or governed via security laws. At Step 166, the server application on the server network device dynamically generates plural different electronic option terms for the plural electronic options for plural different suppliers. The electronic option terms for a desired supplier are unique to the desired supplier. The electronic option terms are dynamically generated based on associations between the goods or services or events and electronic information from other similar goods or services and events obtained from one or more third-party sites on a communications network. At Step 168, the server application on the server network device dynamically generates a plural electronic option fees to purchase the plural electronic options. The plural option fees are dynamically generated based on market trends, anticipated changes in costs of the goods or services or events, anticipated capacity or inventory, anticipated demand or introduction of new or similar goods or services or events. In FIG. 16B at Step 170, the plural electronic options for the goods or services or events are dynamically displayed on plural client applications on plural client network devices each with one or more processors from the server application on the server network device via the communications network. At Step 172, the server application on the server network device dynamically and periodically collects electronic data from the one or more third-party sites via the communications network. At Step 174, the server application on the server network device dynamically enters collected electronic data into one or more predictive electronic option models to create adjusted electronic option terms or adjusted electronic option fees for the goods or services or events. At Step 176, the server application on the server network device via the communications network dynamically adjusts display of one or more of the plural electronic option terms or one or more of the plural electronic option fees for the goods or services or event on the plural client application on the plural client network devices, thereby providing optimal electronic option terms and optimal electronic option fees for the plural of different suppliers of the goods or services or events.

Method 162 is illustrated with one exemplary embodiment. However, the present invention is not limited this exemplary embodiment and other embodiments can be used to practice the invention.

In such an exemplary embodiment in FIG. 16A at Step 164 plural electronic options 27 for goods or services or events are dynamically generated from a server application 25' on a server network device 20 with one or more processors. The plural electronic options 27 are not supplied or governed via a central government agency and are not supplied or governed via security laws.

At Step 166, the server application 25' on the server network device 20 dynamically generates plural different electronic option terms for the plural electronic options 20 for plural different suppliers. The electronic option terms for a desired supplier are unique to the desired supplier. The electronic option terms are dynamically generated based on associations between the goods or services or events and electronic information about other similar goods or services and events obtained from one or more third-party sites on a communications network 18.

In one embodiment, the third-party sites are used to analyze associations between goods or services or events in non-regulated markets, regulated markets and associations between goods or services or events between non-regulated and regulated markets. The third-party sites are also used to Understand of behavior, of anticipated behavior, of individual buyers, groups of buyers, sub-groups of buyers, etc. However, the present invention is not limited to this embodiment and other embodiments can be used to practice the invention.

At Step 168, the server application 25' on the server network device 20 dynamically generates a plural electronic option fees to purchase the plural electronic options 27. The plural option fees are dynamically generated based on market trends, anticipated changes in costs of the goods or services or events, anticipated capacity or inventory, anticipated demand or introduction of new or similar goods or services or events and/or plural other factors. However, the present invention is not limited to these factors and more, fewer or other factors can be used to determine the plural electronic option fees.

In one embodiment the plural electronic option fees are further adjusted based on events and/or movements in regulated financial markets, election results, weather event, natural disaster events, terrorist events, wars, etc. However, the present invention is not limited to these factors and more, fewer or other factors can be used to determine the plural electronic option fees.

In FIG. 16B at Step 170, the plural electronic options 27 for the goods or services or events are dynamically displayed on plural client applications 25 on plural client network devices 12, 14, 16 each with one or more processors from the server application 25' on the server network device 20 via the communications network 18.

At Step 172, the server application 25' on the server network device 20 dynamically and periodically collects electronic data from the one or more third-party sites via the communications network 18.

At Step 174, the server application 25' on the server network device 20 dynamically enters collected electronic data into one or more predictive electronic option models to create adjusted electronic option terms or adjusted electronic option fees for the goods or services or events.

In one embodiment, the predictive models include, but are not limited to, models based on understanding of a behavior, or anticipated behavior, of individual buyer or groups of buyer or sub-groups of buyers for desired goods or services or events.

In another embodiment, the predictive models include, but are not limited to, predictive buying models. "Predictive buying" includes algorithmic consumer analytics yielding future buying patterns. The model includes data mining, analysis and extrapolation using game theory, rules of inference and regression models. Predictive buying is an integration of the science of predictive analytics and the methods of permission marketing.

"Game theory" is a study of strategic decision making More formally, it is "the study of mathematical models of conflict and cooperation between intelligent rational decision-makers." An alternative term suggested "as a more descriptive name for the discipline" is interactive decision theory.

"Regression analysis" is a statistical technique for estimating the relationships among variables. It includes many techniques for modeling and analyzing several variables, when the focus is on the relationship between a dependent variable and one or more independent variables. More specifically, regression analysis helps one understand how the typical value of the dependent variable changes when any one of the independent variables is varied, while the other independent variables are held fixed.

"Rules of inference, inference rules, or transformation rules" are the act of drawing a conclusion based on the form of premises interpreted as a function which takes premises, analyzes their syntax, and returns a conclusion (or conclusions).

However, the present invention is not limited the predictive models described and more, fewer of other types of predictive models can also be used to practice the invention.

At Step 176, the server application 25' on the server network device 20 via the communications network 18 dynamically adjusts display of one or more of the plural electronic option terms or one or more of the plural electronic option fees for the goods or services or event on the plural client applications 25 on the plural client network devices 12, 14, 16, thereby providing optimal electronic option terms and optimal electronic option fees for the plural different suppliers of the goods or services or events.

Suppliers use the methods and systems describe herein to offer electronic options 27 that they determine with predictive have a higher probability of being purchased and exercised, thus increasing sales and revenue. Suppliers also incorporate use of electronic options 27 into their inventory management strategy and can target certain electronic options for high inventory items and/or de-emphasizing and/or eliminating electronic options 27 on low inventory, high demand items. This helps provide optimal use of electronic options and option electronic option terms and optimal electronic option fees for the plural different suppliers of the goods or services or events.

Step 176 provides electronic options for business-to-consumer (b2c) transactions.

In another embodiment, at Step 176 the server application 25' on the server network device 20 via the communications network 18 dynamically displays and dynamically adjusts display of one or more of the plural electronic option terms or one or more of the plural electronic option fees for the goods or services or event on the plural other server applications 25' on the plural other server network devices 22, 24 associated with the one or more suppliers, thereby providing optimal electronic option terms and optimal electronic option fees for the plural of different suppliers. In such an embodiment, Step 176 provides electronic options for business-to-business (b2b) transactions.

In such an embodiment, the electronic options are dynamically displayed on one or more retail sites (e.g., BESTBUY.COM AMAZON.COM, BUY.COM, etc.), a social networking site (e.g., FACEBOOK, TWITTER, LINKEDIN, etc.) a social couponing site (e.g., GROUPON, SOCIAL LIVIING, etc.).

The methods and systems described herein provide electronic options for desired goods or services or events. Electronic options are provided for desired goods or services or events. Electronic option terms and electronic option fees for the plural electronic options are dynamically and periodically adjusted in real-time. This provides optimal electronic option use and optimal electronic term and optimal electronic option fee adjustment for plural different suppliers of good or services or events provided and used with electronic options.

Behavior Based Electronic Option Generation

Suppliers have the ability to provide or not provide electronic options 27, set option terms, including pricing, on the electronic options 27 based on prior behavior of electronic option purchasers.

FIGS. 17A and 17B are a flow diagram illustrating Method 178 for providing electronic options for goods or services or events.

In such an exemplary embodiment in FIG. 16A at Step 180, a server application on a server network device with one or more processors dynamically generates plural electronic options for goods or services or events. The plural electronic options are not supplied or governed via a central government agency and are not supplied or governed via security laws. At Step 182, the server application on the server network device dynamically generates plural different electronic option terms and plural electronic option fees for the plural electronic options for plural different suppliers. The electronic option terms for a desired supplier are unique to the desired supplier. The electronic option terms and electronic option fees are dynamically generated based on a first set of plural prior actions completed by plural client applications on plural client network devices each with one or more processors. At Step 184, the plural electronic options are dynamically displayed from the server application on the server network device via the communications network for the goods or services or events on the plural client applications on the plural client network devices. In FIG. 17B at Step 186, plural new actions completed by the plural client applications on the plural client network devices are dynamically collected on the server application on the server network device as a result of the display of the plural electronic options. At Step 188, the server application on the server network device via the communications network dynamically adjusts in real-time from display of one or more of the plural electronic option terms or one or more of the plural electronic option fees for the goods or services or event on the plural client applications on the plural client network devices based on the collected new actions.

Method 178 is illustrated with one exemplary embodiment. However, the present invention is not limited this exemplary embodiment and other embodiments can be used to practice the invention.

In such an exemplary embodiment at Step 180 a server application 25' on a server network device 20 with one or more processors dynamically generates plural electronic options 27 for goods or services or events. The plural electronic options 27 are not supplied or governed via a central government agency and are not supplied or governed via security laws.

In one embodiment, the plural electronic options include plural electronic coupons or personalized electronic coupons or electronic reservations and/or personalized electronic reservations. However, the present invention is not limited the type of electronic options described and more, fewer or other types of electronic options can be used to practice the invention.

At Step 182, the server application 25' on the server network device 20 dynamically generates plural different electronic option terms and plural electronic option fees for the plural electronic options 27 for plural different suppliers. The electronic option terms for a desired supplier are unique to the desired supplier. The electronic option terms and plural electronic option fees are dynamically generated based on a first set of plural prior actions completed by plural client applications 25 on plural client network devices 12, 14, 16 each with one or more processors.

In one embodiment, the first set of prior actions, includes but is not limited to, prior electronic option 27 purchases, prior electronic option 27 exercise, prior product purchases, browsing history, e-commerce product views, items abandoned in an electronic shopping cart, advertisements clicked on, product ratings and social network "Likes" (e.g., FACEBOOK Likes, etc.) by users (and their friends), social networking browsing, purchase/browsing history of social network friends, electronic option purchases and other purchases posted by a user and/or friends on social networking sites, sport sites, event sites and retail sites. However, the present invention is not limited the first set of prior actions and more, fewer or other prior actions can be used to practice the invention.

At Step 184, the plural electronic options 27 are dynamically displayed from the server application 25' on the server network device 20 via the communications network 18 for the goods or services or events on the plural client applications 25 on the plural client network devices 12, 14, 16.

In FIG. 17B at Step 186, plural new actions completed by the plural client applications 25 on the plural client network devices 12, 14, 16 are dynamically collected on the server application 25 on the server network device 20 as a result of the display of the plural electronic options 27.

In one embodiment, the collected new actions, include, but are not limited to, purchasing electronic options 27, exercising purchased electronic options 27, purchasing goods or services or events associated with an electronic option 27, expiration of purchased electronic options 27 without exercising; purchasing of goods or services or events similar to the goods or services or events associated with the electronic options 27, a number of purchased electronic options posted to a social networking site. However, the present invention is not limited the collected new actions listed and more, fewer or other prior actions can be used to practice the invention.

In another embodiment, the collected new actions further include a change in location of a client network device 12, 14, 16. In such an embodiment, every time a client network device 12, 14, 16, changes location, a new electronic option, new electronic option term and/or new electronic fee is displayed based on a current location for the client network device 12, 14, 16.

At Step 188, the server application 25' on the server network device 20 via the communications network 18 dynamically adjusts in real-time from display of one or more of the plural electronic option terms or one or more of the plural electronic option fees for the goods or services or event on the plural client applications 25 on the plural client network devices 12, 14, 16 based on the collected new actions.

Suppliers use the methods and system described herein to offer options that they determine, based on their knowledge of the user's behavior and location, to have a higher probability of being purchased and exercised, increasing sales and revenue. Suppliers can also use the methods and system for inventory management strategy, by creating certain electronic options 27 for low demand high inventory items and de-emphasizing or eliminating electronic options 27 on high-demand, low inventory items. Suppliers can also better judge future demand for goods or services or events by grouping purchasers by certain characteristics, targeting specific groups with certain types of offers. Different groups could get different option terms, different option fees or subsets within a characteristic group could get different option terms or option fees to test the effectiveness of certain electronic option terms or fee on purchasers.

FIG. 18 is a flow diagram illustrating a Method 190 for providing electronic options for goods or services or events. At Step 192, a server application on a server network device via a communications network dynamically creates in real-time one or more custom electronic options for a good or service or event based on specific prior actions for a selected client network device. At Step 194, the server application on the server network device via the communications network dynamically displays the one or more custom electronic options from only on a selected client application on the selected client network device. At Step 196, the server application on the server network device via the communications network dynamically adjusts in real-time display of the one or more custom electronic options on the selected client application on the selected client network device based on collected new actions of the client network device.

Method 190 is illustrated with one exemplary embodiment. However, the present invention is not limited this exemplary embodiment and other embodiments can be used to practice the invention.

In such an exemplary embodiment at Step 192, a server application 25' on a server network device 20 via a communications network 18 dynamically creates in real-time one or more custom electronic options 27 for a good or service or event based on specific prior actions for a selected client network device 12.

In one embodiment, the specific prior actions, includes but is not limited to, prior electronic option 27 purchases, prior electronic option 27 exercise, prior product purchases, browsing history, e-commerce product views, items abandoned in an electronic shopping cart, advertisements clicked on, product ratings and social network "Likes" (e.g., FACEBOOK Likes, etc.) by users (and their friends), social networking browsing, purchase/browsing history of social network friends, electronic option purchases and other purchases posted by a user and/or friends on social networking sites, sport sites, event sites and retail sites. However, the present invention is not limited the first set of prior actions and more, fewer or other prior actions can be used to practice the invention.

In one embodiment, Step 192, includes dynamically creating in real-time from the server application 25' on the server network device 20 via the communications network 18 one or more new custom electronic options based on a date for a potential upcoming purchase. For example, the client network device 16, is smart phone that is eligible for an upgrade. An new custom electronic option may be created to entice a user of the client network device 16 to purchase the custom electronic option for upgrading to a new smart phone.

At Step 194, the server application 25' on the server network device 20 via the communications network 18 dynamically displays the one or more custom electronic options from only on a selected client application 25 on the selected client network device 25.

At Step 196, the server application 25' on the server network device 25 via the communications network 18 dynamically adjusts in real-time display of the one or more custom electronic options 27 on the selected client application 25 on the selected client network device 12 based on the collected new actions of the client network device. (e.g., those collected at Step 186 of Method 178, etc.).

FIG. 19 is a flow diagram illustrating a Method 198 for providing electronic options for goods or services or events. At Step 200, a server application on a server network device determines via the communications network that a specific client network device has changed physical locations. At Step 202, the server application on the server network device via the communications network dynamically creates one or more new custom electronic options based on the determined change in location of the selected client network device. At Step 204, the created one or more new custom electronic options are dynamically displayed from the server application on the server network device via the communications network to on a selected client application on the client network device.

Method 198 is illustrated with one exemplary embodiment. However, the present invention is not limited this exemplary embodiment and other embodiments can be used to practice the invention.

In such an exemplary embodiment at Step 200, a server application 25' on a server network device 20 determines via the communications network 18 that a specific client network device 12 has changed physical locations. In one embodiment, Global Positioning Satellite Systems (GPS) data is used to determine the client network device has changed physical location. However, the present invention is not limited to GPS data and other location information can be used to practice the invention (e.g., cell tower triangulation, change in IP address, etc.)

At Step 202, the server application 25' on the server network device 20 via the communications network 18 dynamically creates one or more new custom electronic options 27 based on the determined change in physical location of the selected client network device 12. For example, the selected client network device 12 may have changed location to a street in which includes a number of restaurants at an hour near dinner time. The new custom electronic option 27 may include an option for a reservation for a table at one of the restaurants, etc.

At Step 204, the created one or more new custom electronic options 27 are dynamically displayed in real-time from the server application 25' on the server network device 20 via the communications network 18 to on a selected client application 25 on the client network device 20.

Figure 20:
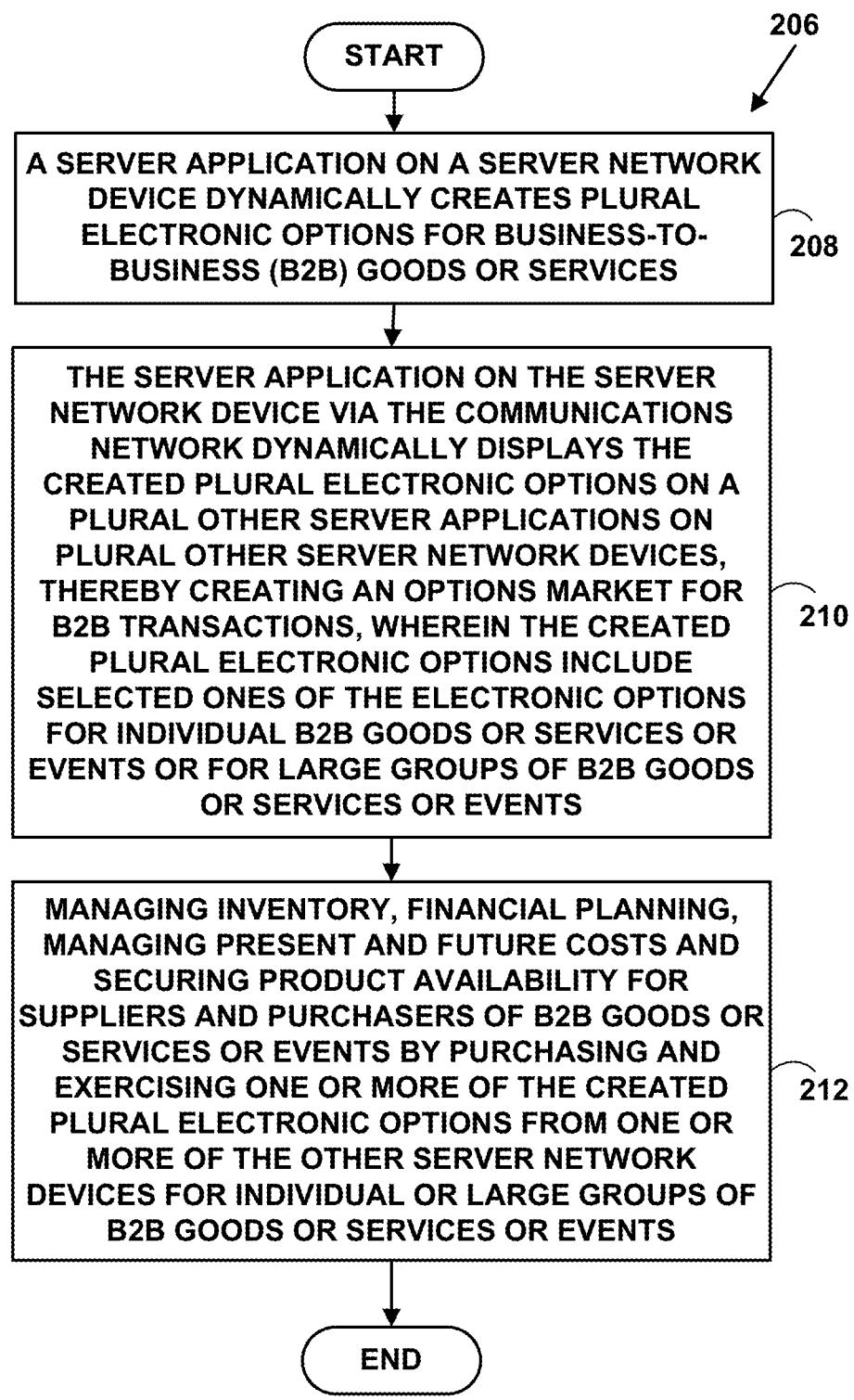
FIG. 20 is a flow diagram illustrating a method for providing electronic options for goods or services or events.

FIG. 20 is a flow diagram illustrating a Method 206 for providing electronic options for goods or services or events. At Step 208, a server application on a server network device dynamically creates plural electronic options for business-to-business (b2b) goods or services. At Step 210, the server application on the server network device via the communications network dynamically displays the created plural electronic options on a plural other server applications on plural other server network devices, thereby creating an options market for b2b transactions. The created plural electronic options include selected ones of the electronic options for individual b2b goods or services or events or for large groups of b2b goods or services or events. At Step 212, managing inventory, financial planning, managing present and future costs and securing product availability for suppliers and purchasers of b2b goods or services or events by purchasing and exercising one or more of the created plural electronic options from one or more of the other server network devices for individual or large groups of b2b goods or services or events.

Method 206 is illustrated with one exemplary embodiment. However, the present invention is not limited this exemplary embodiment and other embodiments can be used to practice the invention.

In such an exemplary embodiment at Step 208, a server application 25' on a server network device 20 dynamically creates plural electronic options 27 for business-to-business (b2b) goods or services.

At Step 210, the server application 25' on the server network device 20 via the communications network 18 dynamically displays the created plural electronic options 27 on a plural other server applications 25", 25''' on plural other server network devices 22, 24, thereby creating an options market for b2b transactions. The created plural electronic options 27 include selected ones of the electronic options for individual b2b goods or services or events or for large groups of b2b goods or services or events.

At Step 212, managing inventory, managing financial planning, managing present and future costs and securing product availability for suppliers and purchasers of b2b goods or services or events by purchasing and exercising one or more of the created plural electronic options 27 from one or more of the other server network devices for individual or large groups of b2b goods or services or events.

In one embodiment, Method 206 is used for supply chain management for suppliers and for product procurement management for purchasers.

B2B sellers can offer electronic options 27 on any good or service or event not sold on a government regulated market, offer options 27 on goods or services or events individually, offer electronic options on bulk lots of goods or service or events, allow and/or set parameters for the division of the bulk lots by buyers, allow establishment of options for regular deliveries (e.g., monthly, etc.).

B2B suppliers can collect electronic data associated with the electronic options 27 regarding activity around electronic option offerings and electronic option buyers. Delivery quantities of goods or services or events may be fixed or may be set to within a min/max range; when a range, electronic option terms may be such that either buyer or seller sets the final quantity within that range.

B2B electronic options 27 may be exercised early; or automatically exercised or declined on a specified date, depending on the terms established by the supplier. Delivery/availability dates of goods or services or events covered by the exercising of electronic options can be fixed or floating within a time window.

B2B purchasers may buy, sell, exercise or allow to expire B2B electronic options 27. Such purchasers may be allowed to (if allowed by supplier or marketplace terms) divide a purchased B2B electronic option on a bulk order into two or more other B2B electronic options 27 for smaller quantities of the good or service or event, the sum equaling the original quantity. Such purchasers may sell, exercise or allow to expire sub-divided electronic options 27. Such purchasers may purchase options for regular deliveries (e.g., monthly, etc.) and choose to exercise or not exercise separately during each option time period. Such purchasers may collect data on good or service or event pricing, volume and other activity from the market.

A B2B market maker can establish an electronic options market for any non-regulated product (or group of products). The B2B market maker connects B2B buyers and sellers and establishes rules around that market, such as who can sell electronic options on that market, with approval parameters of the terms, how exercise, delivery and payment. The B2B market maker establishes standardized lot sizes, quality levels, exercise, expiration, delivery terms, etc and has the ability to charge fees (or not) to the buyer and/or seller for creating electronic options, trading electronic options, exercising options, etc.

The B2B market maker may act as a regulator of the established electronic options market, organize the market for a good or service or event or group of goods or services ore vent related, or interrelated, to an event, facilitates the buying and selling of electronic options on the goods or services or events either individually or via group. The market maker may also collect data regarding all activities, sales parameters, quantities, deliveries, timing, etc. regarding options, sell data, to suppliers, to buyers and other parties. Electronic option 27 prices and electronic option 27 strike prices may fluctuate in the established electronic options market, based on timing, demand, external events or factors or for any reason.

The methods and systems described herein provide electronic options for desired goods or services or events. Electronic options, electronic option terms and electronic option fees are dynamically generated and dynamically adjusted based on prior and current actions completed on a client network device. A business-to-business (b2b) marketplace is established using electronic options.

It should be understood that the programs, processes, methods and system described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments including hardware or firmware implementations, or combinations thereof, may alternatively be used, and visa versa.

The claims should not be read as limited to the described order or elements unless stated to that effect. Therefore, all embodiments that come within the scope and spirit of the following claims and equivalents thereto are claimed as the invention.

We claim:

1. A method for using electronic options for goods or services or events or places, comprising:

dynamically generating a plurality of electronic options for goods or services or events from a server application on a server network device with one or more processors, wherein the plurality of electronic options are not supplied or governed via a central government agency and are not supplied or governed via security laws;

dynamically generating from the server application on the server network device a plurality of different electronic option terms and a plurality of electronic option fees for the plurality of electronic options for a plurality of different suppliers, wherein the electronic option terms for a desired supplier are unique to the desired supplier and wherein the electronic option terms and the plurality of electronic option fees are dynamically generated based on a first set of plurality of prior actions completed by a plurality of client applications on a plurality of client network devices each with one or more processors;

dynamically displaying from the server application on the server network device via the communications network the plurality of electronic options for the goods or services or events on the plurality of client applications on the plurality client network devices;

dynamically collecting the server application on the server network device via the communications network a plurality of new actions completed by the plurality of client applications on the plurality of client network devices as a result of the display of the plurality of electronic options; and dynamically adjusting in real-time from the server application on the server network device via the communications network display of one or more of the plurality of electronic option terms or one or more of the plurality of electronic option fees for the goods or services or event on the plurality of client applications on the plurality of client network devices based on the collected new actions.

2. The method of claim 1 wherein the first set of plurality of prior actions completed by the plurality of client applications on the plurality of client network devices includes prior: electronic option purchases, electronic option exercises, product purchases, browsing history, e-commerce product views, items abandoned in an electronic shopping cart, advertisements clicked on, product ratings, social network like selections by a user or a user's friends, social networking browsing, purchase and browsing history of social network friends, electronic option purchases of electronic options posted by a user or friends of a user on social networking sites, sport sites, event sites or retail sites.

3. The method of claim 1 wherein the plurality of new actions completed by the plurality of client applications on the plurality of client network devices as a result of the display of the plurality of electronic options includes: purchasing electronic options, exercising purchased electronic options, purchasing goods or services or events associated with an electronic option, expiration of purchased electronic options without exercising; purchasing of goods or services or events similar to the goods or services or events associated with the electronic options, a number of purchased electronic options posted to a social networking site.

4. The method of claim 1 wherein the plurality of electronic options includes a plurality of electronic coupons or personalized electronic coupons.

5. The method of claim 1 wherein the plurality of electronic options include a plurality of electronic reservations.

6. The method of claim 1 wherein the plurality of client applications on the plurality of client network devices includes a plurality of smart software applications for smart phone or electronic tablet client network devices.

7. The method of claim 1 wherein the plurality of client network devices and the server network device include a wireless networking interface comprising a Worldwide Interoperability for Microwave Access (WiMax) wireless networking interface with $4^{th}$ generation (4G) wireless speeds and wireless protocols for communicating with the communications network.

8. The method of claim 1 wherein the plurality of client network devices and the server network device include a wireless networking interface comprising a near field communications (NFC) or machine-to-machine (M2M) communications wireless networking interface.

9. The method of claim 1 wherein the plurality of electronic options are provided by the server network device via the communications network via television services, Internet television services, social networking services, general search engine services and vertical search engine services.

10. The method of claim 1 wherein step of dynamically displaying includes dynamically displaying the plurality of electronic options for the goods or services or events on one or more retail sites, social networking sites or social couponing sites.

11. The method of claim 1 further comprising:
dynamically creating in real-time from the server application on the server network device via the communications network one or more custom electronic options for a good or service or event based on specific prior actions for a selected client network device;
displaying the one or more custom electronic options from the server application on the server network device via the communications network only on a selected client application on the selected client network device; and
dynamically adjusting in real-time from the server application on the server network device via the communications network display of the one or more custom electronic options on the selected client application on the selected client network device based on collected new actions of the client network device.

12. The method of claim 1 further comprising:
determining on the server application on the server network device that a specific client network device has changed physical locations;
dynamically creating in real-time from the server application on the server network device via the communications network one or more new custom electronic options based on the determined change in location of the selected client network device; and
dynamically displaying in real-time the created one or more new custom electronic options from the server application on the server network device via the communications network to on a selected client application on the client network device.

13. The method of claim 12 further comprising:
dynamically creating in real-time from the server application on the server network device via the communications network one or more new custom electronic options based on a date for a potential upcoming purchase.

14. The method of claim 1 wherein the one or more suppliers use the electronic options for inventory control and to estimate future demand for goods or services or events.

15. The method of claim 1 further comprising:
dynamically creating from the server application on the server network device a plurality of electronic options for business-to-business (b2b) goods or services;
dynamically displaying from the server application on the server network device via the communications network the created plurality of electronic options on a plurality of other server applications on a plurality of other server network devices, thereby creating an options market for b2b transactions, wherein the created plurality of electronic options include selected ones of the electronic options for individual b2b goods or services or events or for large groups of b2b goods or services or events; and
managing inventory, financial planning, managing present and future costs and securing product availability for suppliers and purchasers of b2b goods or services or events by purchasing and exercising one or more of the created plurality of electronic options from one or more of the other server network devices for individual or large groups of b2b goods or services or events.

16. The method of claim 1 wherein the displaying step includes displaying the created plurality of electronic options on one or more client network devices via the communications network.

17. The method of claim 1 wherein the created plurality of electronic options are used for supply chain management for suppliers and for product procurement management for purchaser.

18. A non-transitory computer readable medium having stored therein a plurality of instructions for causing one or more processors on one or more network devices to execute the steps of:
dynamically generating a plurality of electronic options for goods or services or events from a server application on a server network device with one or more processors, wherein the plurality of electronic options are not supplied or governed via a central government agency and are not supplied or governed via security laws;
dynamically generating from the server application on the server network device a plurality of different electronic option terms and a plurality of electronic option fees for the plurality of electronic options for a plurality of different suppliers, wherein the electronic option terms for a desired supplier are unique to the desired supplier and wherein the electronic option terms and the plurality of electronic option fees are dynamically generated based on a first set of plurality of prior actions completed by a plurality of client applications on a plurality of client network devices each with one or more processors;

dynamically displaying from the server application on the server network device via the communications network the plurality of electronic options for the goods or services or events on the plurality of client applications on the plurality client network devices;

dynamically collecting the server application on the server network device via the communications network a plurality of new actions completed by the plurality of client applications on the plurality of client network devices as a result of the display of the plurality of electronic options; and dynamically adjusting in real-time from the server application on the server network device via the communications network display of one or more of the plurality of electronic option terms or one or more of the plurality of electronic option fees for the goods or services or event on the plurality of client applications on the plurality of client network devices based on the collected new actions.

19. A system for using electronic options for goods or services or events comprising in combination:

a communications network;

a plurality of target network devices each with one or more processors;

a non-transitory computer readable medium on a server network device with one or more processors including a plurality of instructions:

for dynamically generating a plurality of electronic options for goods or services or events from a server application on a server network device with one or more processors, wherein the plurality of electronic options are not supplied or governed via a central government agency and are not supplied or governed via security laws;

for dynamically generating from the server application on the server network devices a plurality of different electronic option terms and a plurality of electronic option fees for the plurality of electronic options for a plurality of different suppliers, wherein the electronic option terms for a desired supplier are unique to the desired supplier and wherein the electronic option terms and the plurality of electronic option fees are dynamically generated based on a first set of plurality of prior actions completed by a plurality of client applications on the plurality of client network devices each with one or more processors;

for dynamically displaying from the server application on the server network device via the communications network the plurality of electronic options for the goods or services or events on the plurality of client applications on the plurality client network devices;

for dynamically collecting the server application on the server network device via the communications network a plurality of new actions completed by the plurality of client applications on the plurality of client network devices as a result of the display of the plurality of electronic options;

for dynamically adjusting in real-time from the server application on the server network device via the communications network display of one or more of the plurality of electronic option terms or one or more of the plurality of electronic option fees for the goods or services or event on the plurality of client applications on the plurality of client network devices based on the collected new actions;

for dynamically creating in real-time from the server application on the server network device via the communications network one or more custom electronic options for a good or service or event based on specific prior actions for a selected client network device;

for displaying the one or more custom electronic options from the server application on the server network device via the communications network only on a selected client application on the selected client network device;

for dynamically adjusting in real-time from the server application on the server network device via the communications network display of the one or more custom electronic options on the selected client application on the selected client network device based on collected new actions of the client network device;

for determining on the server application on the server network device that a specific client network device has changed physical locations;

for dynamically creating in real-time from the server application on the server network device via the communications network one or more new custom electronic options based on the determined change in location of the selected client network device; and for dynamically displaying in real-time the created one or more new custom electronic options from the server application on the server network device via the communications network to on a selected client application on the client network device;

for dynamically creating from the server application on the server network device a plurality of electronic options for business-to-business (b2b) goods or services;

for dynamically displaying from the server application on the server network device via the communications network the created plurality of electronic options on a plurality of other server applications on a plurality of other server network devices, thereby creating an options market for b2b transactions, wherein the created plurality of electronic options include selected ones of the electronic options for individual b2b goods or services or events or for large groups of b2b goods or services or events; and for managing inventory, financial planning, managing present and future costs and securing product availability for suppliers and purchasers of b2b goods or services or events by purchasing and exercising one or more of the created plurality of electronic options from one or more of the other server network devices for individual or large groups of b2b goods or services or events.

\* \* \* \* \*